Feb. 27, 1962 J. MILLER ETAL 3,022,617
CONVEYOR KEG PALLETIZING DEVICE
Filed April 1, 1955 45 Sheets-Sheet 3
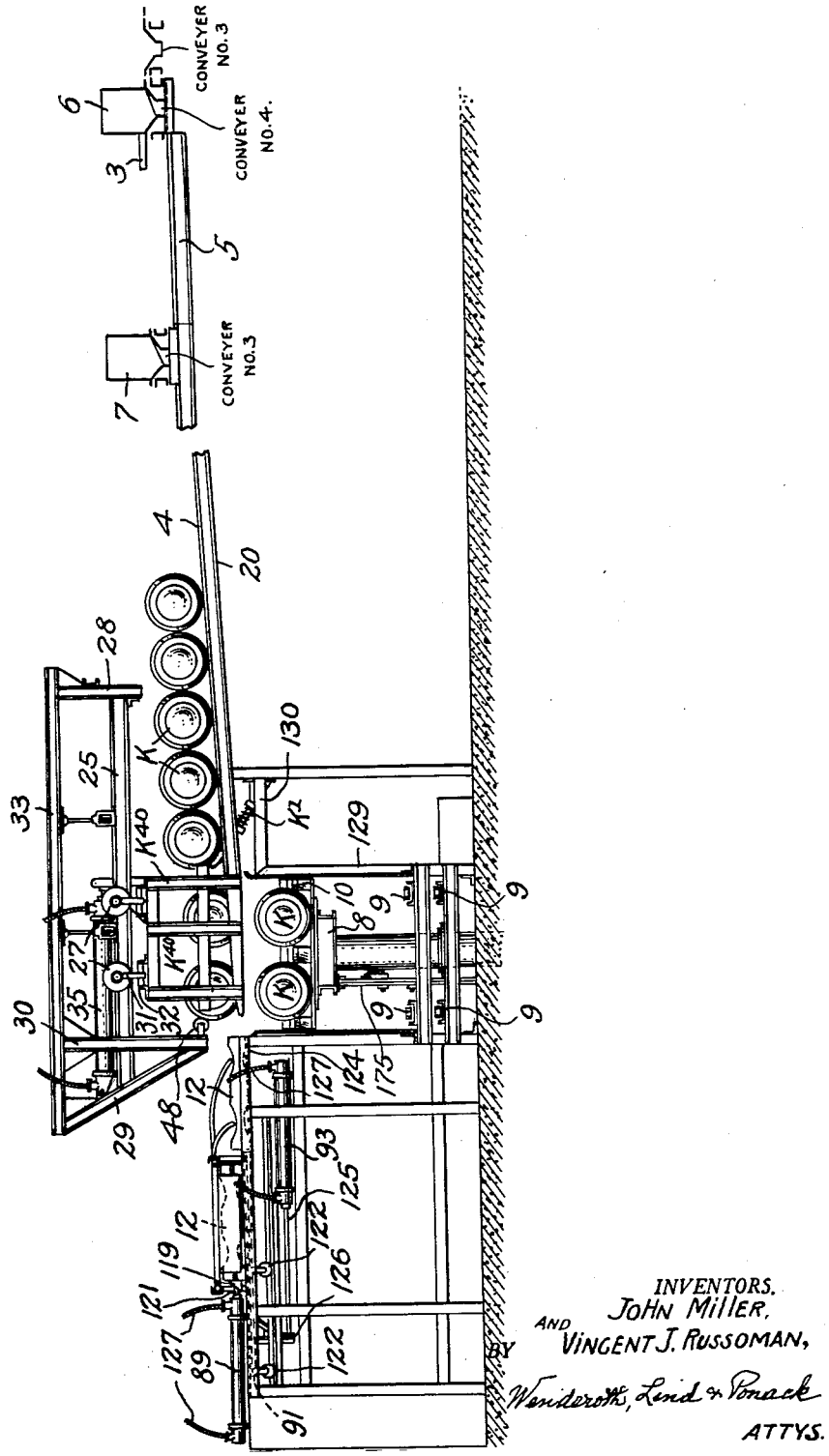
INVENTORS.
JOHN MILLER,
AND VINGENT J. RUSSOMAN,
BY Wenderoth, Lind & Ponack
ATTYS.

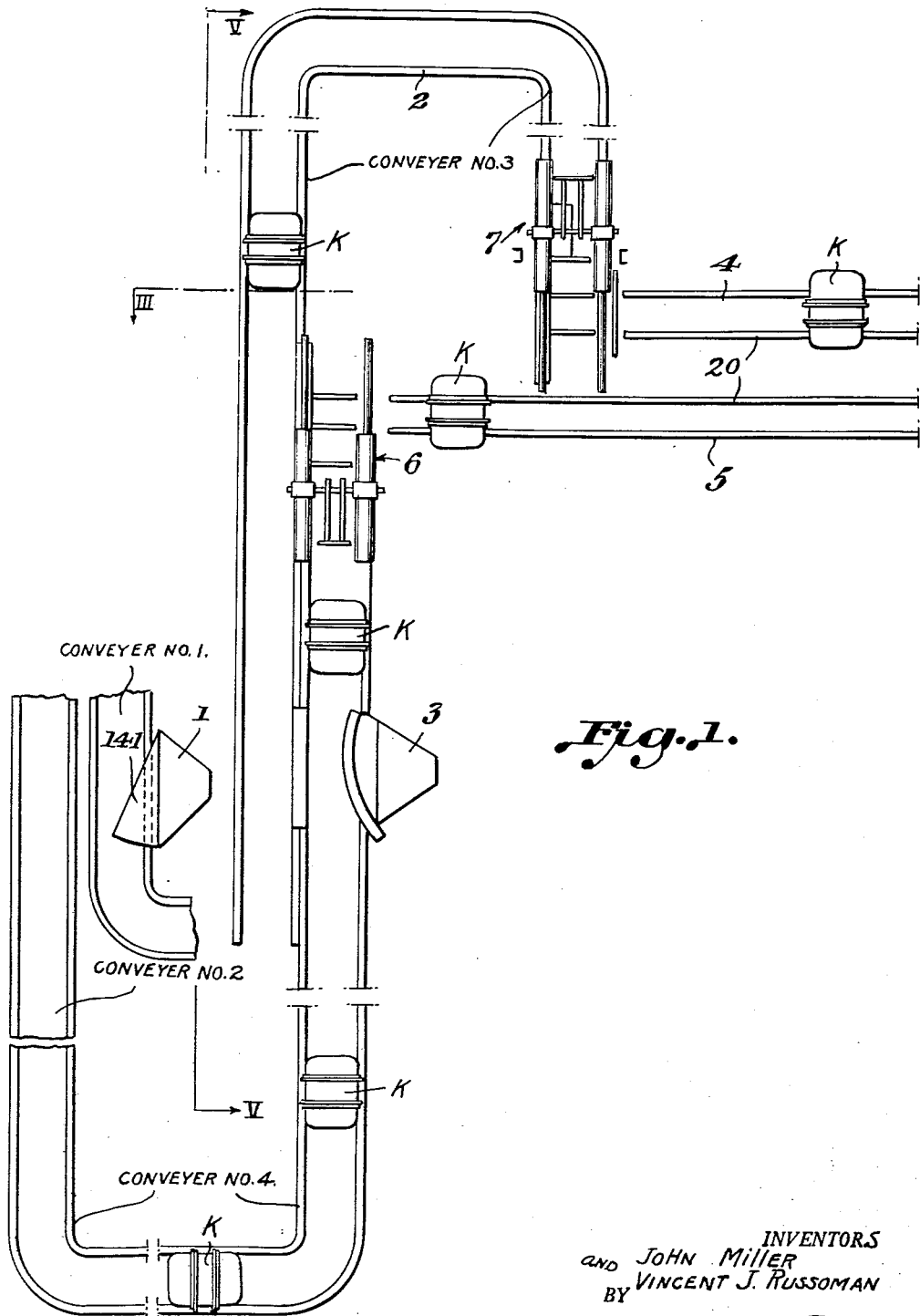

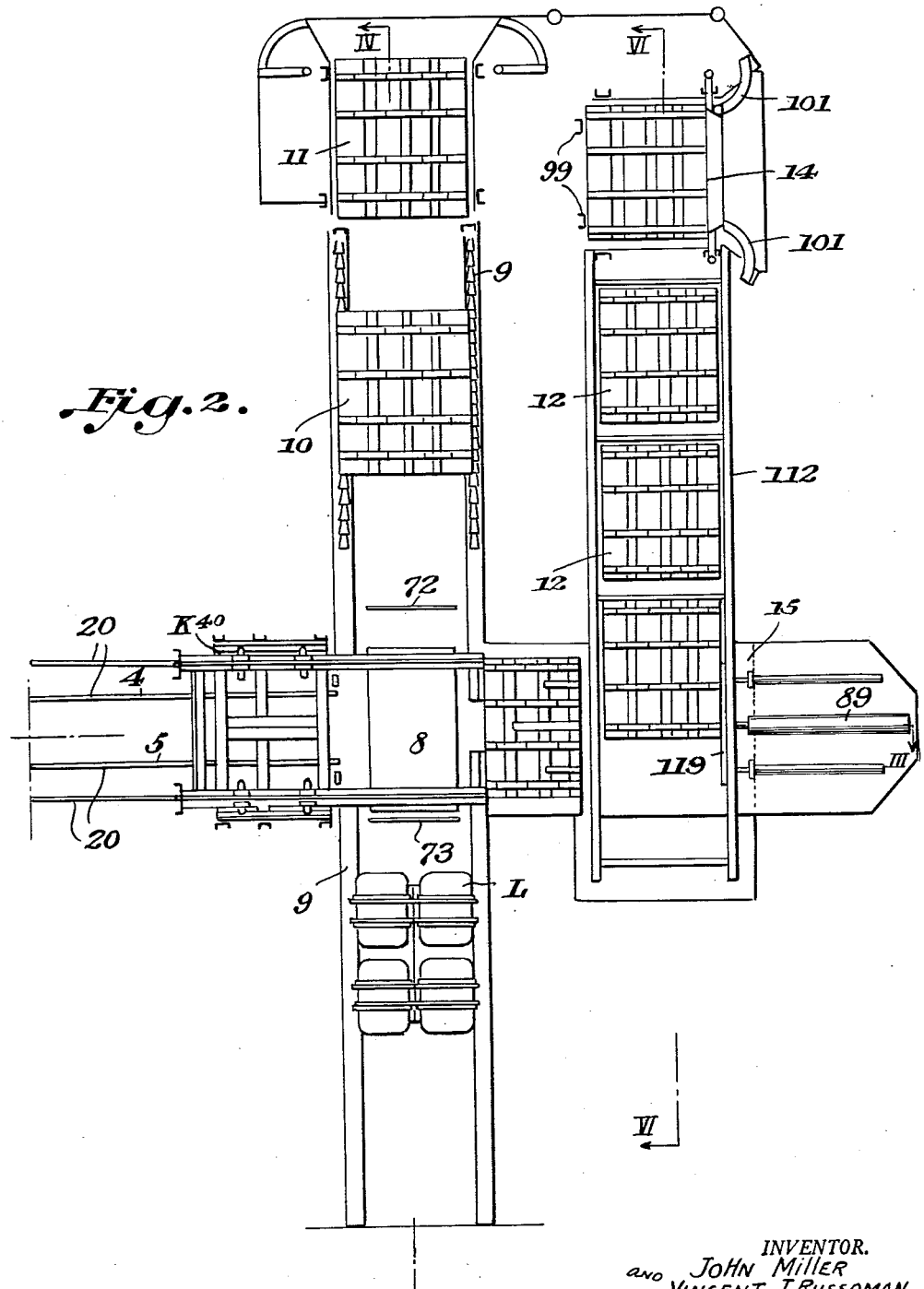

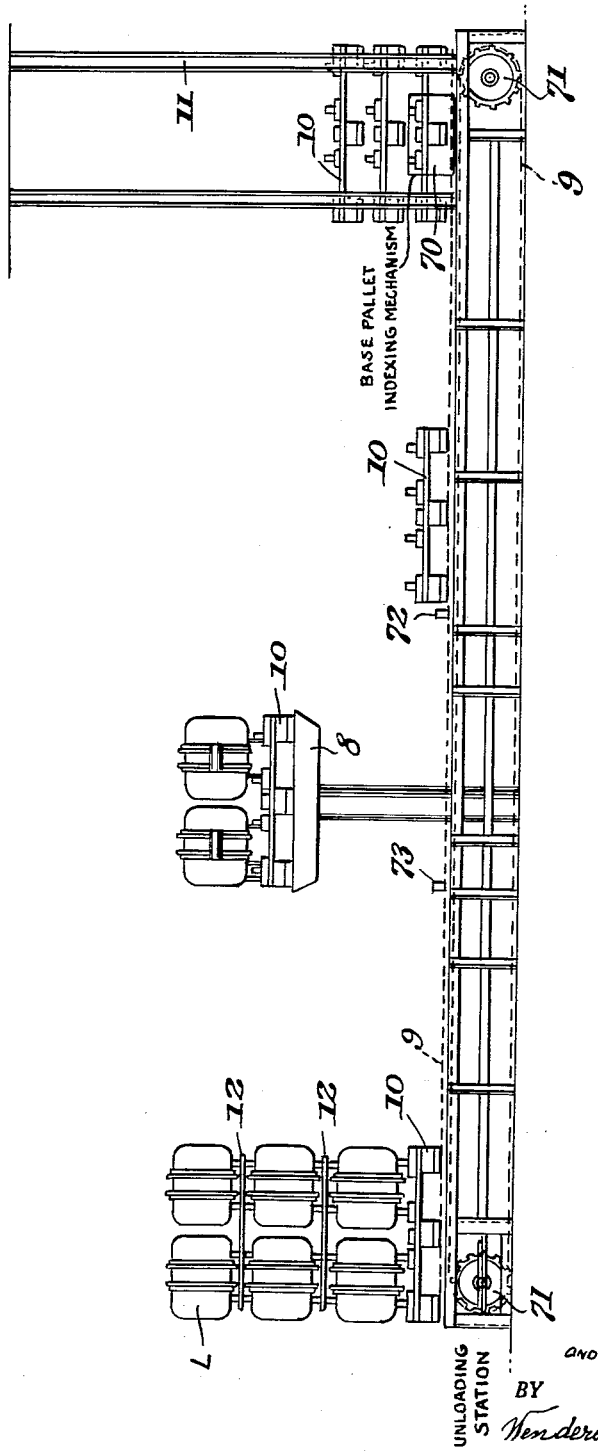

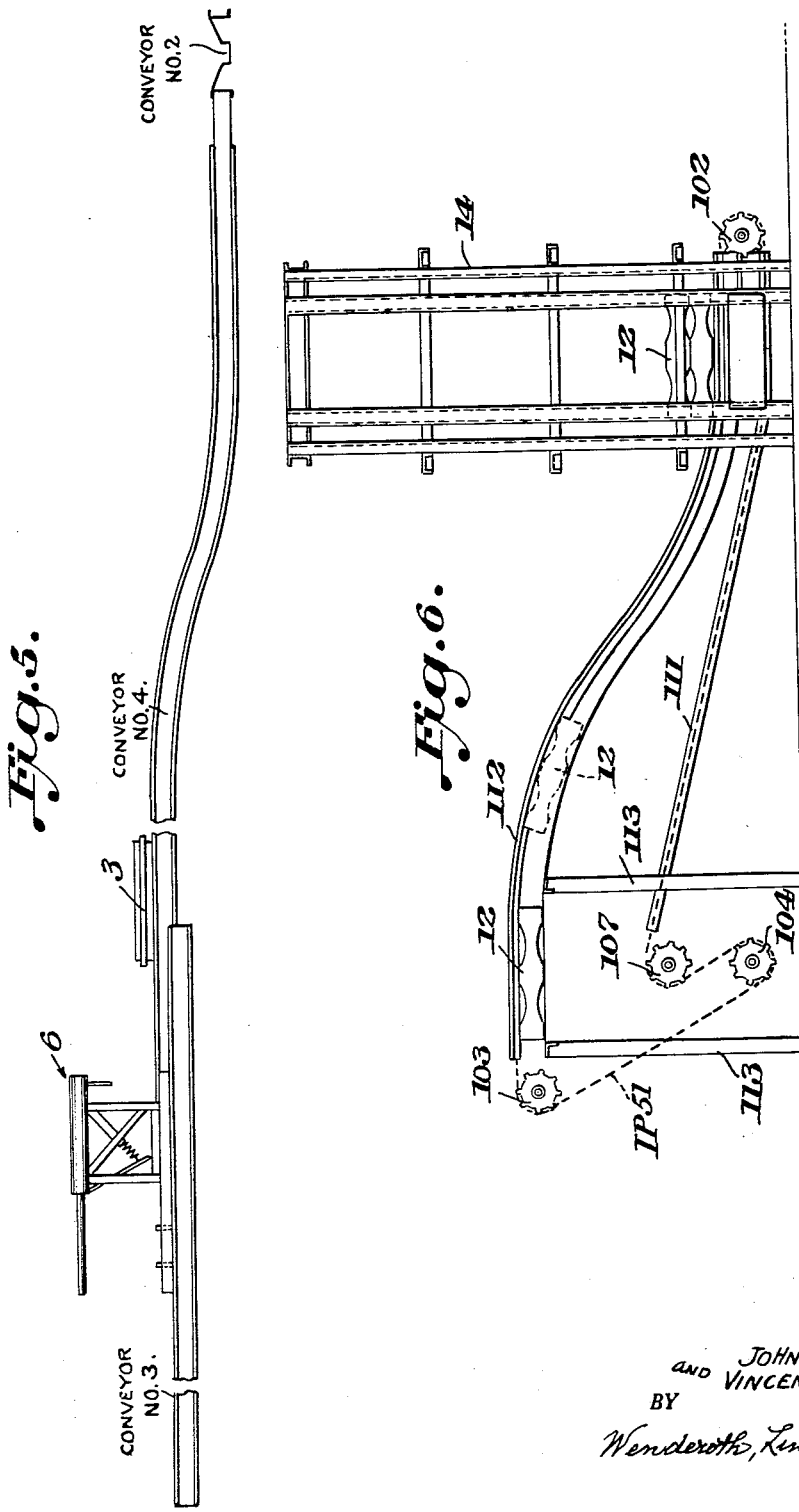

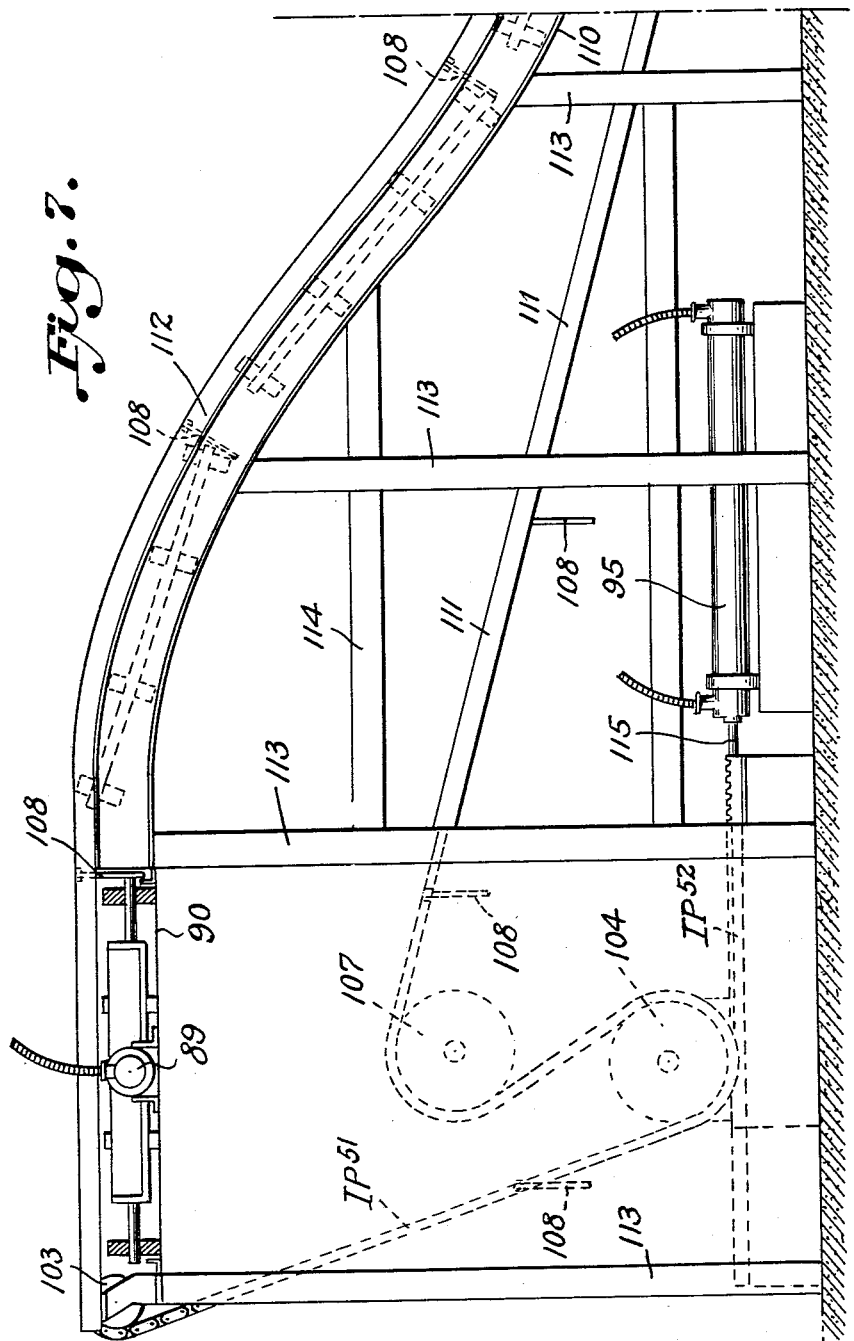

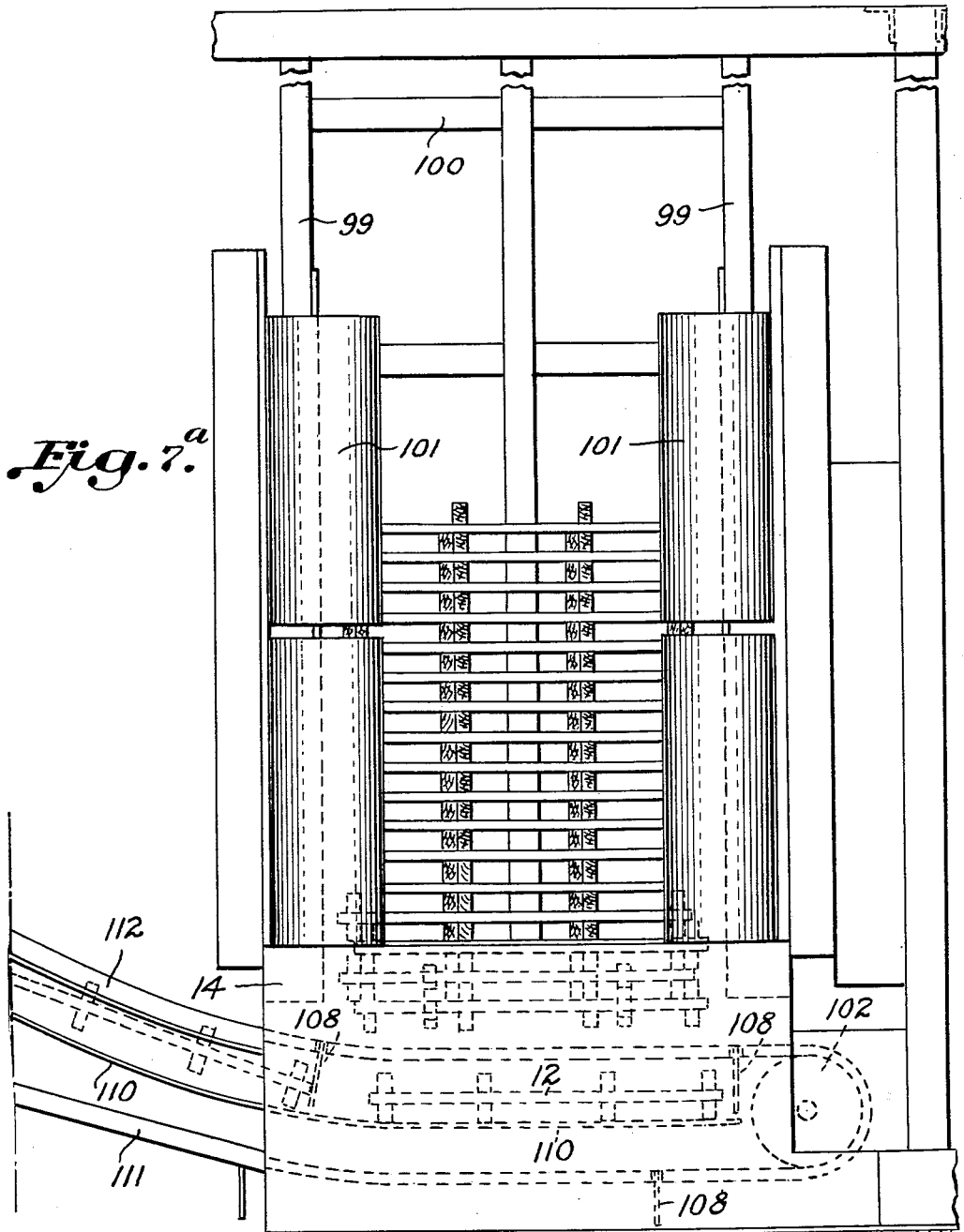

Feb. 27, 1962 J. MILLER ETAL 3,022,617
CONVEYOR KEG PALLETIZING DEVICE
Filed April 1, 1955 45 Sheets-Sheet 11

INVENTOR.
John Miller AND
BY Vincent J. Russoman,
Wenderoth, Lind & Ponack
ATTYS.

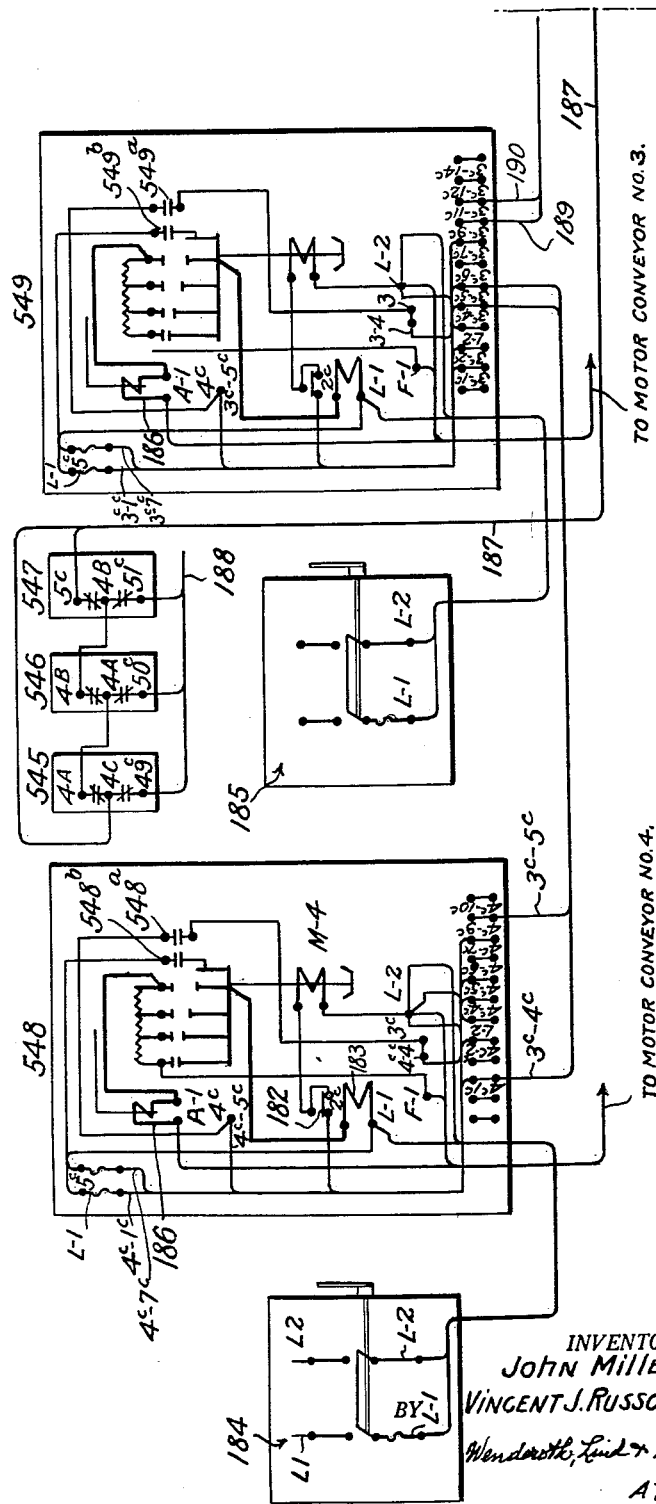

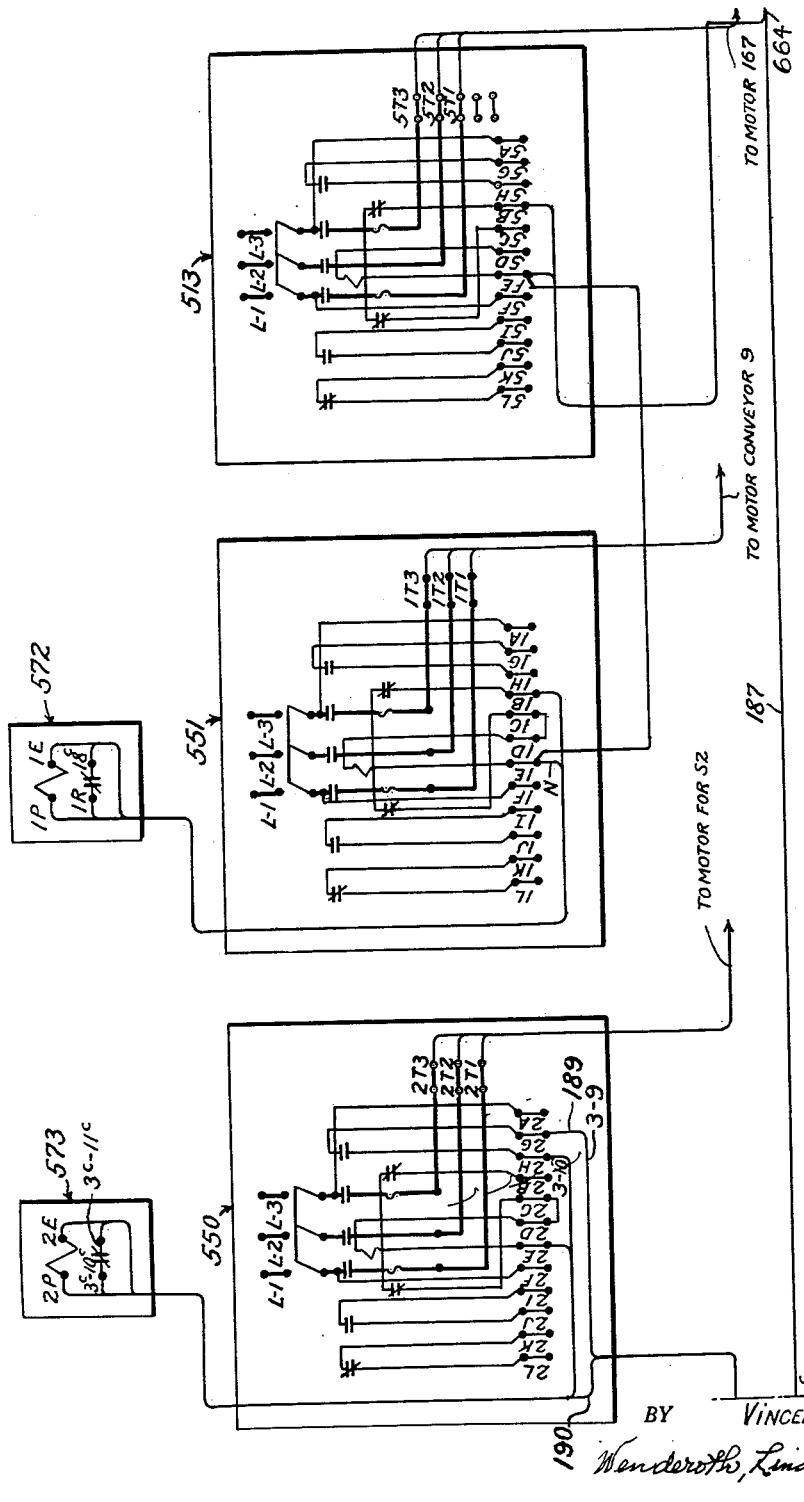

INVENTORS
John Miller AND
BY Vincent J. Russoman,
Wenderoth, Lind & Ponack
ATTYS.

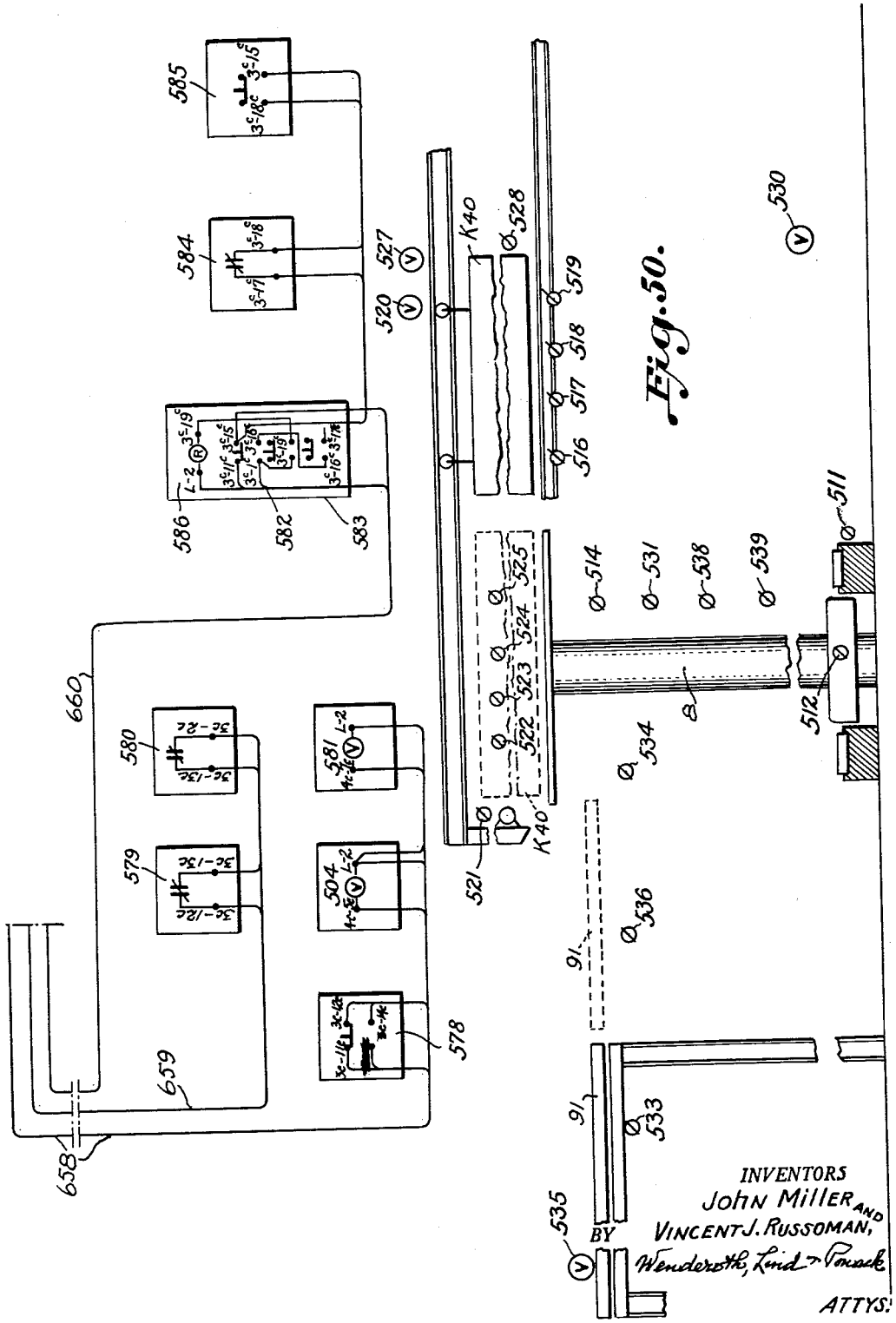

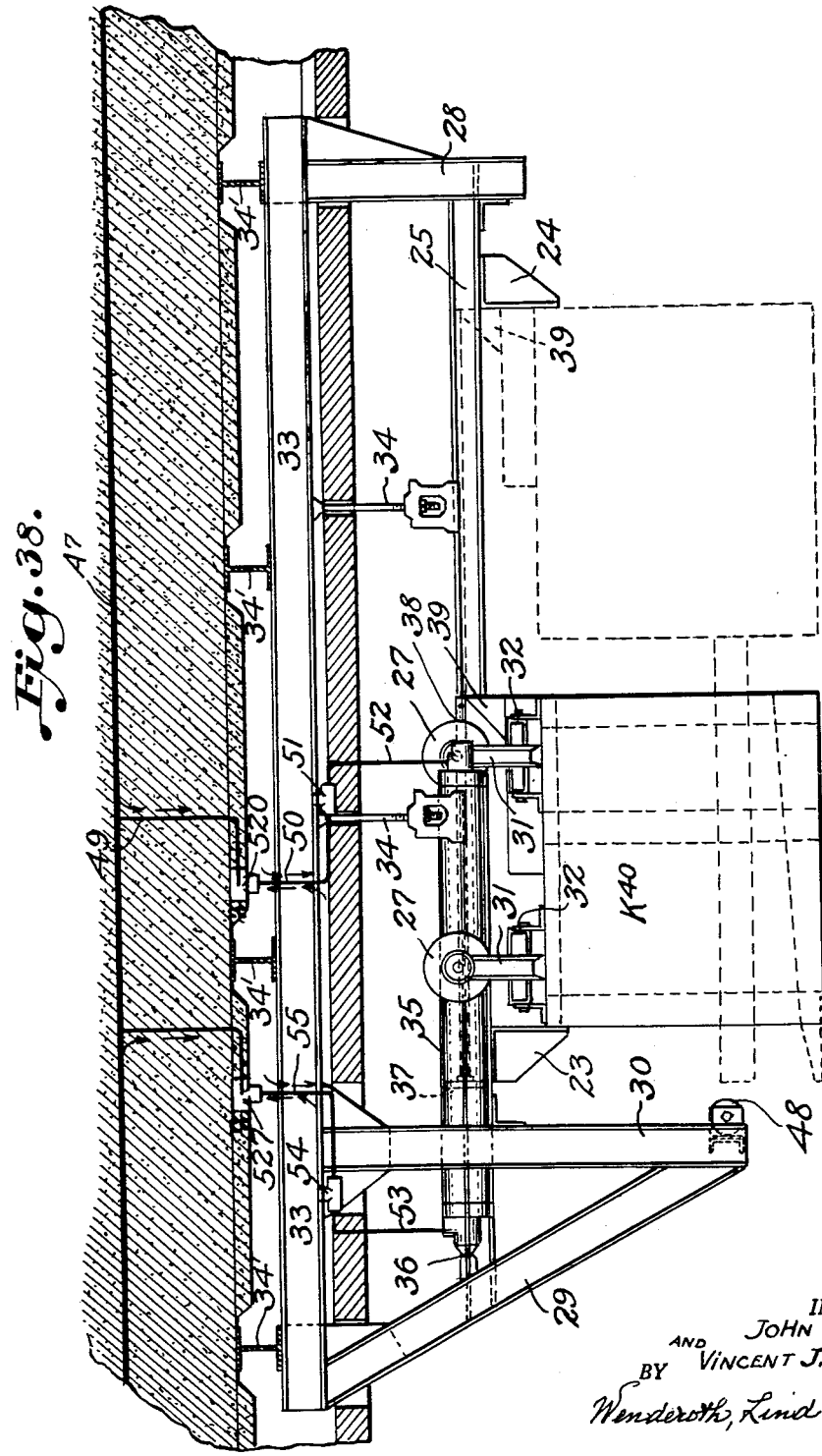

Feb. 27, 1962 J. MILLER ETAL 3,022,617
CONVEYOR KEG PALLETIZING DEVICE
Filed April 1, 1955 45 Sheets-Sheet 19

INVENTORS.
John Miller and
BY Vincent J. Russoman,
Wenderoth, Lind & Ponack
ATTYS.

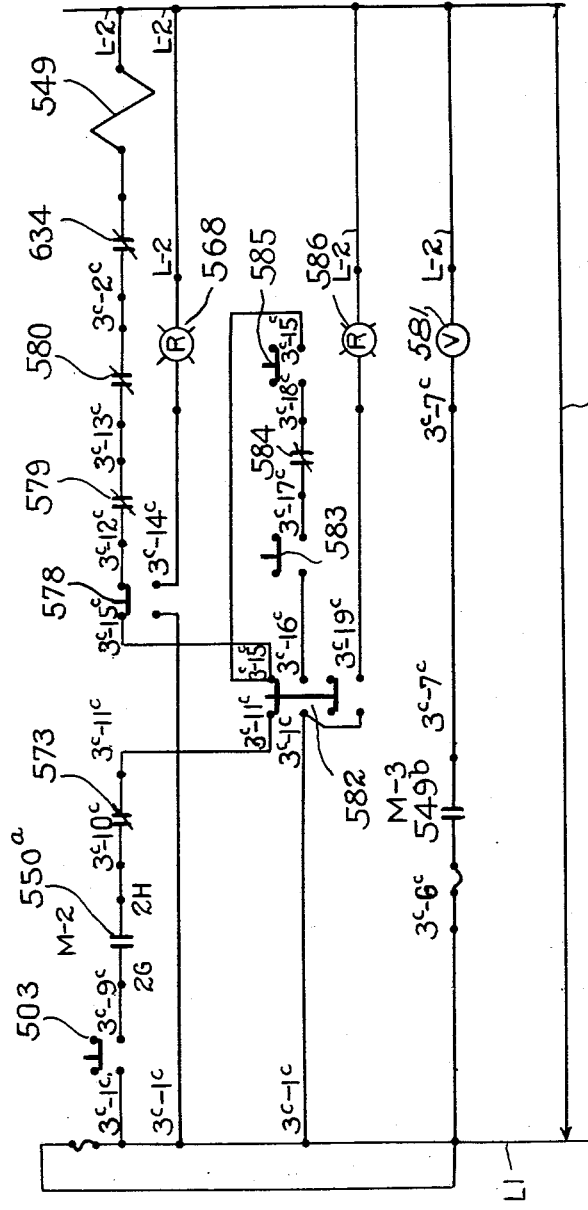

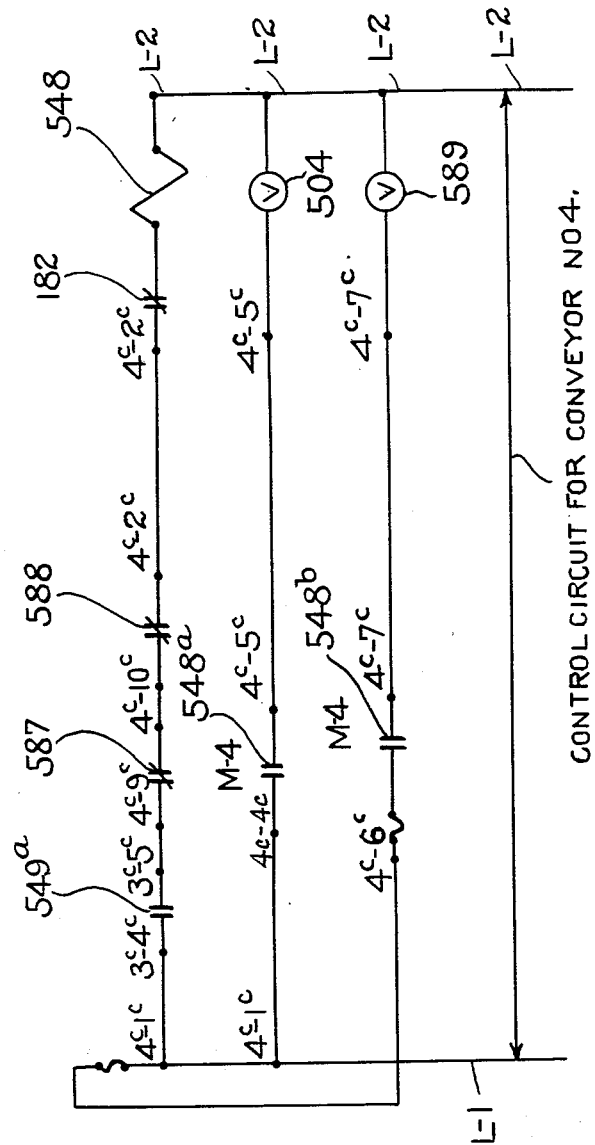

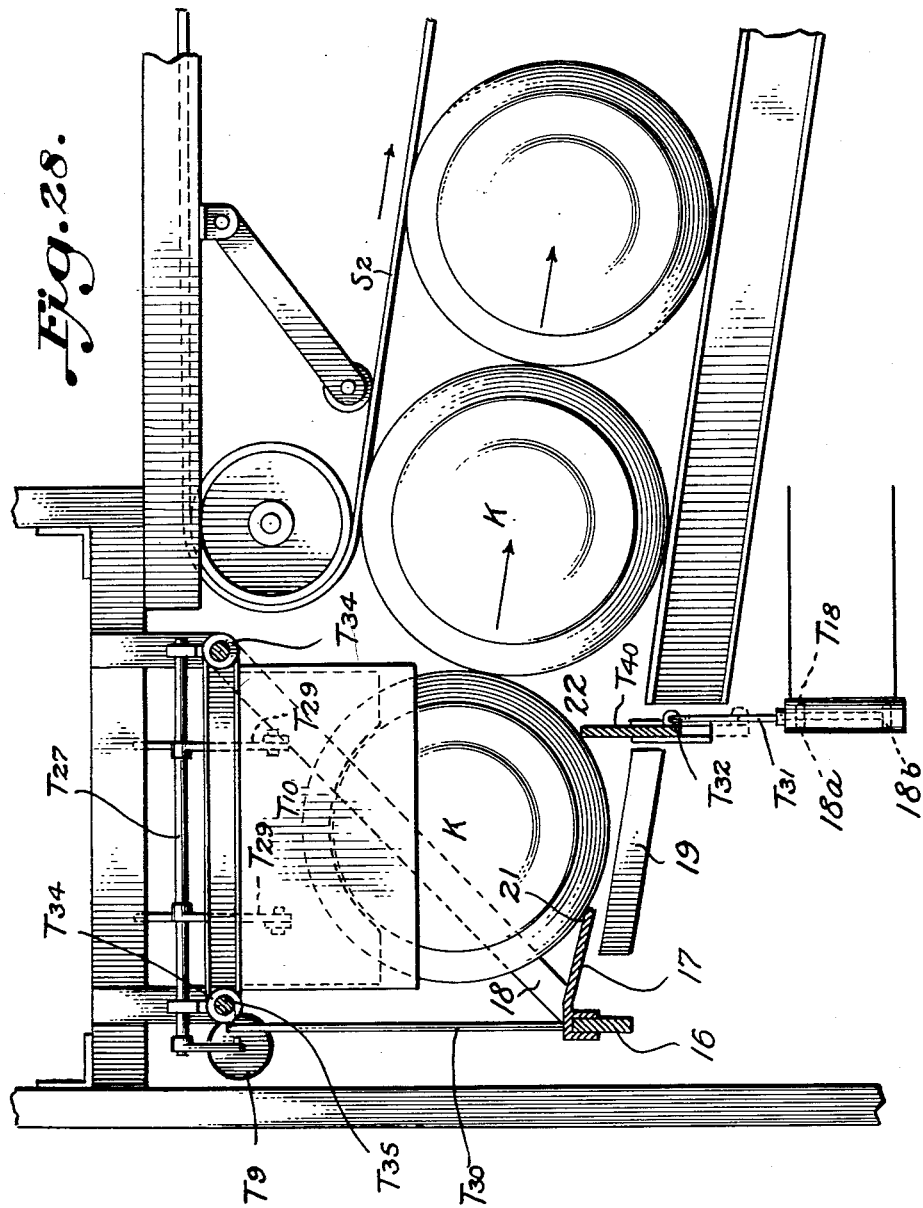

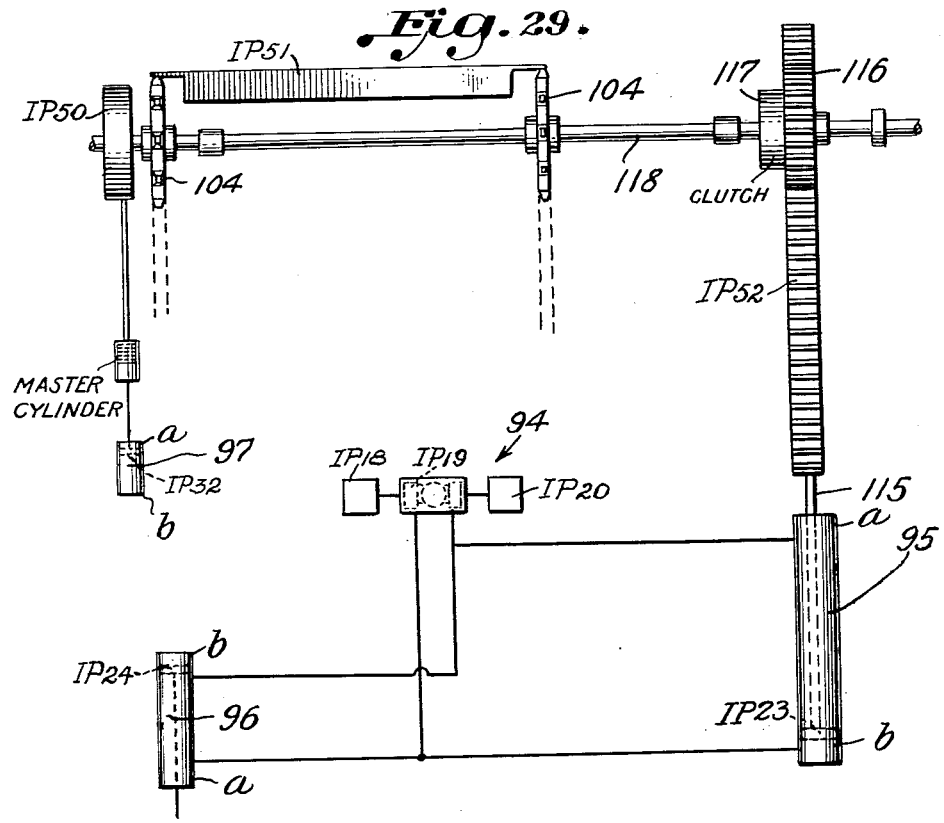
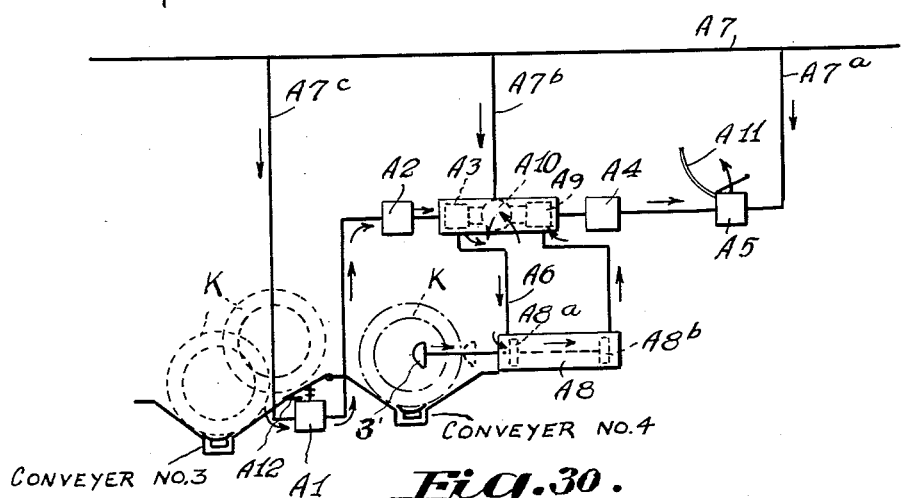

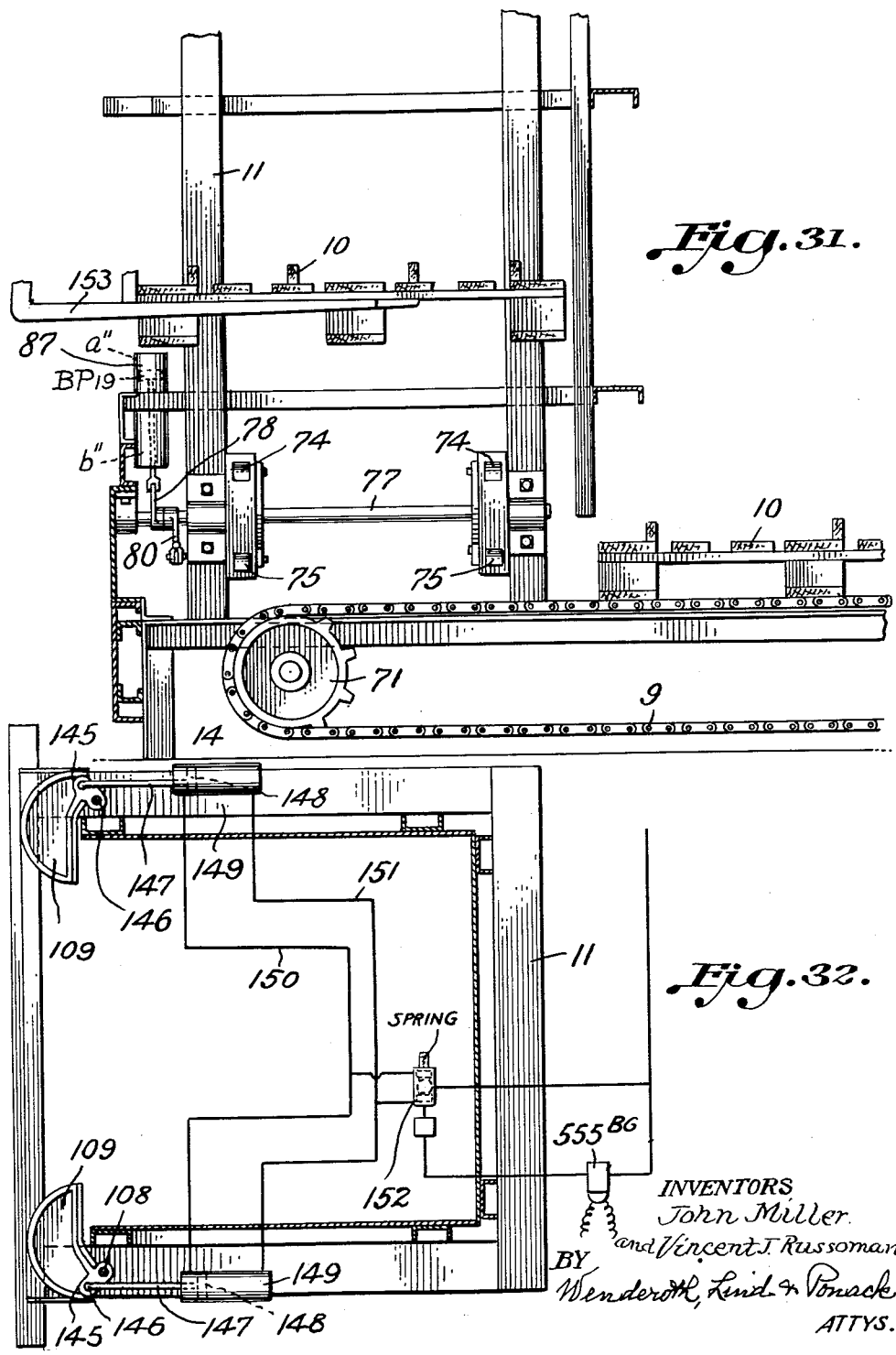

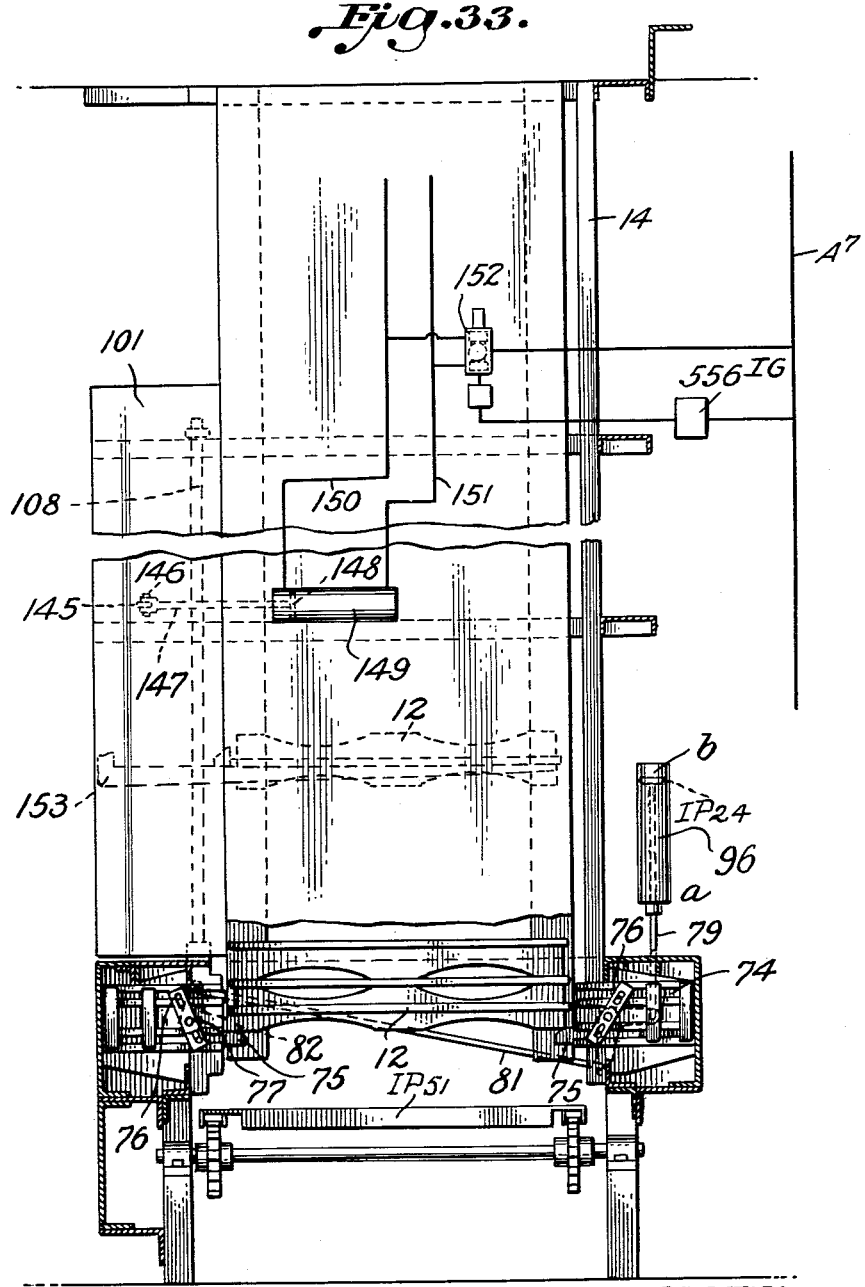

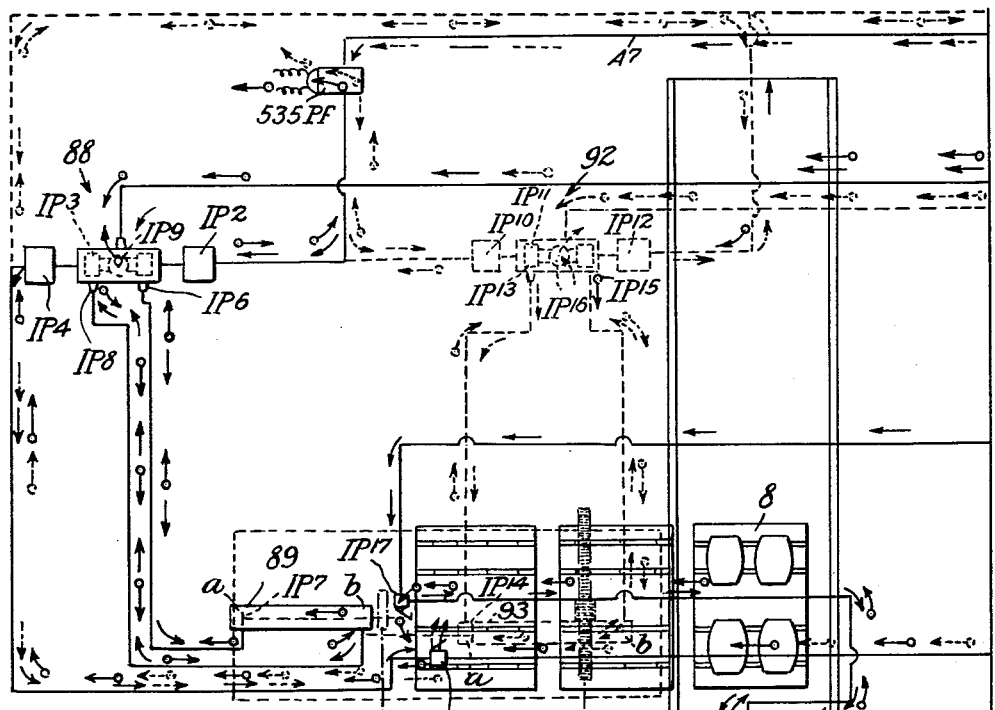
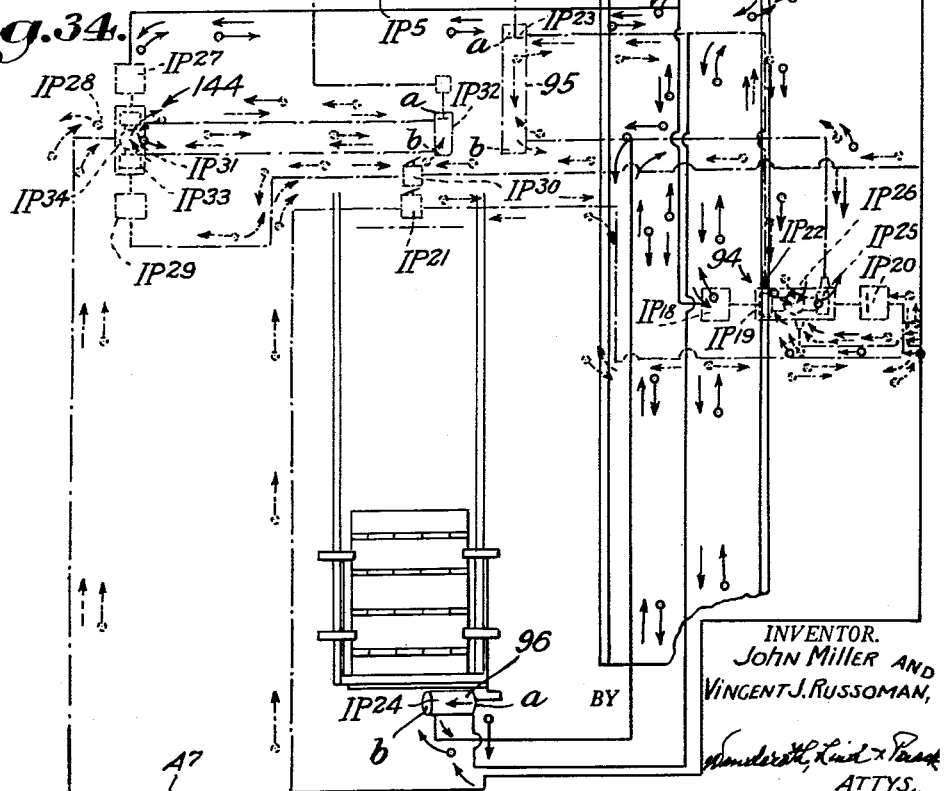
Fig. 34.
INVENTOR.
John Miller AND
Vincent J. Russoman,
ATTYS.

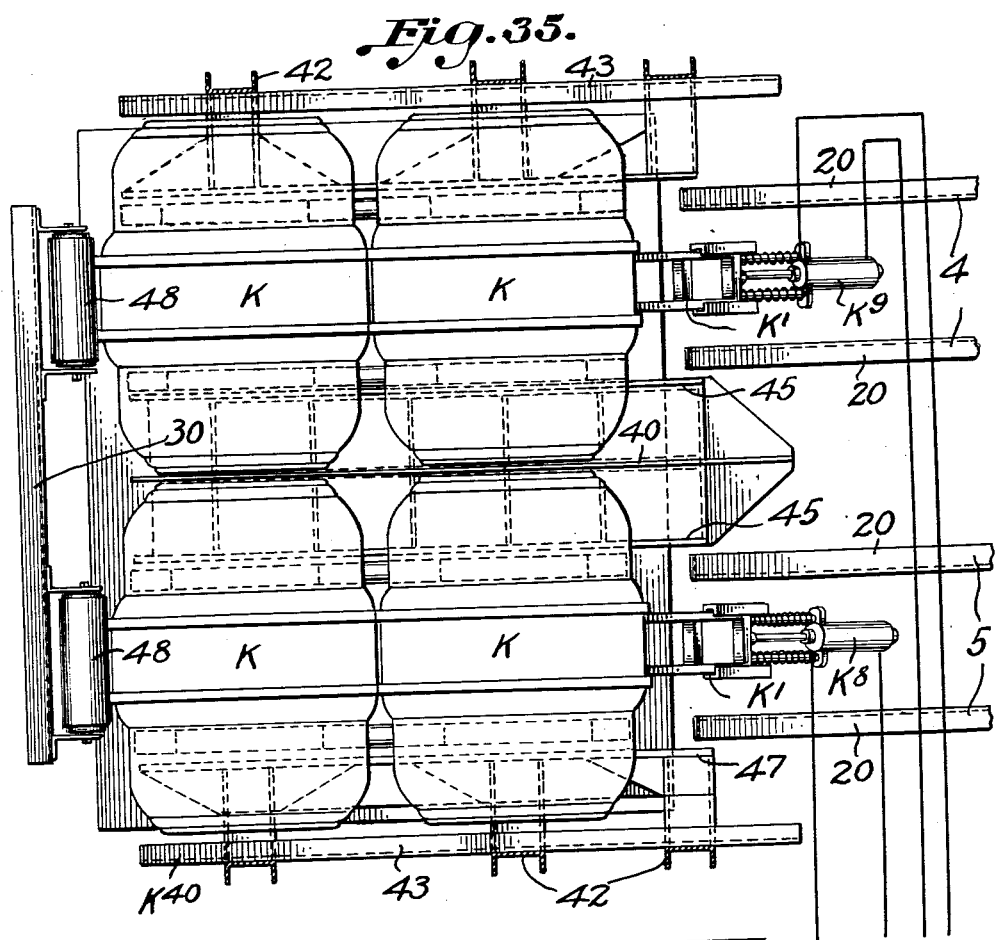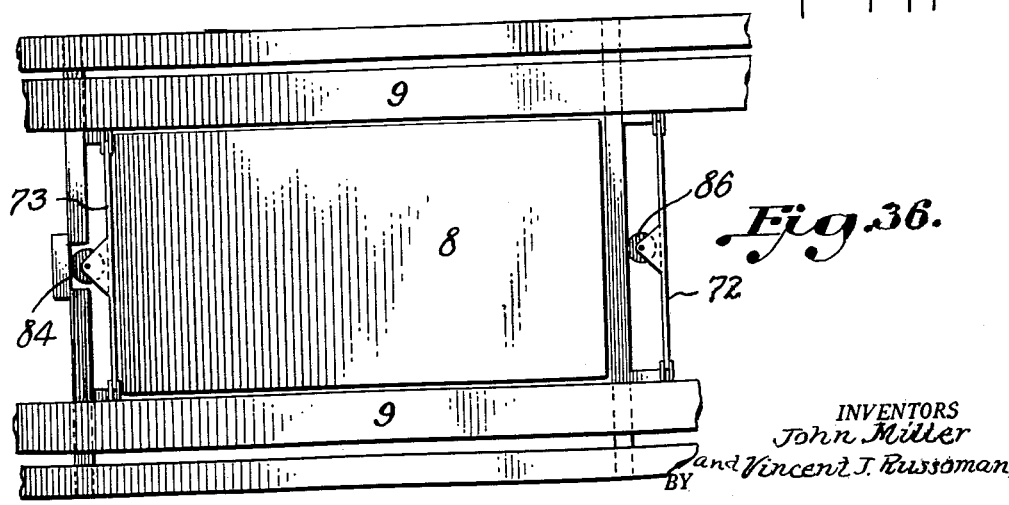

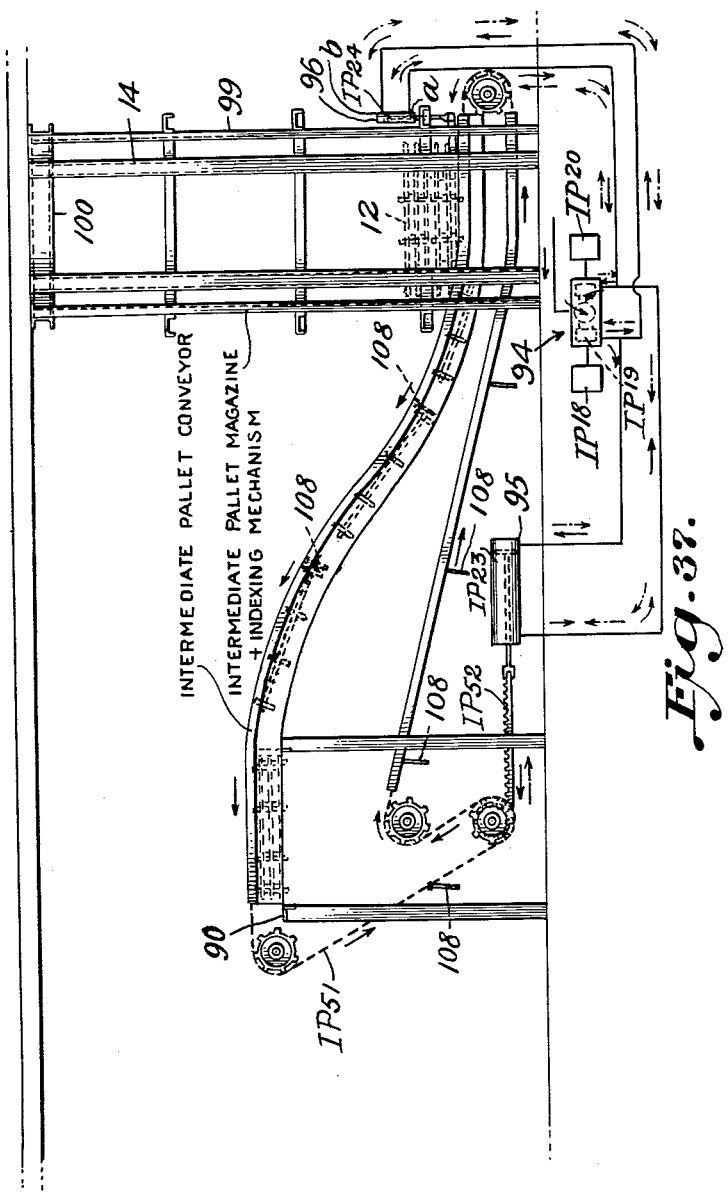

INVENTORS.
John Miller and
BY Vincent J. Russoman.
Wenderoth, Lind & Ponack
ATTYS.

Feb. 27, 1962   J. MILLER ETAL   3,022,617
CONVEYOR KEG PALLETIZING DEVICE
Filed April 1, 1955   45 Sheets-Sheet 32

INVENTORS.
John Miller AND
BY Vincent J. Russoman.

Wenderoth, Lind & Ponack
ATTYS.

Fig. 20.

Feb. 27, 1962 J. MILLER ETAL 3,022,617
CONVEYOR KEG PALLETIZING DEVICE
Filed April 1, 1955 45 Sheets-Sheet 36

INVENTORS
John Miller
and Vincent J. Russoman.
BY
Wenderoth, Lind & Ponack
ATTYS.

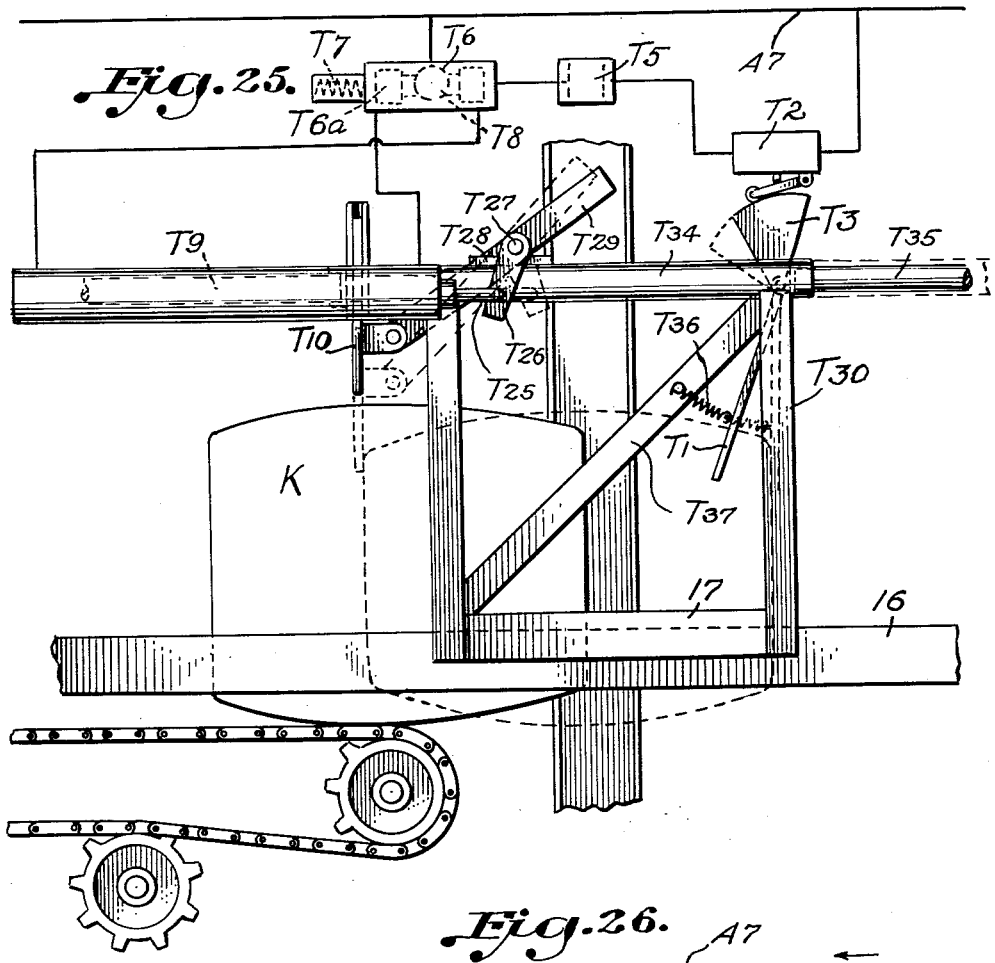

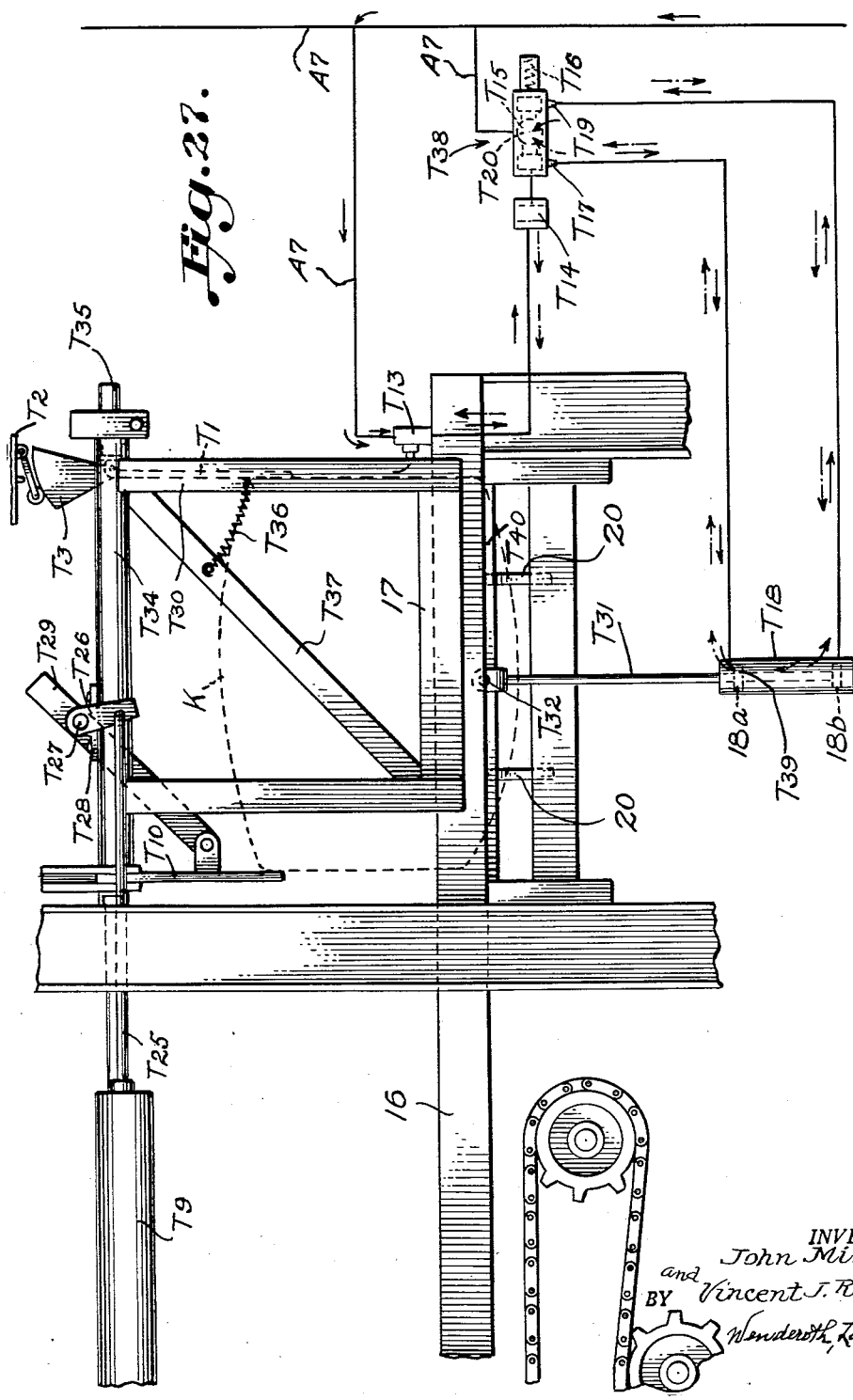

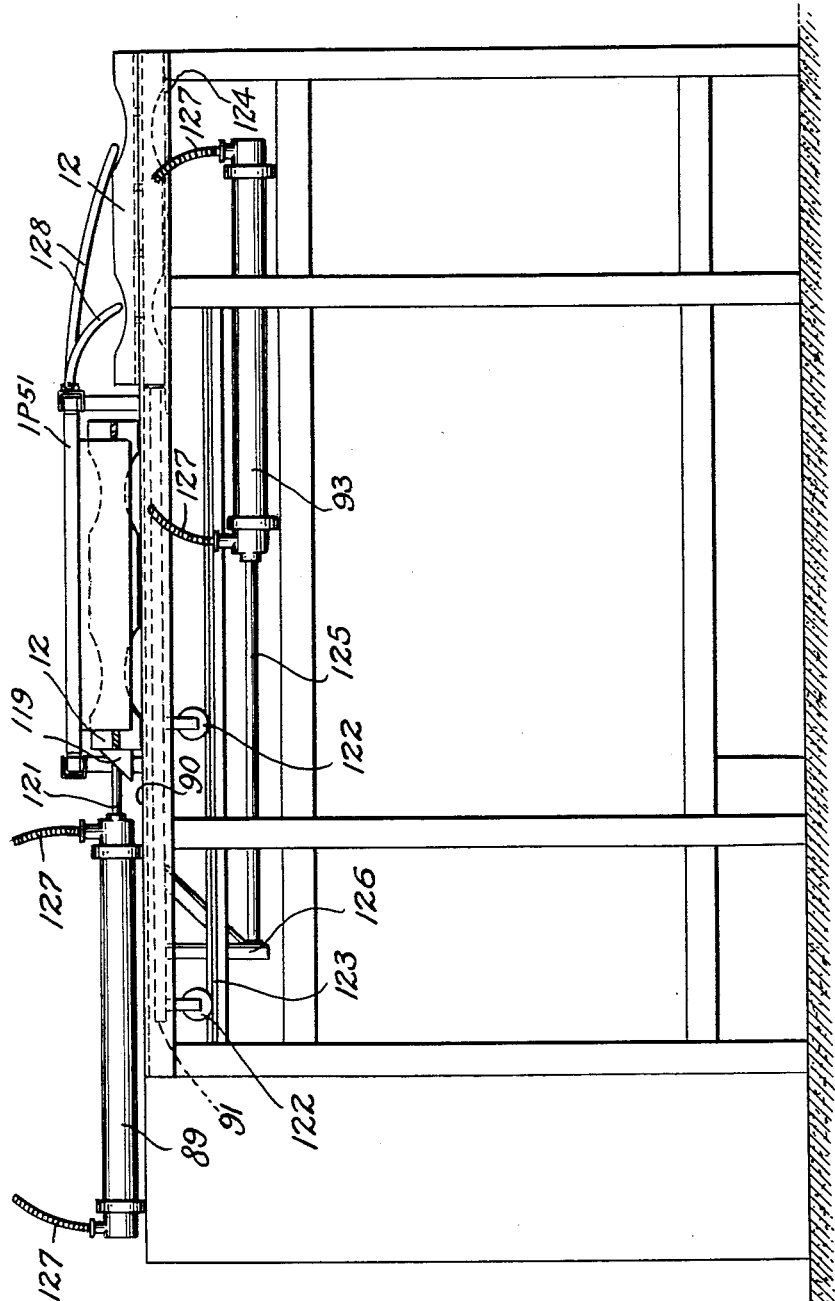

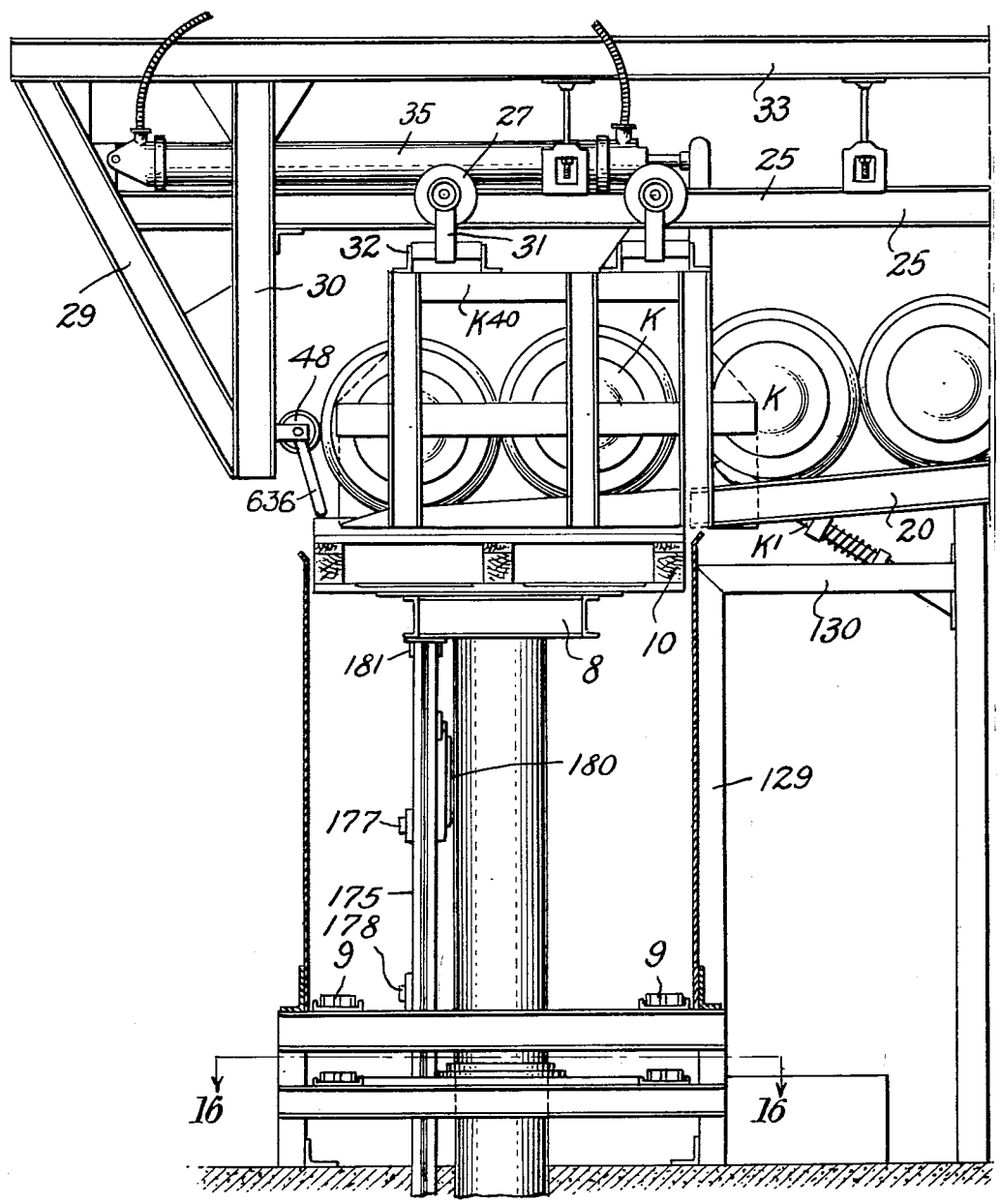

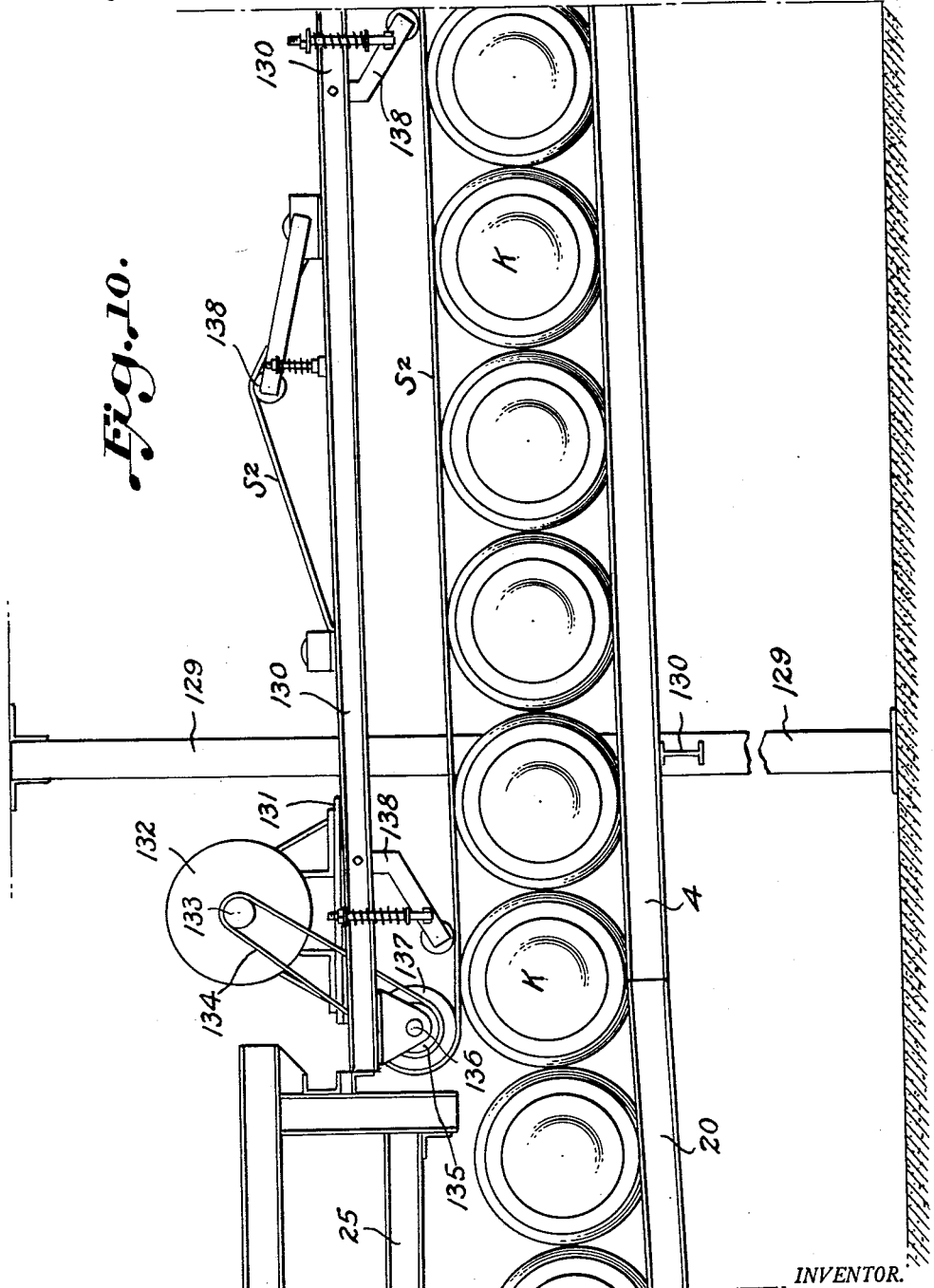

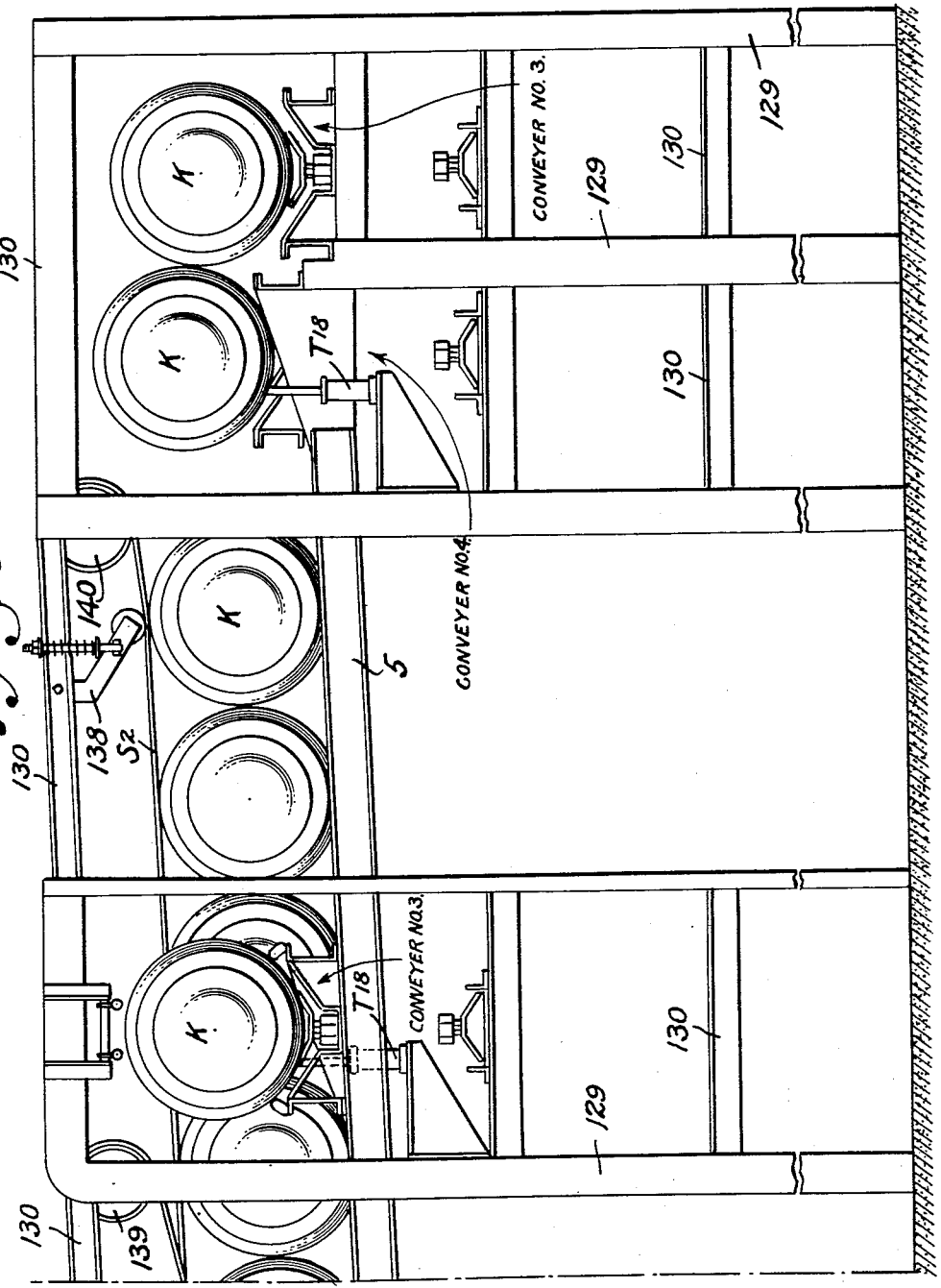

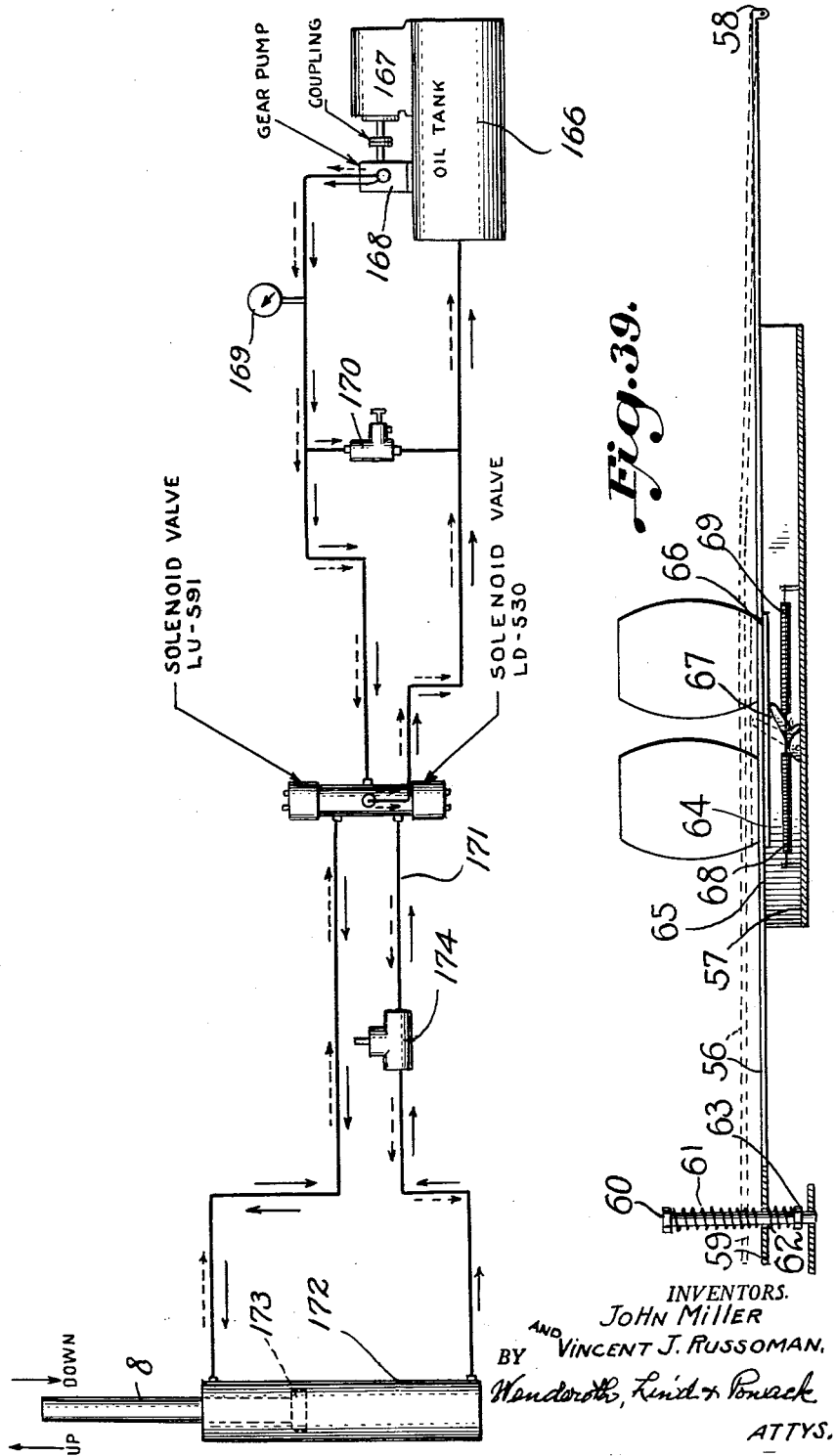

Feb. 27, 1962    J. MILLER ETAL    3,022,617
CONVEYOR KEG PALLETIZING DEVICE
Filed April 1, 1955    45 Sheets-Sheet 44

INVENTORS.
JOHN MILLER,
AND VINCENT J. RUSSOMAN,
BY Wenderoth, Lind & Ponack
ATTYS.

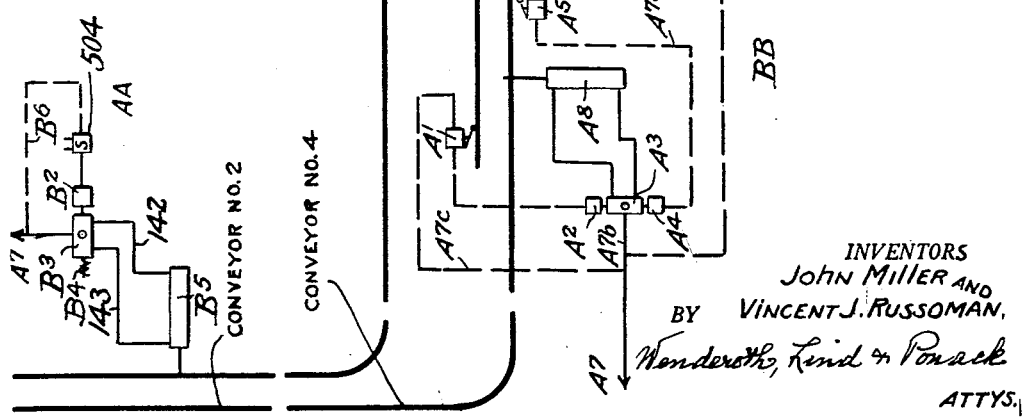

United States Patent Office 3,022,617
Patented Feb. 27, 1962

3,022,617
CONVEYOR KEG PALLETIZING DEVICE
John Miller, Cambria Heights, N.Y., and Vincent J. Russoman, Nutley, N.J., assignors to The F. & M. Schaefer Brewing Co., Brooklyn, N.Y.
Filed Apr. 1, 1955, Ser. No. 498,646
46 Claims. (Cl. 53—59)

This invention relates to an automatic keg palletizing machine particularly adapted for stacking barrels or kegs into unit loads, whereafter the unit loads are conveyed to a storage area or to a transportation station for the delivery of the barrels or kegs to the user.

The invention is particularly useful in the brewing industry, the chemical industry and the oil industry wherein there is frequent need for the cleaning of barrels and kegs and the filling thereof with liquids which require special handling either because they are intended for human consumption or because they are corrosive, toxic or dangerous.

An object of the invention is to provide a machine which is capable of expeditiously handling rather heavy barrels or kegs from a cleaning and/or filling station to an ultimate storage station or transportation station such as a railroad car, motor vehicle, trailer or truck from which such barrels or kegs and their contents are delivered to the user.

A further object of the invention is to provide means for the automatic stacking, loading or unloading of the barrels after they have been cleaned and/or filled. It is an essential feature of the invention that the individual barrels or kegs are stacked by means of automatic machinery, upon pallets, particularly adapted for the stacking and tiering such barrels to provide palletized unit loads which are readily transported by automatic or semi-automatic mechanical handling equipment to the desired station.

A further object of the invention is to provide a keg palletizing machine, which, in a preferred embodiment, palletizes the barrels to form units which contain four kegs or barrels in each tier and in which two or three tiers are assembled. Physical limitations of either the kegs or barrels being handled or the location for the machine would determine the number of kegs per tier and the number of tiers assembled on one base pallet.

In a brewery, the proper sized kegs arer filled when in the horizontal or vertical position in the wash house with about 7, 15 or 31 gallons of beer and such kegs which generally have a bowed shape are not too stable when they are rolled. It is an object of the invention to provide a mechanism capable of handling and manipulating such unstable items.

In accordance with the invention a stable palletized load which is attained through the use of a special dished base pallet and intermediate dished pallets permits semi-automatic or automatic handling of the unit load for loading a storage room or vehicle. Although the kegs are unstable because of their outer geometry and because of the dents which develop during use in metal kegs particularly, thereby making the handling of the keg increasingly difficult, the stacking and tiering of the kegs according to the invention establishes a mechanically stable unit load which greatly simplifies the loading or unloading operation for transportation or storage.

In forming the unit load with the machine of the present invention, kegs are delivered by conveying equipment onto two transfer mechanisms which laterally position and feed the kegs to two special belt powered skid conveyors which, with guides, supply them to a reciprocating main transfer carriage for deposit and orientation on special pallets. The machine could be expanded to have any number of belt powered skids in accordance with different size kegs or packages with consequent modification to the receiving pallets. The reciprocating transfer carriage telescopes into the belt powered skid conveyors, permitting the main pallet lift to drop a tier height without interference. It leaves this retracted position and extends out over the empty pallet, thereby forming a rigid extension to the powered skids along which the kegs may roll into their proper position. Keg skid stops serve to prevent the kegs from moving forward or backward at the palletizing station. A hydraulically controlled and cooperating electrically controlled operation is carried out automatically or semi-automatically from the initial single conveyor transporting operation to the ultimate storage or delivery operation. Gates are provided in a base pallet unit which unit includes a base pallet magazine to feed the bottom pallet for each unit load, and an indexing mechanism to assist in the control and registering of the unit loads which are formed. Likewise an intermediate pallet unit is provided with an indexing mechanism and hydraulically and pneumatically operated control devices serve to position the intermediate pallets between successive vertical tiers in the automatic operation of the main keg carriage and keg skid stops.

When the kegs are palleted in the brewery the bungs or corks must be on the outside of the unit load in order to fix the tax stamp to the bung. Accordingly, the keg transferred by the alternating brush-off mechanism to the second conveyor is turned around by suitable mechanism and construction to place it in the proper position for the transfer mechanism so that when it is rolled down the skids the cork thereof is in proper position at the outside of the unit load to be formed.

A still further object of the invention is to provide an automatic conveying and tiering mechanism particularly suitable for forming unit palletized loads of kegs and barrels tiered on a dished base pallet and one or more intermediate dished pallets, said mechanism comprising at least one pair of conveyors to bring the kegs to transfer mechanisms which serve to release the kegs for rolling down skids to a pallet positioned on a hydraulic pallet lift. The hydraulic pallet lift can retract and transfer the palletized load to a full pallet conveyor and pallet magazines associated with conveyors are adapted to deliver pallets to said lift.

A further object of the invention is to provide an automatic conveying and tiering device particularly suitable for forming unit palletized loads of kegs and barrels tiered on a dished base pallet and one or more intermediate dished pallets, said device comprising a transfer unit which serves to orient and release the kegs from said conveyors in end to end position for rolling down a skid and retractable fingers cooperating therewith for selectively releasing a pair of kegs which are to be positioned in proper position onto the supporting pallet therefor.

A further object of the invention is to provide an automatic conveying and tiering device particularly suitable for forming unit palletized loads of kegs and barrels tiered on a dished base pallet and one or more intermediate dished pallets, said device comprising means for simultaneously advancing kegs on two conveyors, the kegs on one of said conveyors being presented to its transfer mechanism with the keg bung to the rear while the other of said conveyors travels a path so as to present the kegs thereon to its transfer mechanism with the bung to the front so that the kegs so positioned may roll with the bungs correctly positioned down skids for palletizing.

A further object of the invention is to provide an automatic conveying and tiering device particularly suitable for forming unit palletized loads of kegs and barrels tiered on a dished base pallet and one or more intermediate dished pallets with a pallet magazine and a pallet conveyor which delivers pallets to a hydraulic lift which receives properly oriented kegs which roll down by gravity to form a tiered load on the pallets.

A further object of the invention is to provide an automatic electrical and hydraulic control system which is suitable for the synchronization of the conveyors which introduce the kegs to the keg transfer mechanisms, controls the feed of kegs from the transfer mechanism to the hydraulic lift, controls the feed of pallets from the pallet magazines for unit loads of palletized kegs tiered two or three high, controls the hydraulic lift and controls the removal of the full pallet to either a storage station or a delivery station.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

In connection with that more detailed description, there is shown in the drawings, in FIGURE 1, a diagrammatic view in plan of a portion of the keg palletizing device.

FIGURE 2 is a similar view of the remainder of the keg palletizing device.

FIGURE 3 is an elevational view taken on section line III—III of FIGURES 1 and 2.

FIGURE 4 is an elevational view taken approximately along section line IV—IV of FIGURE 2.

FIGURE 5 is a diagrammatic view showing a portion of the conveyor system used taken on line V—V of FIGURE 1.

FIGURE 6 is a side elevational view of the intermediate pallet magazine and the feed therefrom taken approximately on the line VI—VI of FIGURE 2.

FIGURE 7 is an enlarged elevational view with additional details of the construction shown at the left of FIGURE 6.

FIGURE 7a is a similar view of the right hand side of FIGURE 6.

FIGURE 8 is an elevational side view of the means for feeding intermediate pallets upon kegs positioned upon the lift.

FIGURE 9 is an elevational view illustrating the positioning of the kegs upon the lift by the main carriage.

FIGURE 10 is a continuation of the showing in FIGURE 9 to the right thereof.

FIGURE 11 is a similar view continuing the showing of FIGURE 10 to the right thereof and illustrating particularly the feeding of the kegs towards the skids leading to the lift.

FIGURE 12 is a diagrammatic view illustrating the hydraulic means for raising and lowering the lift with the controls therefor.

FIGURE 17 is a partial diagrammatic view of the pneumatic circuits utilized in operating various mechanisms in the palletizing device.

FIGURE 19 is a continuation of the showing in FIGURE 18 to the right thereof.

FIGURE 20 is a side elevational view with controls diagrammatically illustrated showing particularly the base pallet conveyor, lift, full pallet conveyor, associated elements and controls therefor.

FIGURE 25 is a side elevational view of a transfer mechanism with the controls therefor diagrammatically illustrated.

FIGURE 26 is a diagrammatic view of the controls for a transfer mechanism.

FIGURE 27 is an elevational view of a transfer mechanism with a diagrammatic showing of the controls therefor.

FIGURE 28 is an end elevational view of a transfer mechanism illustrating particularly the means whereby kegs are fed to the skids leading to the lift.

FIGURE 29 is a partial diagrammatic view and plan view of elements of the intermediate pallet feed and the controls therefor.

FIGURE 30 is a diagrammatic view of the controls for the alternating brush-off mechanism.

FIGURE 31 is a side elevational view of the base pallet magazine and some of the controls therefor.

FIGURE 32 is a plan view of the base pallet magazine together with a diagrammatic showing of the controls for operating the gates of such magazine.

FIGURE 33 is an elevational view of the intermediate pallet magazine together with a diagrammatic showing of the controls therefor and a cross-sectional view of the fingers and cooperating elements for releasing individual pallets at the bottom thereof.

FIGURE 34 is a diagrammatic view of the hydraulic and pneumatic operation of the intermediate pallet unit.

FIGURE 35 is a top plan view of the main keg carriage together with the skid stops and a diagrammatic showing of the means for operating the skid stops.

FIGURE 36 is a top plan view of the lift and the gates controlling the movement of base pallets to such lift and the movement of a full palletized load from said lift.

FIGURE 37 is a side elevational view of the intermediate pallet conveyor and magazine together with a diagrammatic view of the control means therefor.

FIGURE 38 is a side elevational view with portions in cross-section of the construction of the main carriage and cooperating elements as well as a diagrammatic view of the pneumatic and electrical controls therefor.

FIGURE 39 is a partial horizontal sectional view through the main carriage illustrating particularly the keg straightening device associated therewith.

FIGURE 43 is a diagrammatic view of the control circuit for conveyor No. 3.

FIGURE 44 is a diagrammatic view of the control circuit for conveyor No. 4.

FIGURE 45 is a partial diagrammatic view illustrating particularly the circuits for starting conveyors Nos. 3 and 4 and the switches controlling the air pressure.

FIGURE 46 is a similar view showing particularly the starter circuits for the lift pump, conveyor No. 1 and the skid belt conveyor.

FIGURE 50 is a similar view continuing the detailed circuit diagrams at the bottom of FIGURE 49 showing particularly the various switches associated with the lift, main carriage and intermediate pallet carriage.

Figure 51:
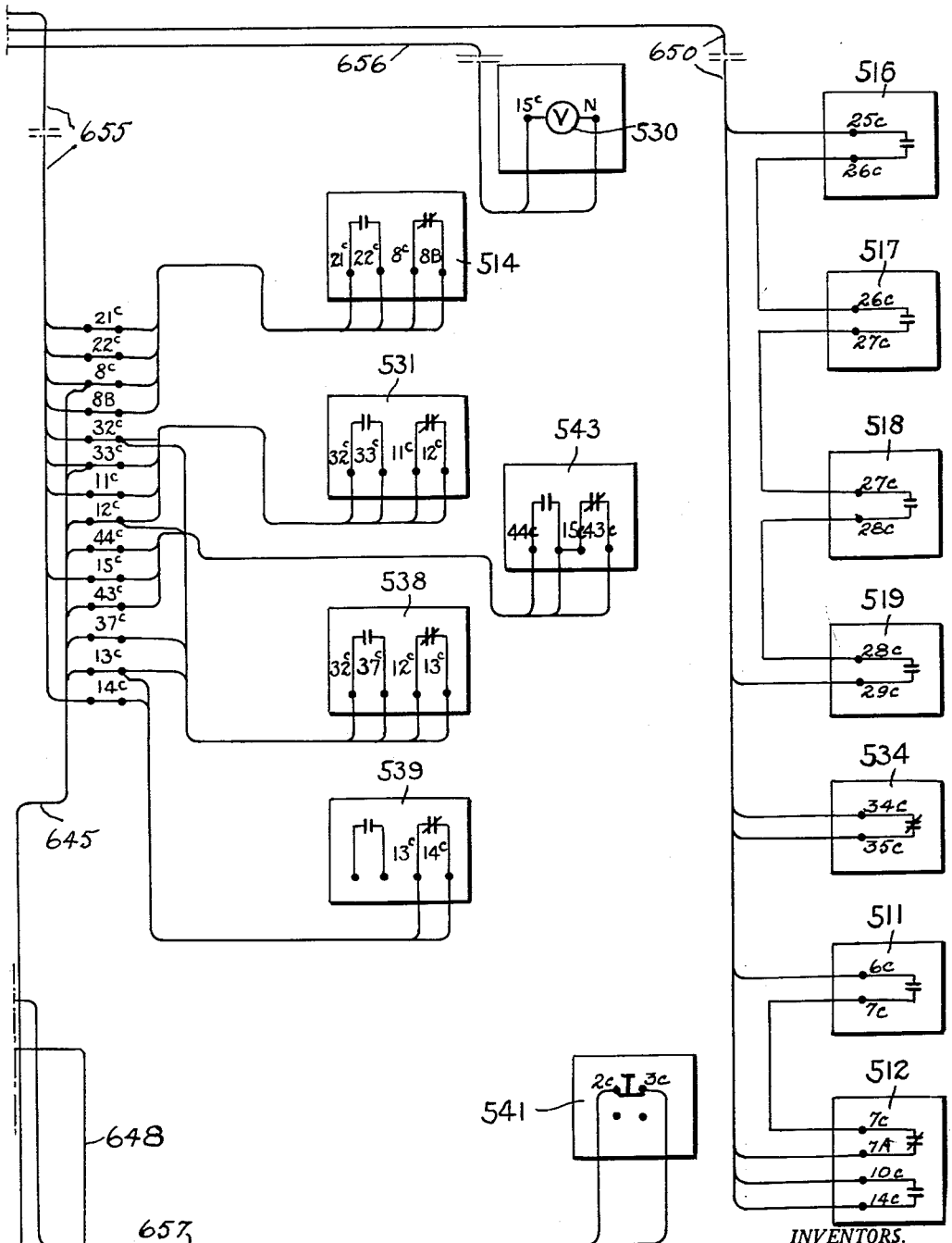
FIGURE 51 is a diagrammatic view of the detailed control circuit to the right of FIGURE 48.

In FIGURES 1 and 2 there is shown a diagrammatic view in plan of the keg palletizing device. The kegs to be palletized are transferred from the racking room at the brewery onto an exit conveyor No. 2 into a pallet room where the device of the invention is constructed. The racking room operation utilizes a carousel conveyor No. 1 to bring the kegs in the desired condition to the exit conveyor No. 2 for movement to the pallet room, and it is convenient to carry out inspection of the kegs going from the racking room at the brush-off mechanism 1. The brush-off mechanism 1 in the racking room cooperating with conveyor No. 1 is controlled by the starter of the electrical motor which drives conveyor No. 2. For convenience, the carousel conveyor diagrammatically partially shown is designated as conveyor No. 1; the exit conveyor to the pallet room is designated as No. 2 in the racking room and as No. 4 in the pallet room, and a conveyor travelling partially parallel to conveyor No. 4 is provided for pairing the kegs to be delivered to the palletizing station, this additional conveyor being designated as conveyor No. 3. This No. 3 conveyor has a turn around section which is shown at 2 in FIG. 1.

When the kegs are palletized in pairs the bungs in the unit load must be readily accessible in order to fix the tax stamp to the bung. In the handling of corrosive or dangerous chemical liquids, the same positioning requirement is to be met in order to insure that the most likely point of leakage, the closure or bung, is checked to insure that the unit load may be safely delivered or stored. This positioning of the kegs or barrels in the unit load is carried out by positioning the bung end to the rear of the direction of travel on conveyor No. 2 in the racking room and conveyor No. 4 in the pallet room. The alternating brush-off mechanism 3 cooperating with conveyor No. 4 transfers the keg in the same bung and travel orientation to conveyor No. 3 where it is turned around at the turn around section 2 and brought to skid 4 opposite skid 5 which leads from conveyor No. 4.

At the junction of conveyor No. 3 and skid 4 a similar transfer mechanism is located indicated generally at 7. The transfer mechanisms 6 and 7 transfer the kegs from the respective conveyors to skids 4 and 5 at predetermined periods and such kegs are released at controlled periods to roll down the skids 4 and 5 to a position where they are subject to the action of main keg carriage K40.

The kegs are then controlled in their movement by the main carriage K40 to the base pallet or intermediate pallet which may be positioned on the hydraulic lift 8. When the unit load has been completed upon the hydraulic lift 8 then the lift is lowered until the unit load such as shown at L in FIGURE 2 is moved towards the unloading station by the conveyor 9.

At predetermined periods a base pallet 10 is taken from the base pallet magazine 11 and fed to its position upon the hydraulic lift 8. Also at predetermined periods which are automatically controlled an intermediate pallet as shown at 12 is taken from the intermediate pallet magazine 14 and fed to the intermediate pallet feed table 15 from which it is fed at right angles by means later described to its appropriate position upon kegs positioned upon the hydraulic lift 8.

There are various controlling mechanisms disposed throughout the overall plan of the invention as above described which will be described more in detail below.

In order to show all of the relevant features of the present invention, the more detailed description of the structure, the new combinations of structures and their coaction which follows hereinafter is set forth under the following headings:

(A) The structure and operation of the brush-off mechanisms.
(B) The structure and operation of the transfer mechanism.
(C) The structure and operation of the main keg carriage and keg skid stops.
(D) The structure and operation of the base pallet unit.
(E) The structure and operation of the intermediate pallet unit.
(F) The hydraulic and pneumatic system.
(G) The electrical control.

The drawings show the essential mechanical elements and the movement of the kegs is readily followed with respect to the structural features under above headings A–E which utilize whenever possible the effect of gravity for such movement. The carriage, pallet magazines, rail elements, supports and other structures are fabricated from standard heavy gauge metal stock. The weight of the pallet load is a ton and upwards so that the equipment is constructed to withstand heavy abuse and a relatively high safety factor is used.

(A) THE STRUCTURE AND OPERATION OF THE BRUSH-OFF MECHANISMS

As shown in FIGURE 1, a brush-off mechanism 1 is provided in the racking room for the lateral transfer of the kegs from conveyor No. 1 to the No. 2 and No. 4 conveyor into the pallet room and an alternating brush-off mechanism 3 is provided cooperating with the No. 4 conveyor in order to provide the properly orientated kegs for delivery to the transfer mechanisms 6 and 7 at the keg skid stations. The brush-off mechanism concerned pushes the keg laterally from the conveyor with which the mechanism cooperates to the other conveyor to which the keg is being transferred and the latter conveyor is preferably at a slightly lower level in order to provide for a smooth transfer operation. The keg is in the same orientation after transfer as before, and the bung to which the tax stamp is to be affixed is at the rear of the keg as it travels from the racking room into the pallet room.

The location of brush-off mechanism 1 is diagrammatically shown in FIGURE 1 and this brush-off mechanism is designed to transfer the kegs from conveyor No. 1 to conveyor No. 2 in the racking room.

The controls for such brush-off mechanism are shown diagrammatically in FIGURE 17. Referring to FIGURE 17, a double acting cylinder is indicated at B5 having a piston connected to the brush-off plate 141 with generally the configuration as shown in plan in FIGURE 1 but any desired shape may be used. A 4-way-single cylinder-spring return valve indicated at B3 in FIGURE 17 is connected to the main air line A7. A branch line B6 extends from the main air line A7 to the 3-way solenoid valve 504 for operating the piston in cylinder B2 of the valve B3. The return spring for the valve stem of the valve B3 is shown at B4.

When the solenoid valve 504 is operated air will be admitted to the cylinder B2 of the valve B3 thereby forcing the valve stem to the left as shown in FIGURE 17 and allowing air to enter the air line 142 to the double acting cylinder B5 which causes the piston thereof to move towards the left bringing the brush-off plate 141 into the path of the kegs travelling upon conveyor No. 1 and transferring them to conveyor No. 2. When the solenoid valve 504 is deactivated the return spring B4 will return the valve stem towards the right in valve B3 allowing air from the main line A7 to enter the branch air line 143 thereby returning the piston in cylinder B5 towards the right in FIGURE 17 which withdraws the plate 141 from the path of the kegs upon conveyor No. 1.

The structure and operation of the hydraulic operated alternating brush-off mechanism 3 will now be set forth, reference being made to FIGURES 5, 17 and 30 which show diagrammatically the structural features and controls of this mechanism.

The main air supply A7 feeds the fluid under pressure through branches A7a, A7b and A7c to the operating components. 3-way poppet valve A5 is fed from branch line A7a. Cylinder A4 is connected in series with the 3-way poppet valve A5 and is also connected to valve stem A3. A 4-way valve-double cylinder assembly constituted by cylinder A4, valve stem A3, cylinder A2 is connected to the double acting cylinder A8. The keg K upon passing the arm A11 depresses it and through the poppet activating mechanism operates 3-way poppet valve A5 to admit air through branch line A7a into cylinder A4. This forces valve stem A3 to the left as shown in FIGURE 30 and in turn air is forced out of cylinder A2 and exhausted through an exhaust valve A1 connected in series thereto. At the same time, port A9 is opened and air through branch A7b forces the piston in cylinder A8 from position A8b to A8a, and port A6 is opened to exhaust air through port A10.

The movement of the piston in cylinder A8 forces the member 3' against the keg K. The member 3' has preferably the configuration of the brush-off arm 3 as shown in FIGURE 1 although it may have any desired configuration which will accomplish the purpose sought. Also the arm 3 may be pivoted at one end with the piston of the cylinder A8 acting at the other end.

This action of the piston in cylinder A8 pushes the keg from one conveyor to the other. The keg K which is thus moved from conveyor No. 4 to conveyor No. 3 engages plate A12 directly after leaving conveyor No. 4 which actuates 3-way poppet valve A1. Poppet valve A1 supplied by air from branch line A7c admits air from the main air supply line A7 to cylinder A2, and valve stem A3 is forced to the right as seen in FIGURE 30 to admit air into cylinder A8, the air being exhausted through valve A5. The actuation following from the direction of the hydraulic fluid is shown in accordance with the arrows in FIGURE 30. The movement of valve stem A3 is accompanied by the opening of port A6 to the main air supply A7, and the piston in cylinder A8 is thus forced over from the position A8a to position A8b. Port A9 is opened to exhaust port A10.

As will be undertsood, the continuation of the automatic operation on the conveyors results in the positioning of many kegs so that these kegs are backed up one against the other, the number of kegs so backed up being a matter of choice which can be controlled by lengthening the approaches to the skids as desired, it being understood that a slight downward incline in the approaches is preferred in order to maintain a proper rolling operation.

(B) THE STRUCTURE AND OPERATION OF THE TRANSFER MECHANISM

Every alternate keg on conveyor No. 4 is transferred as heretofore explained by a lateral pushing onto conveyor No. 3 which brings the kegs in proper bung position to the transfer mechanisms 6 and 7 for transfer to skids 4 and 5 from conveyors Nos. 3 and 4.

In FIGURES 17 and 25 to 28 there are shown the details of the transfer mechanisms 6 and 7 and the controls therefor, one of which will be described. The main air line A7 is connected to 3-way poppet valve T2 and to 4-way-single cylinder-spring return valve T6, said valve having a return spring T7, an opening port T8 to the main air supply A7 and a valve stem T6a. When a keg K strikes plate T1 as shown in FIGURE 26, 3-way poppet valve T2 is actuated by cam T3 and air from the main air supply line A7 is then admitted into cylinder T5 which is in series and between valve T6 and valve T2.

Port T8 in valve T6 is opened to the main air supply and piston T9 is forced from position 9a to position 9b as shown in FIGURE 26. Gate T10 is dropped behind the keg and port T11 opens to exhaust the air through port T12 and piston T9 is forced from position 9b to position 9c' and drives the carriage T30 from its retracted position to its forward position. In FIGURE 25 the carriage T30 is shown in its retracted position and the movement of the keg K from the conveyor end is shown by the representation of the keg in solid and in dotted lines.

As seen in FIGURE 25 the piston T9 has connected thereto a piston rod T25 which is pivotally connected at its free end to the lever T26. The lever T26 is fixed to the shaft T27 mounted rotatably in a trunnion T28 fixed to the carriage T30. Also fixed to the shaft T27 is a lever T29 which is pivotally connected to the gate T10 at its lower end. The construction is such that upon movement of the piston T9 from 9a to 9b the gate T10 is dropped and then upon further movement of the piston from 9b to 9c' the carriage T30 is itself moved to forward position by piston T9. The same construction is utilized in both transfer mechanisms.

The carriage T30 is provided at its upper portion with two parallel sleeves T34 which ride upon the rods T35 suitably mounted in the framework so as to support the carriage T30 during its reciprocating movements. The plate T1 is returned to its original position as shown in full lines in FIGURE 25 by means of a spring T36 which is attached to a brace rod T37 provided upon the carriage T30.

In FIGURE 27 the operation of a transfer mechanism 6 or 7 and keg carriage T30 is further illustrated. When in its forward position as shown in FIGURE 27 the carriage contacts and actuates 3-way poppet valve T13 which thereby opens the main air supply line A7 to cylinder T14 of 4-way-single cylinder-spring return valve T38 which forces over valve stem T15 fitted with return spring T16. This opens port T17 which forces piston T39 in cylinder T18 from position 18a to position 18b thereby lowering and dropping the transfer skid gate T40. Also this operation opens port T19 to exhaust air through port T20. The lowering of the transfer skid gate T40 causes the keg to roll onto the skid under the belt conveyor S2. The piston T39 is fixed to piston rod T31 which in turn is pivotally connected at T32 to transfer skid gate T40.

When the keg rolls onto the skid under the belt conveyor S2 associated therewith the keg releases the plate T1 which is returned to initial position by spring T36 causing the deactuating of the 3-way poppet valve T2 by means of cam T3. Spring T7 (FIGURES 25, 26, and 28) causes valve stem T6 to return, forcing air out of cylinder T5 and exhausting air through valve T2. This opens port T11 to the main air supply A7, forces piston T9 from position 9c' to position 9a, raises gate T10 and drives carriage T30 on rods T35 from its forward position to its retracted position. Port T8 is opened to exhaust port T12.

As the transfer carriage T30 leaves its forward position it deactuates 3-way poppet valve T13 and spring T16 causes valve stem T15 to return, forcing air out of cylinder T14 and exhausting air through 3-way poppet valve T13. This opens port T19 to the main air supply A7 which forces piston T39 in cylinder T18 from position 18b to position 18a raising the transfer skid gate T40 and also opens port T17 to exhaust port T20. The transfer carriage T30 is retracted and in position for receiving the succeeding keg from the conveyor associated therewith.

In FIGURE 28 the carriage T30 is provided as shown with a longitudinally extending bottom plate 17 of the shape shown embracing the top portion of the rail 16 upon which the carriage reciprocates. The transfer carriage is also provided with a bracing strut 18 which is located at the side opposite the gate T10. Located below the keg support plate 17 upon the carriage T30 are spaced supporting rails 19 which as shown are inclined at substantially the same angle to the horizontal as the rails 20 constituting the skids 4 or 5. The supporting rails 19 are located spaced below the plate 17 preferably about an inch and a half. This distance, however, may be modified as desired. The reason for locating the supporting rails 19 slightly below the bottom plate 17 is as follows: When the keg has been moved into the transfer mechanism it will be supported by the edge 21 of the plate 17 and the upper surface 22 of the transfer skid gate T40. The kegs are unwieldy and have a tendency to spin when being transferred from the transfer mechanisms to the rails 20 constituting the skids 4 and 5. It has been found that when the keg to be transferred is supported by the edges 21 and 22 slightly above the upper surface of the rails 19 that upon dropping the transfer skid gate T40 the keg in the transfer mechanism will sharply drop the intervening small space to the supporting rails 19 and this will counteract any tendency to spin upon the part of the keg when going from the supporting rails 19 to the rails 20 of the skids. It also acts to immediately start the kegs upon their path along the skids without any tendency to hesitate or hang. The quick start given each keg therefore gives the keg no chance to start spinning.

In order to support the skids 4 and 5 as well as the transfer mechanisms 6 and 7 and the various conveyors a suitable framework comprising standards 129 and horizontal reinforcing members 130 are provided. Upon the horizontal members 130 located above the skids 4 and 5 a platform 131 is mounted upon which a motor 132 is located. A pulley 133 upon the motor drives a belt 134 which in turn drives a pulley 135 mounted upon a shaft 136 to which is also fixed the driving pulley 137 for the belt S2 cooperating with the kegs fed along skid 4. A similar pulley 137 is also mounted upon the shaft 136 for driving the belt S2 which cooperates with the kegs fed along skid 5. Belt tighteners 138 cooperate with the belts S2 at various spaced points thereon. The belt tighteners may be of any desired type. The belts S2 traverse at the left hand side of FIGURE 10 the pulleys 137 while at the right hand side as shown in FIGURE 11 the pulley S2 cooperating with skid 4 traverses the pulley 139 while the belt S2 which traverses the kegs upon skid 5 extends over a pulley 140 as shown in FIGURE 11.

(C) THE STRUCTURE AND OPERATION OF THE MAIN KEG CARRIAGE AND KEG SKID STOPS

The details of the keg skid stops K1 located at the lower ends of skids 4 and 5 and the main keg carriage K40 are shown structurally and diagrammatically in FIGURES 9, 17, 22, 23, 24, 35, 36 and 38. Both skid belt conveyors S2 as associated wtih skids 4 and 5 carry the kegs from the transfer mechanisms 6 and 7 to the keg skid stops K1.

Figure 23:
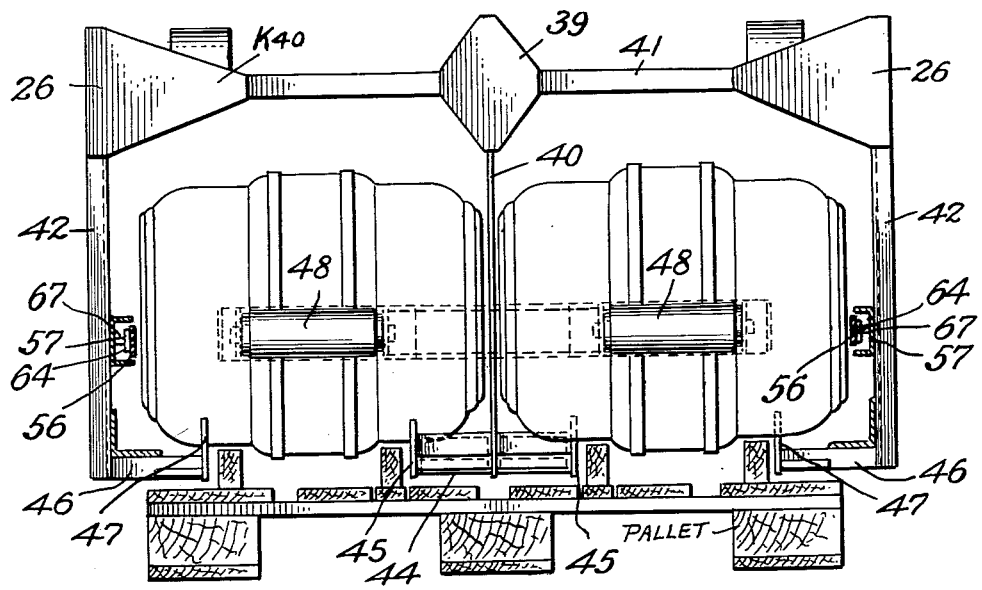
FIGURE 23 is a side elevational view with portions in cross section of the main carriage.

In FIGURE 38 the main carriage K40 is shown in full lines at one end position, the forward positon, in contact with the carriage stop 23 and in dotted lines at its other end position in contact with the stops 24. There are two stops 23 fixed to the spaced rails 25 upon which the carriage reciprocates and also two stops 24 fixed to the rails 25 at the other end of its travel. The carriage K40 is provided with flat plates 26 as shown in FIGURE 23 at its upper corners for contacting the stops 23 and 24. The carriage in its reciprocation is carried by the rollers 27 located at each of its four upper corners riding upon the spaced rails 25 which in turn are supported by the framework 28 at one end and at 29 at the other end. The framework 29 is diagonally disposed and connected to framework 30 vertically disposed. The rollers 27 are preferably in pairs riding upon each side of the tracks 25 and are connected together by yoke shaped members 31 which in turn are secured to the top of the carriage by the members 32.

The rails or tracks 25 are secured to longitudinally extending frame members 33 by means of the supports 34. The framework 28, 29 and 30 is also secured at their upper ends to the longitudinally extending frame members 33. The frame members 33 are secured to the transverse members 34' which in turn are secured to the ceiling.

A double acting cylinder 35 is pivotally secured at 36 to framework 29 and the cylinder 35 is preferably located over the center of the carriage K40. A piston 37 located in the cylinder 35 is connected to a piston rod 38 which in turn is connected to an abutment 39 provided upon a median plate 40 extending longitudinally of the carriage and a cross bar 41 extending across one end of the carriage.

An end elevation of the carriage is shown in FIGURE 23 and comprises the side vertical standards 42 with the horizontal members 43. The median plate 40 extends centrally through the carriage as shown particularly in FIGURES 23 and 35 dividing the same so that two kegs will be received from the skid 4 and two kegs from the skid 5 upon each loading and reciprocation of the carriage. The median plate 40 is suitably supported by transverse members fixed to the horizontal members 43 as shown particularly in FIGURE 23 and has secured at the bottom thereof a base plate 44 which in turn at each side has secured thereto supporting plates 45 for the kegs. The standards 42 are also provided at the bottom with a transverse member 46 having secured thereto the supporting members 47 for the kegs spaced an appropriate distance for the particular kegs involved from the supporting members 45. The framework 30 is provided at the lower end thereof with spaced keg stops 48 preferably of rubber and spaced as shown in FIGURE 23 so as to contact the central enlarged portion of the kegs as they are moved into position.

In FIGURE 38 the pneumatic connections for reciprocating the main carriage are shown diagrammatically and comprise the main air line A7 from which a branch 49 extends to the solenoid valve 520 which initiates a forward movement of the main carriage. From valve 520 a branch 50 extends to a flow control valve 51 and from the flow control valve 51 a branch 52 having a flexible portion is connected to the rear end of the cylinder 35.

At the other end of the cylinder 35 there is a branch 53 also having a flexible portion which extends to the flow control valve 54 and from the valve 54 a branch 55 goes to the solenoid valve 527 which initiates the return movement of the carriage. Suitable exhausts for the air are provided with valves 520 and 527.

When the solenoid valve 520 is actuated air will be admitted from the main air line A7 to the rear end of the double acting cylinder 35 thereby causing the piston rod 38 to move towards the left as shown in FIGURE 38 and thereby moving carriage K40 from the dotted line position to the full line forward position. The air in front of piston 37 will be exhausted through valve 527.

To accomplish the reverse movement of the carriage K40 solenoid valve 527 is operated which admits air through branch 55 and flexible conduit 53 connected to the forward end of the cylinder 35 which will cause piston 37 to move towards the right in FIGURE 38 thereby carrying the carriage from the full line position to the dotted line position. The proper control of the actuating fluid is controlled by the flow control valves 51 and 54. The movement of the main carriage as outlined above will be synchronized with the other required movements of the palletizing device and the complete pneumatic and electrical circuits for accomplishing this will be described in detail below.

As the kegs are fed from the skids 4 and 5 upon the rails 45 and 47 of the main carriage it may happen that certain of the kegs are placed out of alignment. In order to correct such a situation prior to the tiering of the kegs there is associated with the main carriage K40 at both of its sides a keg straightening device which is particularly shown in FIGURE 39. The straightening device comprises a plate 56 which extends within the channel iron 57 fixed to the standards 42 of the carriage. The plate 56 is fixed at its end 58 to any desired fixed portion of the framework while the other end 59 is mounted loosely upon a bolt 60 also secured to the framework. Coacting with the inward side of the plate 56 is a spring 61 surrounding the bolt 60 while coacting with the outer side of the plate 56 is a spring 62 whose tension may be adjusted as desired by the nut 63. The plate 56 is sufficiently flexible and of such length that there is a spring action thereof with respect to the fixed end 58. The other end 59 is free to move with respect to the bolt 60 under the spring action of the springs 61 and 62.

The plate 56 has secured to the outer side thereof a flat bar 64 and the end 65 thereof constitutes a forward step while the other end 66 constitutes the rear step. Each channel iron 57 of the main carriage K40 has secured thereto a pivotally mounted pawl 67. A spring 68 is fixed at one side to the pawl while a spring 69 is secured to the other side thereof. The other ends of the springs 68 and 69 are secured in any desired way to the channel iron 57 of the main carriage.

The action of the keg straightener is as follows: As the main carriage moves forwardly or to the left as shown in FIGURE 39 the pawl 67 engages with the rear step 66 of the bar 64. This reverses the direction of the pawl 67 so that it will have the position as shown in FIGURE 39 during the remainder of the forward travel of the carriage. The pawl 67 will then drop in front of the forward step 65 and slide along the plate 56 and come to rest when the carriage reaches its forward position.

Then as the main carriage moves towards the right in FIGURE 39 which is its return movement the pawl 67 will engage the forward step 65 which will again reverse the pawl's direction. However, in the reversing of the pawl's direction the plate 56 will be pushed out as shown in dotted lines in FIGURE 39. This has the effect of straightening the kegs as they are about to drop upon a pallet. The pawl 67 after its direction has been reversed will then slide along the bar 64 and along the plate 56 and come to rest when the carriage reaches its rear position. This insures that the kegs are always positioned in proper position just prior to being deposited upon the pallets.

Figure 22:
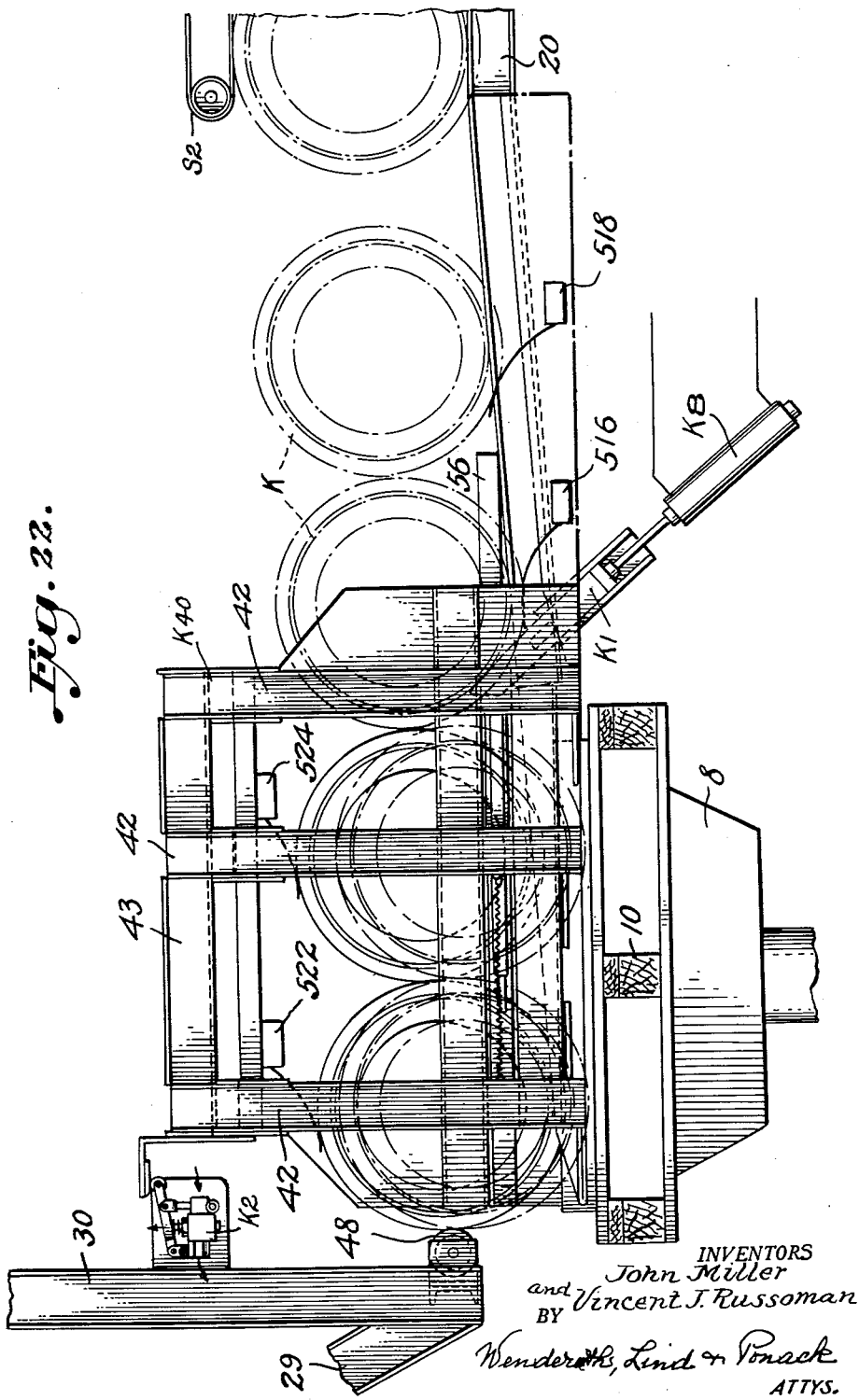
FIGURE 22 is a partial elevational view illustrating particularly the construction of the main carriage and the feed of the kegs thereto.

When the main keg carriage K40 reaches its forward position as seen in FIGURE 22 it operates a 3-way poppet valve K2 (see FIGURE 24) which admits air from the main air supply A7 to cylinder K4 of the 4-way-single cylinder-spring return valve K12 which forces over valve stem K5 against its return spring K6. This operation opens port K7 to the main air supply line A7. The compressed air forces pistons K8 and K9 from positions Ka to positions Kb, thereby dropping the keg skid stops K1 down to permit the kegs K on the rails 20 of the skids 4 and 5 to roll forwardly. At the same time port K10 is opened to exhaust port K11.

Figure 24:
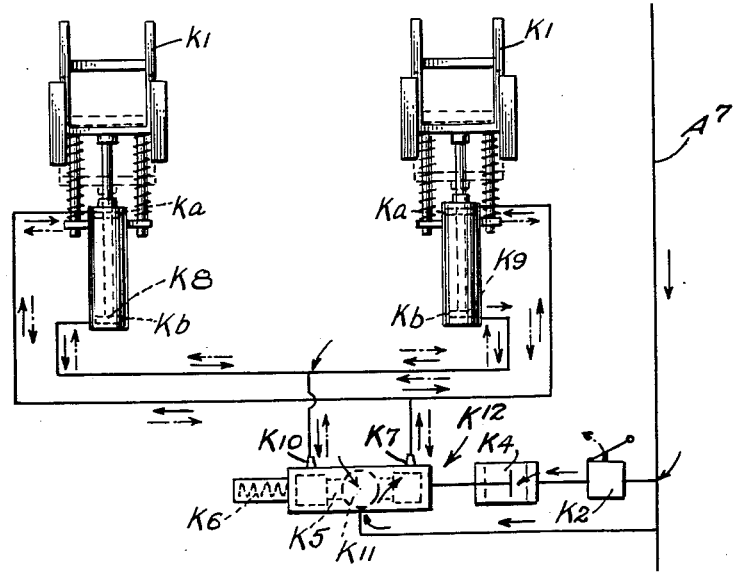
FIGURE 24 is an elevational view of the skid stops together with a diagrammatic view of the controls therefor.

The arrows in FIGURE 24 which are in solid line indicate the flow of the pneumatic fluid in the foregoing paragraph. The arrows which are in dotted section in FIGURE 24 represent the flow of the pneumatic fluid in the following operations as the main keg carriage moves to its retracted position. The movement of the main keg carriage K40 to its retracted position deactuates 3-way poppet valve K2. Spring K6 causes valve stem K5 to return, forcing air out of cylinder K4, exhausting through poppet valve K2 and also opens port K10 to main air supply A7. This forces pistons K8 and K9 from positions Kb to positions Ka, thereby raising the keg skid stops K1. This prevents the kegs from going forward and also prevents the kegs over the pallet from going backward. This operation opens port K7 to exhaust port K11.

(D) THE STRUCTURE AND OPERATION OF THE BASE PALLET UNIT

In FIGURES 2, 4, 20, 31, 32 and 36 there is shown the outline and structure of the base pallet magazine 11 and cooperating elements. The hydraulic lift 8 lies at the intersection of the paths of movement of the kegs and pallets as these paths are defined by the skids and the conveyor for the pallets. The skids 4 and 5 comprising spaced rails 20 permit the kegs to roll by gravity to load onto the pallet supported by the lift. The exit or full pallet conveyor 9 extends in a direction which is transverse to the path of the skids.

The base pallet magazine 11 is provided with a base pallet feed which is the same conveyor 9 as for the full pallet. The intermediate pallet magazine 14 is positioned adjacent the base pallet magazine as shown in FIGURE 2. The intermediate pallet magazine and base pallet magazine, each feed their respective pallets 12 and 10, from the bottom and the pallets ejected by the magazines are carried by the base pallet conveyor 9 and the intermediate pallet conveyor respectively, for delivery to the lift. Since only one bottom pallet 10 is used per unit load (base pallet) the base pallet magazine 11 is provided with an indexing mechanism 70 by means of which a count is kept of the number of loads which are palletized.

The bottom pallet conveyor 9 passes over sprockets 71. The time cycle for discharge of a base pallet 10 is manifestly less than the time cycle for loading tiers of four kegs since each loading operation entails at least two lifting operations by the hydraulic lift for double tiering, a double tiering being the preferred minimum stack size for economic reasons. The relative short length of the conveyor 9 for a bottom pallet from the magazine 11 to the lift 8 and the relatively long length of the conveyor used for an intermediate pallet 12 (about twice as long a path) results in uniformity of palletizing and conveying operations.

The reciprocable keg carriage K40 which fits over the skids 4 and 5 and the skid stops K1 release the kegs in pairs from each skid and each of the kegs is positioned with its bung side outwardly.

Figure 20:
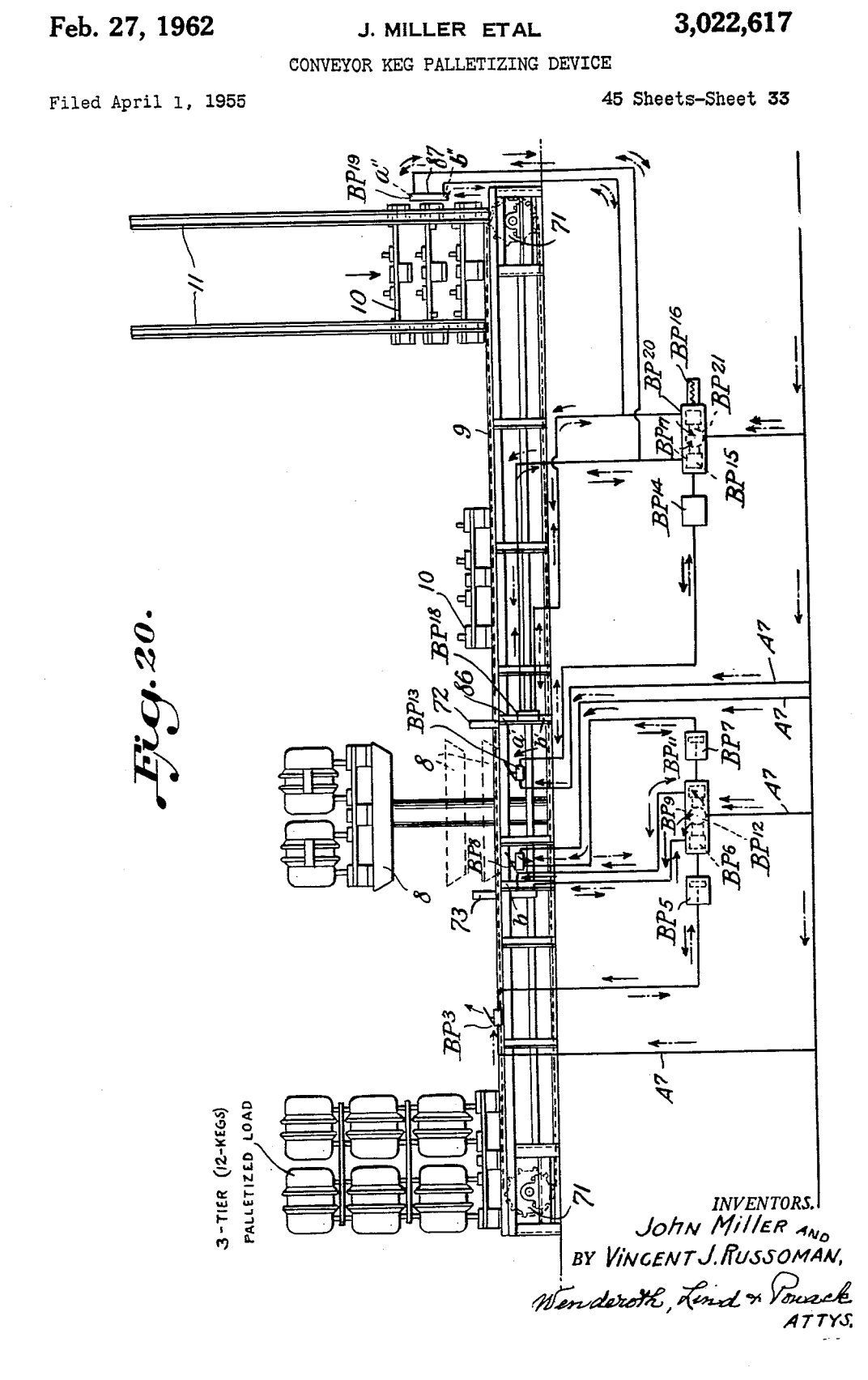

The details with respect to the base pallet unit are set forth in terms of the raising and lowering of gates 72 and 73. The raising of gate 73 is accomplished by the flow of pneumatic fluid as shown by arrows in solid line upon FIGURE 20 and the lowering of gate 73 is accomplished by the flow as indicated by arrows in broken line. Similarly the raising of gate 72 is accomplished by the flow of fluid shown in solid line and the lowering of gate 72 is shown by the flow of fluid in broken line arrows. The lowering of gate 72 is synchronized with the dropping of the stack of base pallets 10 from the top fingers 74 to the bottom fingers 75 (see FIGURE 31). The flow of fluid for accomplishing this is shown in solid line arrows. The dropping of a base pallet 10 from the bottom fingers 75 onto the base pallet conveyor 9 is accomplished by the flow of fluid as indicated in broken line arrows (FIGURE 20).

With regard to the feeding of a base pallet 10 from the magazine 11 and an intermediate pallet 12 from the magazine 14 to the conveying means associated therewith, this is accomplished by the same type of mechanism in both instances comprising the top fingers 74 and the bottom fingers 75 as shown in FIGURES 31 and 33. The fingers 74 and 75 are interconnected by means of levers 76 which are fixed to a shaft 77. A lateral movement of one finger therefore in each case will bring about a corresponding movement of the other fingers in the opposite direction. In order to accomplish the reciprocation of the fingers 74 and 75 in synchronism the fingers of the base pallet magazine are actuated by the piston reciprocating in the cylinder BP19 acting upon crank arm 78 which is fixed to shaft 77. A similar actuation is accomplished by the piston in cylinder IP24 acting upon piston rod 79 which in turn is connected to a crank similar to crank 78. Also fixed to the shaft 77 is a crank arm 80 which in turn is connected to a rod 81 which extends to a crank arm 82 fixed to the shaft 77 at the other side of the magazine so that upon actuation of the fingers 74 and 75 at one side of the magazine a similar actuation takes place at the other side thereof.

*Raising gate 73*

After leaving the hydraulic lift 8, the full pallet load carried by base pallet conveyor 9 actuates 3-way poppet valve BP3 (see also FIGURE 18) admitting air from the main air supply line A7 to cylinder BP5 of the 4-way-double cylinder valve 83. This forces over valve stem BP6 of valve 83 towards cylinder BP7, and in turn this forces air out of cylinder BP7 which exhausts through 3-way poppet valve BP8. The operation opens port BP9 of valve 83 to main air supply A7 which forces piston BP10 of cylinder 84 from position *a* to position *b* raising base pallet stop gate 73 and opens port BP11 of valve 83 to exhaust port BP12.

*Lowering gate 73*

As the lift 8 begins to ascend from the bottom position it actuates 3-way poppet valve BP8 thereby admitting air from the main air supply line A7 to cylinder BP7 of valve 83. This operation forces over valve stem BP6 towards cylinder BP5 and in turn forces air out of cylinder BP5 and exhausts air through valve BP3. Port BP11 opens to main air supply A7 which forces piston BP10 of cylinder 84 from position *b* to position *a* thereby lowering base pallet stop gate 73 and opens port BP9 to exhaust port BP12.

*Lowering gate 72 and dropping stack of base pallets*

As the lift descends from the lower position to the bottom position it actuates 3-way poppet valve BP13 (see FIGURES 19 and 20) admitting air from main air supply A7 to cylinder BP14 of 4-way-single cylinder-spring return valve 85. This forces over valve stem BP15 (opposing spring BP16) and also opens port BP17 to main air supply A7, and in turn forces piston BP18 in cylinder 86 from position *a'* to position *b'* to lower base pallet stop gate 72. Then piston BP19 in cylinder 87 is forced from position *a"* to position *b"* to drop the stack of base pallets in the magazine from the top fingers 74 to the bottom fingers 75. Thereby there is opened port BP20 to exhaust port BP21.

*Raising gate 72 and dropping a base pallet from the bottom fingers onto the base pallet conveyor*

As the lift begins to ascend from the bottom position it deactuates 3-way poppet valve BP13. Spring BP16 of valve 85 causes valve stem BP15 to return, thus forcing air out of cylinder BP14 and exhausting through valve BP13. This also opens port BP20 to main air supply A7 and forces piston BP18 from position *b'* to *a'* to raise the base pallet stop gate 72. This forces piston BP19 from position *b"* to position *a"* to drop one base pallet from the bottom fingers 75 of the base pallet magazine 11 onto the base pallet conveyor 9 and also opens port BP17 to exhaust port BP21.

Upon the base pallet magazine 11 are mounted swinging gates 109 which are similar to the gates 101 provided upon the intermediate pallet magazine 14 (FIGURE 33). The gates 109 (FIGURE 32) are fixed to vertically extending shafts 108 and the shafts 108 are rotatably mounted in the frame of the magazine. An elevational view of the gates 101 is shown in FIGURE 7ᵃ and as stated above, the gates 109 are similar thereto.

On each gate an extension 145 is provided in which a rotatably mounted pivot pin 146 is secured offset from the shaft 108. To the pivot pin 146 a piston rod 147 is secured which in turn is secured to the piston 148 reciprocating in the cylinder 149. Each cylinder 149 in magazine 11 is connected by an air line 150 at one end thereof and to an air line 151 at the other end thereof. The air lines 150 and 151 are controlled by a 4-way-single cylinder-spring return valve 152 which in turn is controlled by solenoid valve 555BG connected to the main air line A7. When air under pressure is admitted to the air line 150 then the pistons 148 will be moved towards the right in FIGURE 32 and thereby the gates 109 will be opened. When air under pressure is admitted to air line 151 then the pistons 148 will be moved to the left as shown in FIGURE 32 thereby closing the gates 109 preventing any further entry of pallets into the magazine. The pallets are inserted into the magazines 11 and 14 by means of a fork lift whose fingers 153 are partially shown in FIGURE 31. The pneumatic circuit for operating the gates 109 is diagrammatically shown in FIGURE 19. When the 3-way solenoid valve 555BG is actuated by the operator air will be supplied from the main air line A7 to cylinder 154 of the valve 152 forcing the valve stem thereof against the action of the spring 155 so as to open the ports to air line 150 which will cause the pistons 148 in the cylinders 149 to operate the gates and when solenoid valve 555BG is deactivated the spring 155 will bring about through the air line 151 a reverse operation of the gates.

(E) THE STRUCTURE AND OPERATION OF THE INTERMEDIATE PALLET UNIT

In FIGURES 2, 3, 6, 7, 7ᵃ, 8, 29, 33 and 37 there are shown the details of the structure and operation of the intermediate pallet unit. In addition, details are set forth in relation to the electrical control and the complete operation is shown diagrammatically in FIGURE 34.

As shown in FIGURE 2 the intermediate pallet unit is located adjacent the base pallet unit and a side elevational view of a portion thereof is shown in FIGURES 7 and 7ª while the feed table 90 and cooperating elements are shown in FIGURE 8. The intermediate pallet magazine 14 is constructed of suitable upright standards 99 and reinforcements 100 and one side thereof is closed by pivotally mounted swinging gates 101 so that the magazine may be loaded with pallets as desired.

The feed of the intermediate pallets from the bottom of the magazine 14 to the conveyor IP51 is accomplished by the fingers 74 and 75 previously described. The conveyor IP51 traverses the sprocket wheels 102, 103, 104 and 107. At spaced intervals on the conveyor IP51 there are provided pusher bars 108 which are designed to engage a pallet 12 when it has been dropped by the fingers 75 downwardly upon a platform 110 which is of the configuration particularly shown in FIGURES 7 and 7ª extending upwardly at a slight incline to the feed table 90. The conveyor IP51 between the sprockets 107 and 102 is guided by guiding members 111. The platform 110 as well as the upper guiding means 112 for the conveyor are supported by suitable standards 113 reinforced by the transverse members 114.

The step by step feed of the conveyor is accomplished by means of a rack IP52 (FIGURE 29), reciprocated by a piston rod 115 attached to piston IP23 which is reciprocated in the cylinder 95 whose control and operation will be described later. The rack IP52 meshes with a gear 116 attached to the clutch 117 mounted upon the shaft 118 which carries the sprockets 104 for the conveyor.

At the other end of the shaft 118 there is mounted a brake IP50 which is controlled by the piston IP32 in the cylinder 97 whose control and operation will be described later.

Referring to FIGURE 8 which is an elevational view of the intermediate pallet unit transverse to the showing in FIGURE 7 the feed table is shown at 90 to which the conveyor IP51 brings the intermediate pallet 12. When positioned thereon in alignment with the skids 4 and 5 a pusher rod 119 attached to the piston rod 121 is actuated by the piston IP7 in cylinder 89 to move the pallet 12 to the right as shown in FIGURE 8 so that it will come to rest upon the intermediate pallet carriage 91 carried by the rollers 122 riding upon tracks 123. The pallet 12 when pushed to the right in FIGURE 8 will, as stated, be deposited upon the upper surface of the carriage 91 and will not be deposited upon the angle irons 124 until after the carriage 91 has been withdrawn to the left by means of the piston rod 125 connected to the piston IP14 reciprocating in cylinder 93. The angle irons 124 move with the carriage 91. Then upon the return movement of the carriage 91 towards the right as shown in FIGURE 8 the front end of the carriage 91 will push the intermediate pallet 12 as positioned as shown in FIGURE 8 over the kegs positioned upon the lift 8. The angle irons 124 extend forwardly of the carriage 91 and are secured at each side thereof. Upon the return movement of the carriage 91 the pallet will be held by stop 636 so that the angle irons 124 may be withdrawn therefrom and the pallet deposited upon the kegs upon the lift 8. The piston rod 125 is connected to the downwardly extending strut 126 connected to the bottom of the carriage 91. The cylinders 89 and 93 are connected at each end to the operating fluid by means of flexible connections 127.

In order to prevent the intermediate pallet 12 from being withdrawn by the movement of the carriage 91 to the left suitable means such as pivoted fingers 128 are provided which coact with the top surface of the pallet 12 deposited upon the carriage 91 so as to prevent its return movement with such carriage.

The operation of the above elements will now be described.

When the solenoid 535PF is energized, air from the main supply line A7 is admitted to cylinder IP2 of the 4-way-double cylinder valve 88 which forces over valve stem IP3 towards cylinder IP4. This forces air out of cylinder IP4 and such air is exhausted through the 3-way poppet valve IP5.

The operation of the hydraulic mechanism is cyclical and alternate cycles are controlled by electrical and hydraulic elements. For convenience in following the movement of air through these elements four cycles are shown in accordance with the arrows in FIGURE 34. The first cycle now described is represented by a solid line arrow. The second cycle which is described below is represented by a solid line arrow with a circle at its tail. A third cycle is represented by a dotted line arrow. Correspondingly, a fourth cycle is represented by a broken line arrow with a circle at its tail. The first and third cycles correspond to each other as do the second and fourth cycles.

Continuing with the first cycle, port IP6 opens to main air supply A7, forces piston IP7 in cylinder 89 from position $a$ to position $b$ and pushes an intermediate pallet 12 from the intermediate pallet feed table 90 onto the intermediate pallet carriage 91 and opens port IP8 to exhaust port IP9.

Cycle 3 is now explained and reference is made to the arrows with the broken line. Air passes to cylinder IP10 of the 4-way-double cylinder valve 92 which forces over the valve stem IP11 towards cylinder IP12. Air is forced out of cylinder IP12 and exhausted through the 3-way poppet valve IP5. By this operation there is also opened port IP13 which connects with the main air supply A7 and by the opening of port IP13 piston IP14 of cylinder 93 is forced from position $a$ to position $b$ and thereby drives the intermediate pallet carriage 91 forward over the kegs on the lift 8 and port IP15 is opened to exhaust port IP16.

When the intermediate pallet carriage 91 reaches its forward position, the solenoid 535PF is de-energized and the 3-way poppet valve IP5 is actuated to admit air from the main supply A7 to the cylinder IP12 of valve 92 which forces the valve stem IP11 into cylinder IP10 and forces air out of cylinder IP10 which exhausts through an opening controlled by solenoid 535PF. This operation likewise opens port IP15 to the main air supply A7 and forces piston IP14 of cylinder 93 from position $b$ to position $a$ and thereby drives the intermediate pallet carriage 91 to its retracted position and port IP13 is opened to exhaust air therethrough and through port IP16. This completes cycle 3.

Air from the main supply A7 also goes to cylinder IP4 of valve 88 which forces over the valve stem IP3 in cylinder IP2. This forces air out of cylinder IP2 and exhausts through solenoid 535PF and also opens port IP8 to the main air supply A7. As shown by the arrows in FIGURE 34, this is a continuation of cycle 1. This forces piston IP7 of cylinder 89 from position $b$ to position $a$ to return the intermediate pallet pusher to its retracted position and opens port IP6 to exhaust port IP9.

The cycle then alternates from cycle 1 to cycle 3 and the deenergizing of solenoid 535PF and actuation of 3-way poppet valve IP5, as mentioned in the preceding paragraph.

Next the pneumatic and electrical control features are described with reference to the pallet and carriage conveyors and in terms of the cycles as indicated above. When the intermediate pallet pusher in cylinder 89 reaches its retracted position it actuates 3-way poppet valve IP17 (see also FIGURE 19) and thereby admits air from main air supply A7 to cylinder IP18 of 4-way-double cylinder valve 94 and to cylinder IP27 of 4-way-double cylinder valve 144. The results of the separate actuations of cylinders IP18 and IP27 correspond to the first cycle above mentioned and further defines a first cycle in the conveying operation, shown as solid line arrow and solid line arrow with circular tail below the kegs in FIGURE 34.

In cylinder IP18 the air forces over the valve stem IP19. Valve stem IP19 connects with cylinder IP20 and air is exhausted through 3-way poppet valve IP21. This operation opens port IP22 to the main air supply A7 and forces piston IP23 of cylinder 95 from position a to position b, driving the intermediate pallet conveyor IP51 one station ahead, and forces piston IP24 of cylinder 96 from position a to position b and drops the stack of pallets from the top fingers 74 to the bottom fingers 75 and opens up port IP25 to the exhaust port IP26.

In cylinder IP27 of valve 144 the air from the main air supply A7 forces over valve stem IP28 to cylinder IP29 and this air emerges from cylinder IP29 to exhaust through the 3-way poppet valve IP30. Thereafter port IP31 is open to the main air supply A7 and piston IP32 of cylinder 97 is moved from position a to position b to thereby release the intermediate pallet conveyor brake IP50 and port IP33 is opened and air is exhausted therethrough to port IP34.

When the intermediate conveyor IP51 moves one station ahead, it actuates 3-way poppet valve IP30 to admit air from main air supply A7 to cylinder IP29 of valve 144 which forces over valve stem IP28 to cylinder IP27. This forces air out of cylinder IP27 and exhausts the air through 3-way poppet valve IP17. This is the second conveyor cycle and is represented by the solid line arrow with circular tails below the kegs in FIGURE 34. Port IP33 opens to admit air from the main air supply A7 which forces piston IP32 of cylinder 97 from position b to position a, thereby braking the intermediate pallet conveyor IP51 and opens port IP31 to exhaust through port IP34.

When the intermediate conveyor IP51 moves one station ahead it actuates poppet valve IP21 to admit air from main air supply A7 to cylinder IP20 of 4-way-double cylinder valve 94 which forces over valve stem IP19 to cylinder IP18. This forces air out of cylinder IP18 and exhausts through 3-way poppet valve IP17. Port IP25 opens to admit air from the main air supply A7 which forces piston IP23 of cylinder 95 from position b to position a and thereby reverses the intermediate pallet conveyor drive rack IP52. Piston IP24 in cylinder 96 is forced from position b to position a to drop an intermediate pallet 12 from the bottom fingers 75 into position so as to be conveyed by intermediate pallet conveyor IP51. Port IP22 opens and air is exhausted through port IP26.

With respect to the pneumatic circuit for operating the gates 101 upon the intermediate pallet magazine 14 such circuit is indicated upon FIGURE 19 at the lower right hand side. When the 3-way solenoid valve 556IG is operated by the operator this opens the air line 156 from the main air line A7 to cylinder 157 of the 4-way single cylinder spring return valve 158. This will cause the valve stem in valve 158 to act against the spring 159 and open ports permitting air to flow into the air lines 160 to the cylinders 149 whose pistons through their piston rods 147 will operate the gates 101.

When solenoid valve 556IG is deactivated the spring 159 will come into action to move the valve stem in the valve 158 to open certain ports and allow air to flow under pressure to the air line 162 which reverses the movement of the pistons in the cylinders 149 and reverses the operation of the gates. Means are provided to allow the exhaust of air as required in the above operations.

Figure 18:
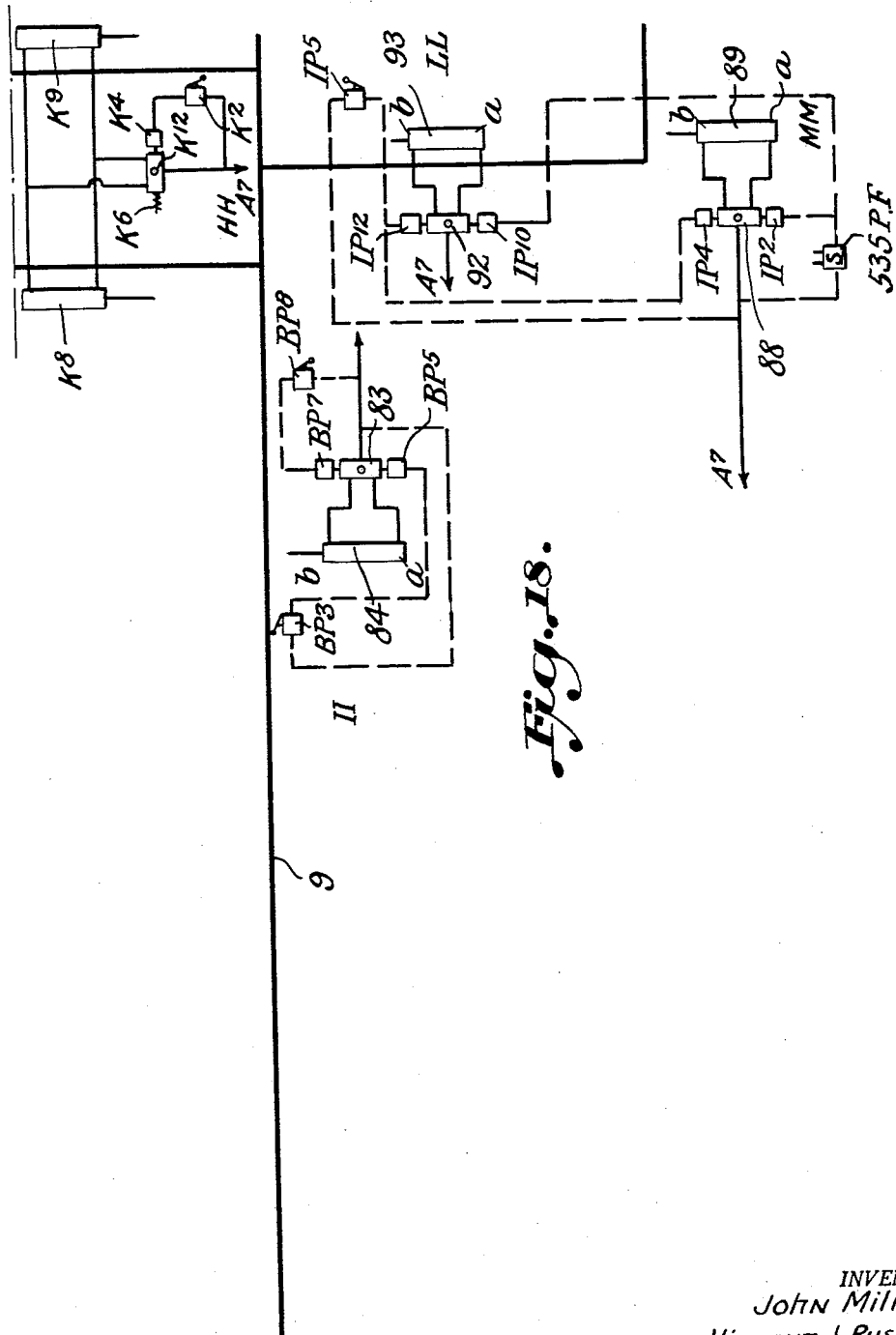
FIGURE 18 is a continuation of the showing in FIGURE 17 to the bottom thereof.

The complete pneumatic circuits used are shown upon FIGURES 17, 18 and 19. In such figures the following symbols are used:

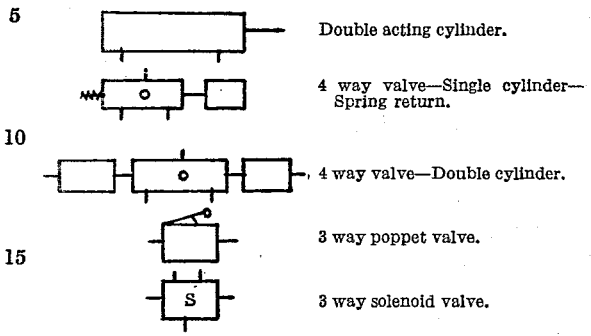

In FIGURES 17, 18 and 19 the conveyors are shown in heavy lines and the air from the main air line A7 to the cylinders is shown in solid line while the air from the main line to the control valves and pilot valves is shown in dash lines.

Also in such figures in order to simplify the understanding thereof the various circuits involved are located within the sections upon the figures as follows:

AA—The circuit for the brush-off mechanism 1 which is set in operation by the solenoid valve 504.

BB—The circuit for the alternating brush-off mechanism 3 which is operated by the 3-way poppet valves A1 and A5.

CC—The circuit for the transfer mechanism which is operated by 3-way poppet valve T2.

DD—The circuit for operating gate T40 by means of poppet valve T13.

EE—The circuit for operating the gate T10 in the transfer mechanism which is set in operation by 3-way poppet valve T2.

FF—A circuit similar to DD above for operating the other gate T40 in the other transfer mechanism.

GG—The circuit for operating the double acting cylinder 35 by the 3-way solenoid valves 520 and 527.

HH—The circuit for operating the skid stops by the 3-way poppet valve K2.

II—The circuit for operating gate 73 controlled by poppet valves BP3 and BP8.

JJ—The circuit for operating gate 72 and the base pallet magazine indexing fingers controlled by poppet valve BP13.

KK—The circuit controlling the operation of gates 109 upon base pallet magazine 11 controlled by solenoid valve 555BG.

LL—The circuit for operating cylinder 93 for reciprocating intermediate pallet carriage 91 operated by poppet valve IP5 and solenoid valve 535PF.

MM—The circuit for operating double acting cylinder 89 also controlled by poppet valve IP5 and solenoid valve 535PF.

NN—The circuit for the operation of brake IP50 controlled by poppet valve IP17.

OO—The circuit controlling the drive of conveyor IP51 by means of the rack IP52 controlled by poppet valves IP21, IP30 and IP 17 and also controlling the operation of cylinder 96 for the feed of the intermediate pallets from the magazine 14.

PP—The circuit for operating the magazine gates 101 under the control of the solenoid valve 556IG.

(F) THE HYDRAULIC AND PNEUMATIC SYSTEM

The pneumatic operation of the brush-off mechanisms, transfer mechanisms, main keg carriage, keg skid stops, base and intermediate pallet units have been described. The coaction of these pneumatic elements with the electrical control elements is set forth in greater detail in the description of the electrical control below.

A main feature of the hydraulic operation is the synchronization of the hydraulic actuated elements from a standard line pressure and the achievement of automatic, semi-automatic and manual operation from a central control panel which is provided with signaling lights and other devices to follow and control the operation throughout. The control extends to the conveyor motors and to the dispensing of the soap lubricant to the conveyors at the lateral transfer points.

Figure 21:
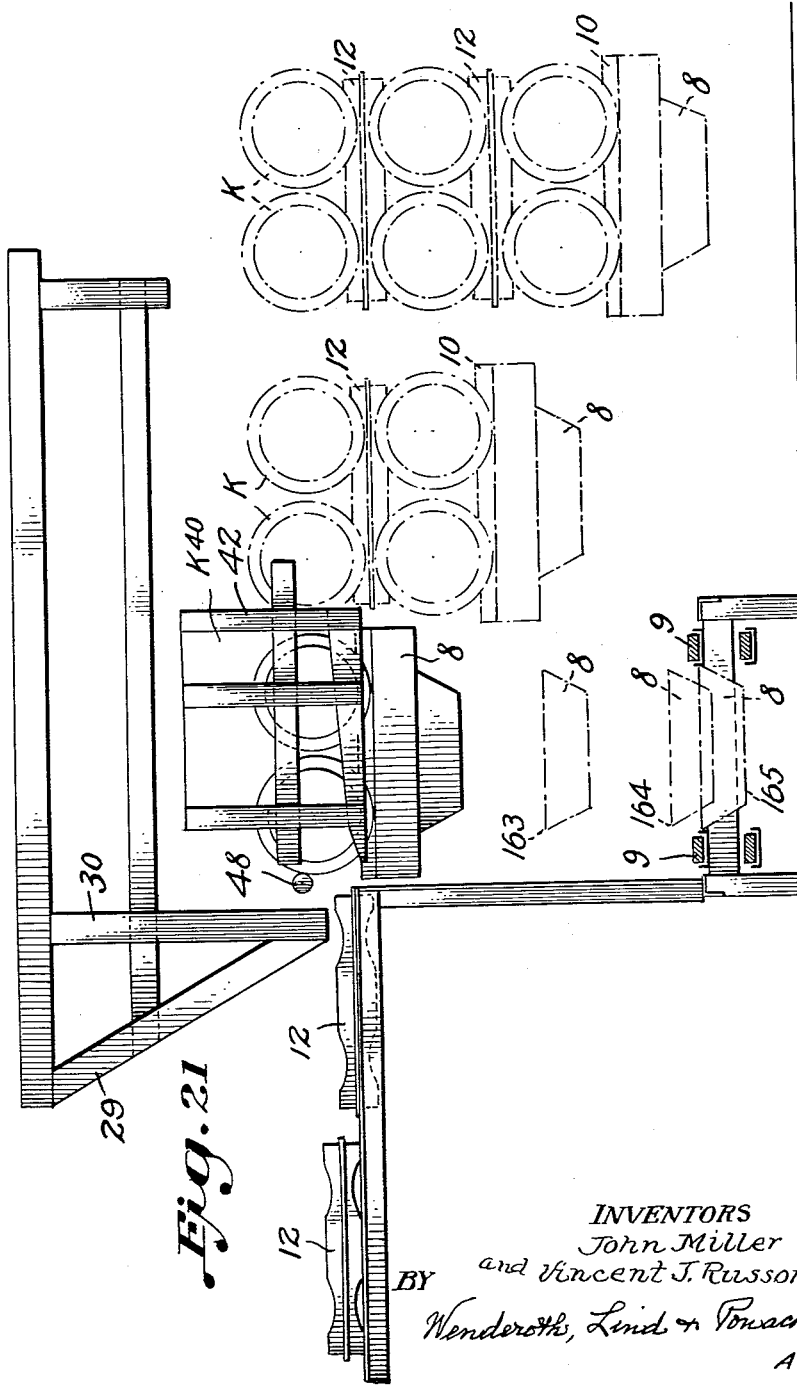
FIGURE 21 is a diagrammatic elevational view showing particularly the various lift positions.

There is shown in FIGURES 2, 4, 7, 20, 31, 33 and 37 the operation of the base and intermediate pallet conveyors which convey the pallets ejected from their respective magazines. The intermediate pallets are positioned at the upper level of the intermediate pallet table for transfer to the hydraulic lift, the lift already holding the first tier of kegs on the base pallet. The variations in the level of the lift with regard to the feed level of the base pallet and intermediate pallet is illustrated in FIGURE 21 and the intermediate pallet feed table is seen to be placed at a substantially higher level than the level for feeding the base pallet, which level is shown at the top run of the conveyor 9.

Careful attention is paid to the requirement for limiting the high point of the lift and the low point of the skid stops in order to insure the safety of automatic pnuematic and electrical operation and in order to prevent break down which could damage the lift equipment and the conveyors at a lower level in the event that the heavy kegs were let loose due to a mechanical failure.

In FIGURES 1 and 2 there is shown the relationship of the transfer mechanisms to the pallet room conveyor No. 4 and to the pallet room conveyor No. 3 which latter turns the kegs around so that their bungs are positioned to the rear. The alternating brush-off mechanism pushes the keg in its same position relative to the paths of conveyors Nos. 4 and 3 onto the lower positioned conveyor No. 3. The lower conveyor No. 3 carries the kegs to the transfer mechanism 7 where the lateral rolling of the kegs take place for the movement of the kegs down skids 4. The turn around section 2 accomplishes the turn around of the kegs to place their bungs outside because of the reversal in the path of the conveyor.

The hydraulic construction for operating the lift 8 is shown diagrammatically in FIGURE 12. The oil reservoir is indicated at 166 and associated therewith is a motor 167 for operating the gear pump 168 which places the oil under pressure in the pipe lines shown.

The full line arrows upon FIGURE 12 indicate the free flow of oil for a movement of the lift 8 "down" while the dotted line arrows indicate the controlled flow of oil for a movement of the lift 8 "up." A pressure gauge 169 is associated with the pipe lines as well as a relief valve 170. There is also provided in the pipe line 171 connected to the bottom of the cylinder 172 in which the piston 173 of the lift 8 reciprocates a speed control valve 174 for adjusting the downward speed of the piston 173 when the lift 8 descends. For controlling the circuits to the cylinder 172 there are provided two solenoid valves LU-591 and LD-530. The valve LU-591 is a 4-way-double solenoid valve, spring centered, with open center cylinder ports which are blocked in neutral. This valve controls the upper movement of the lift 8 while valve LD-530 controls the downward movement. The electrical control of the hydraulic circuit will be described below.

Also associated with the lift 8 and moving therewith as shown in FIGURE 9 is a cam rod 175 carrying the cams cooperating with various switches for initiating and controlling various operations.

Figure 13:
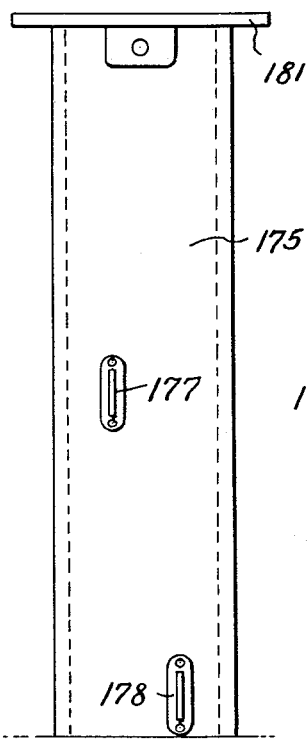
FIGURE 13 is an elevational view of the left side of the cam rod which follows the movements of the lift.
Figure 14:
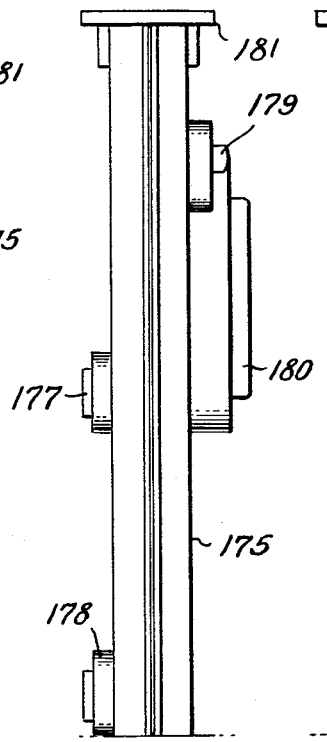
FIGURE 14 is a front elevational view of the cam rod.
Figure 15:
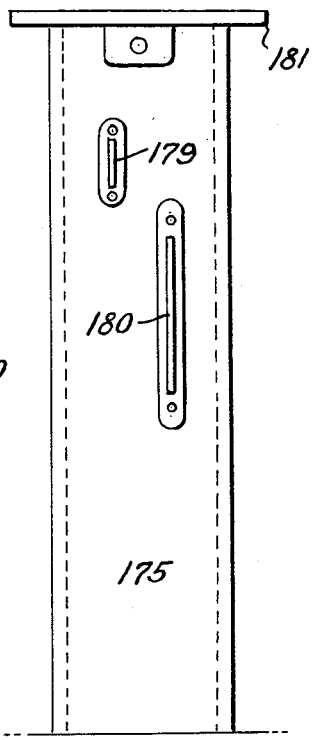
FIGURE 15 is a right side elevational view of the cam rod.
Figure 16:
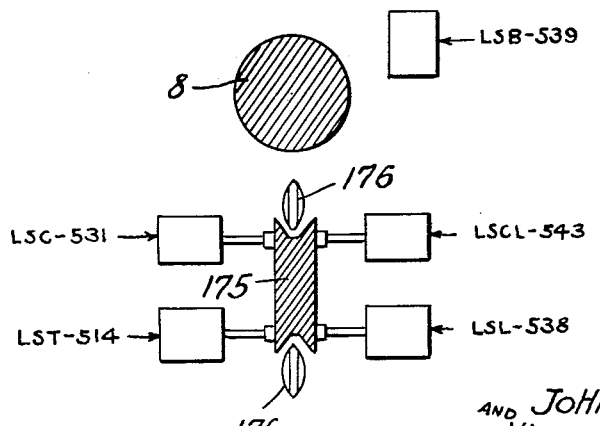
FIGURE 16 is a diagrammatic horizontal plan view taken upon section line 16—16 of FIGURE 9.

The cam rod 175 is more fully shown in FIGURES 13 to 16 inclusive wherein FIGURE 13 is a left side elevation, FIGURE 14 is a front elevation and FIGURE 15 is a right side elevation thereof. FIGURE 16 is a diagrammatic plan view illustrating the position of the lift 8 with reference to the cam rod 175 and the switches located at the bottom level with which the various cams upon the cam rod cooperate and also the switch LSB-539 with which the lift itself cooperates when in its lower position. Associated with the cam rod 175 as shown diagrammatically in FIGURE 16 are rollers 176 which serve to guide it during its reciprocation with the lift 8.

Mounted upon cam rod 175 are the cams cooperating with the switches LSC-531, LST-514, LSCL-543 and LSL-538 indicated in FIGURE 16. Upon the left side elevation, shown in FIGURE 13, cam 177 is located as shown which cooperates with switch LSC-531. Also adjacent the bottom end thereof cam 178 is mounted which actuates LST-514. Cam 177 controls the center position of the lift while cam 178 controls the top position thereof. Upon the other side of the cam rod 175 there is mounted cam 179 which controls the lower position of the lift and cooperates with switch LSL-538. Also upon this side of the cam rod there is mounted cam 180 which cooperates with switch LSCL-543 and controls the central and lower positions of the lift.

Cam rod 175 is provided at its upper portion with a plate 181 which is secured to the bottom side of the lift 8 as more particularly shown in FIGURE 9. The rod 175 follows the movements of the lift 8 at all times.

The automatic keg palletizing cycle comprises the following operations:

(1) Kegs are carried from the rackers on a carousel conveyor No. 1.

(2) The kegs moving on the racking room carousel conveyor No. 1 are brushed onto the adjacent conveyor No. 2 by the brush-off mechanism 1.

(3) Alternate kegs are brushed from conveyor No. 4 which is a continuation of conveyor No. 2 in the pallet room to a second adjacent pallet room conveyor No. 3 by the alternating brush-off mechanism 3.

(4) Kegs on both pallet room conveyors are transferred at right angles, to skids, by transfer mechanisms 6 and 7.

(5) The kegs roll along the skids by gravity, aided by contact with moving belts, until they reach a point where they are prevented from rolling by the action of skid stops.

(6) An empty base pallet on the moving base pallet conveyor 9, centered over a hydraulic lift 8 and restrained from moving with the conveyor by a base pallet stop, is carried by the lift, as the lift ascends from the bottom position to the top position.

(7) When the lift reaches the top position, the action of the main keg carriage causes four kegs to be deposited onto the base pallet, and the lift descends to the center position 163 (FIGURE 21).

(8) When the lift reaches the center position, the action of the intermediate pallet carriage 91 causes an intermediate pallet to be deposited onto the kegs on the lift.

(9) When the intermediate pallet is in position, the action of the main keg carriage causes four kegs to be deposited onto the intermediate pallet, and the lift descends to the lower bottom position 164.

(10) When the lift reaches the lower position, the action of the intermediate pallet carriage 91 causes a second intermediate pallet to be deposited onto the second tier of kegs on the lift.

(11) When the intermediate pallet is in position, the action of the main keg carriage causes four kegs to be deposited onto the intermediate pallet, and the lift descends to the bottom level 165.

(12) As the lift moves to the bottom level, it deposits the palletized kegs onto the base pallet conveyor 9 which carries the palletized kegs to an unloading station, and simultaneously centers another base pallet over the lift.

21

(13) The cycle described above results in a palletized load consisting of three tiers of kegs or two tiers of kegs when steps 10 and 11 are omitted.

(G) THE ELECTRICAL CONTROL

With reference to the circuit diagrams shown in FIGURES 40 to 54, inclusive, they may be broadly divided as follows:

FIGURES 40 to 44 constitute the elementary control diagram, FIGURES 45 and 46 are the schematic showing in detail of the starting circuits for the various conveyors and the lift pump and FIGURES 47 to 54 inclusive are the detailed diagrammatic showing of the control circuits throughout the device.

Figure 40:
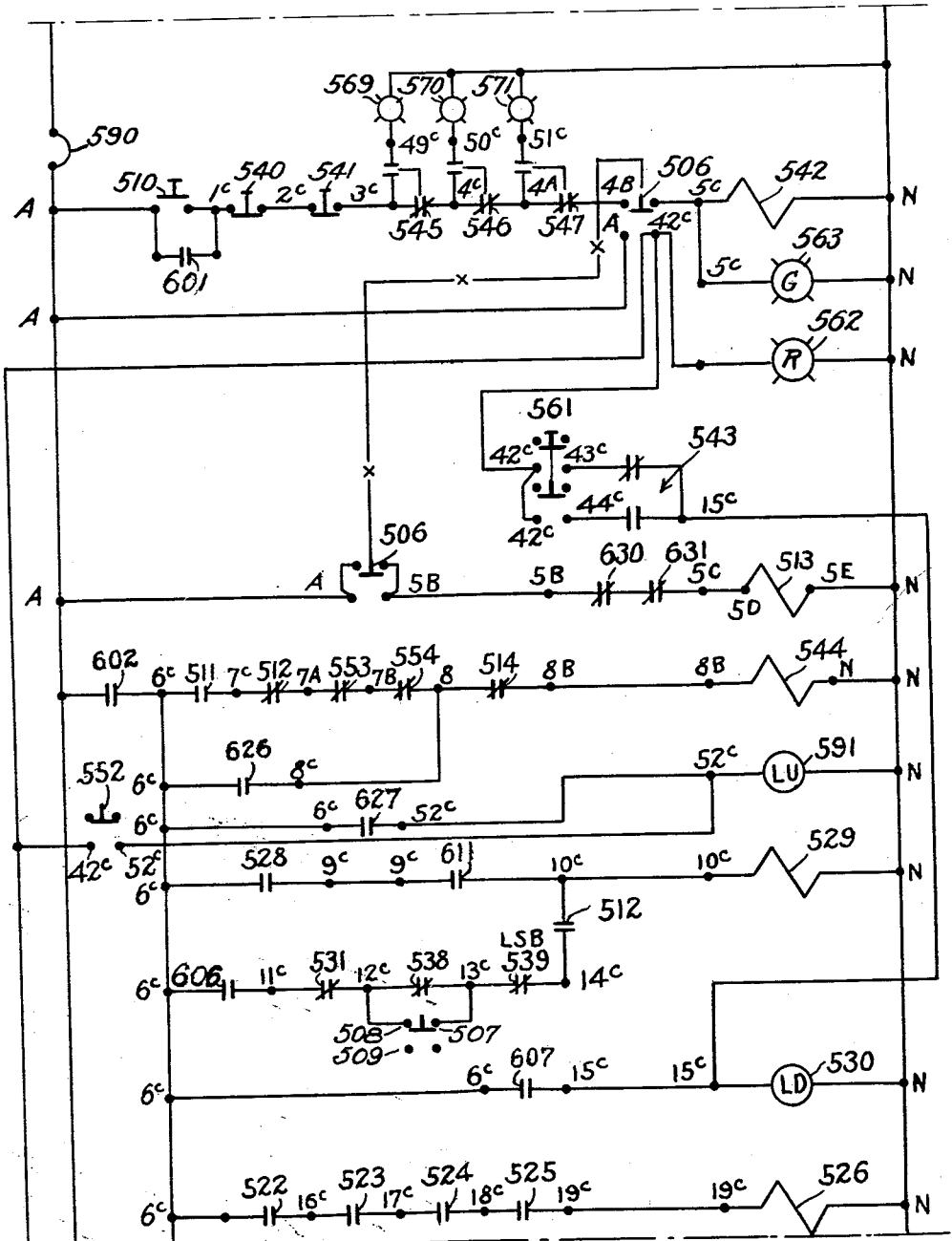
FIGURE 40 is a diagrammatic view of a portion of the elementary electrical control circuit.
Figure 41:
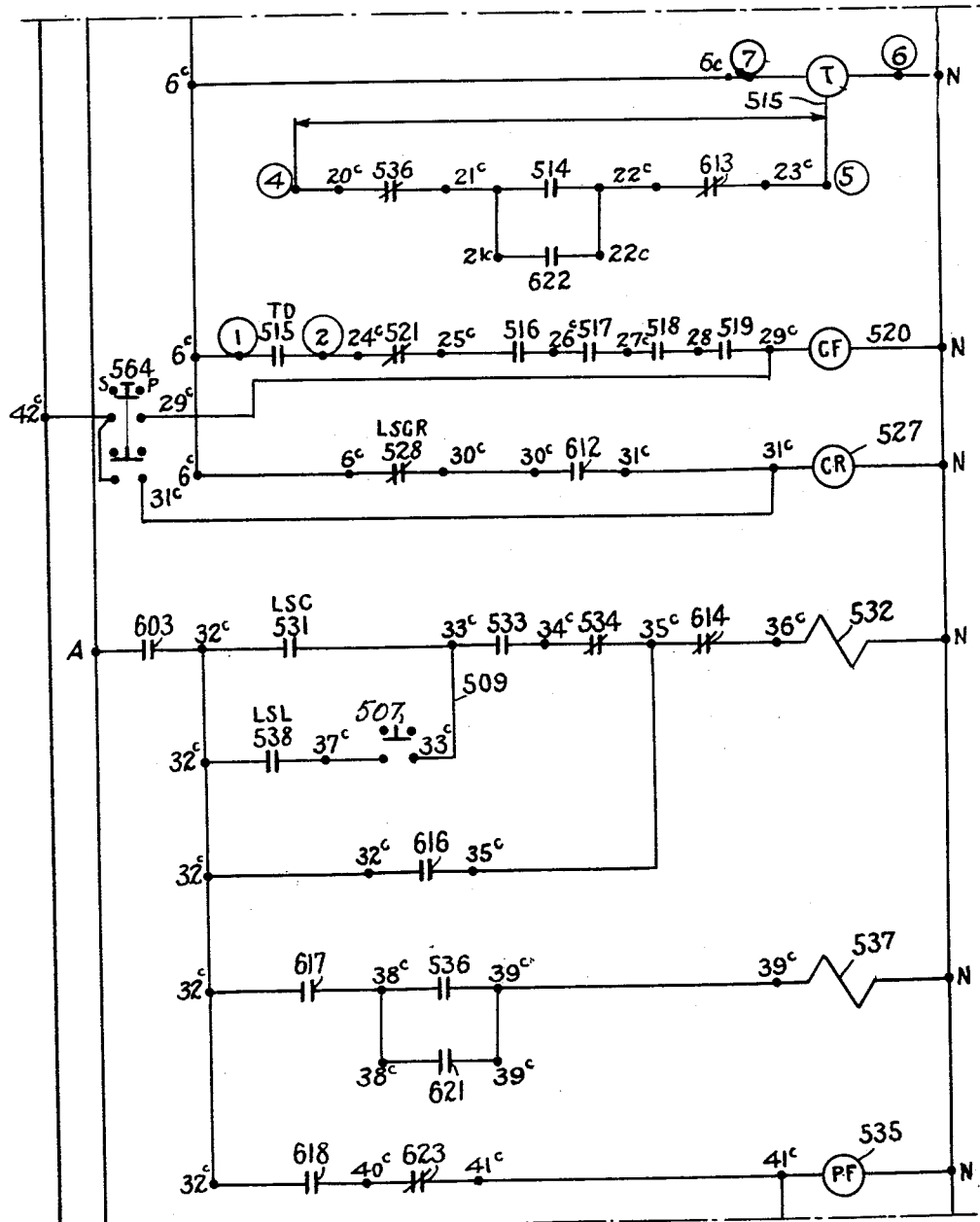
FIGURE 41 is a similar view which is a continuation of the showing in FIGURE 40 at the bottom thereof.
Figure 42:
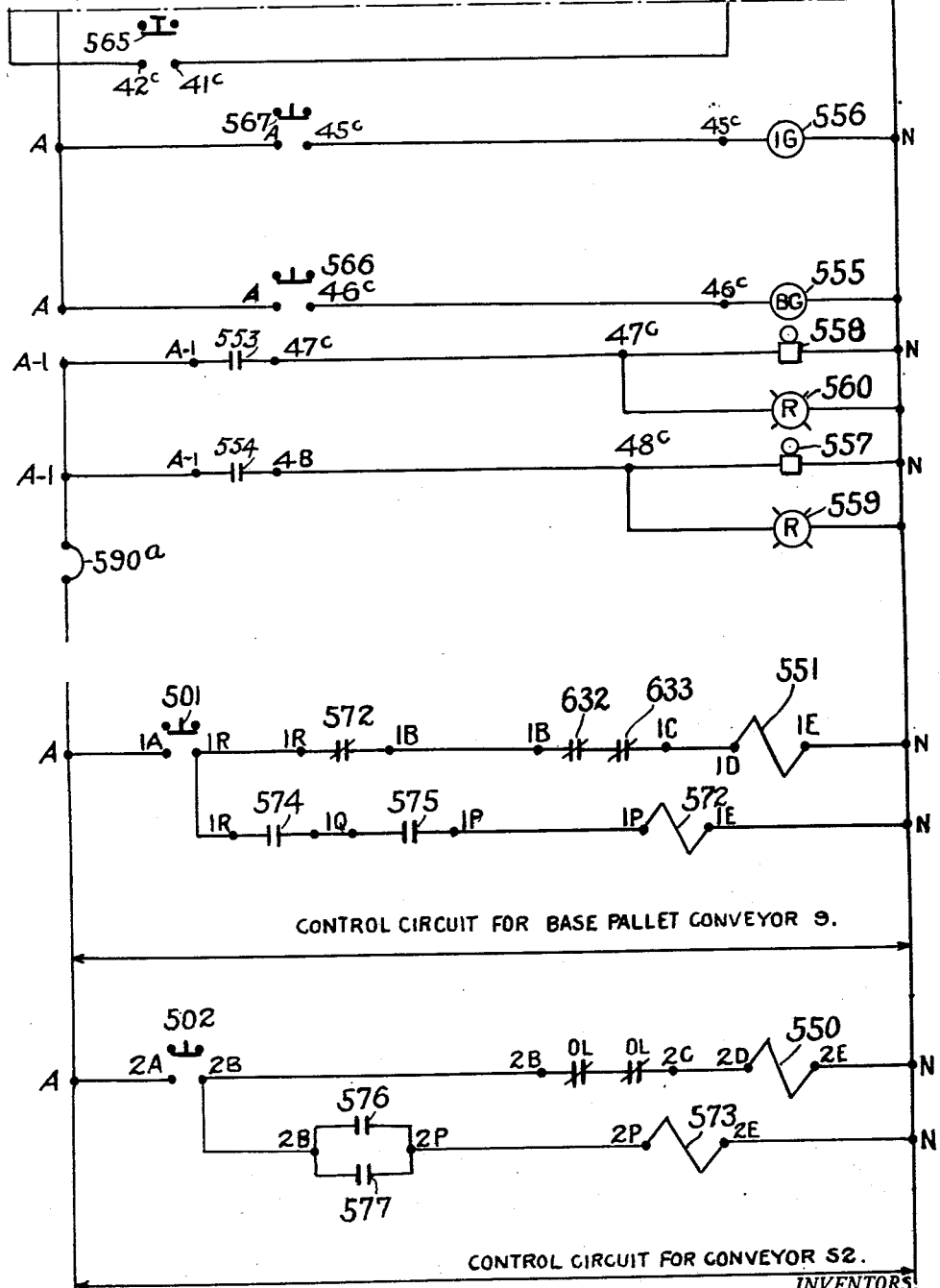
FIGURE 42 is a similar view continuing the electrical control circuit at the bottom of FIGURE 41 and showing particularly the control circuit for the base pallet conveyor and the skid belt conveyor.

With reference to FIGURES 40, 41 and 42 the circuits shown are connected to an alternating 120 volt, 60 cycle current main line. The circuits shown in FIGURES 43 and 44 are preferably connected to a 110 volt D.C. main line but of course these control circuits may also be modified so as to be operated by an alternating current main line.

In FIGURES 40, 41 and the top portion of FIGURE 42 the main line is indicated by the reference character A and the reference character N. In FIGURE 42 the warning bell and pilot light circuits are indicated as being connected to the main line A–1 and N.

With regard to the lines feeding the starter control circuits for conveyors Nos. 3 and 4 and the pressure switches they are indicated by L–1 and L–2. The main lines for the skid belt conveyor S–2, the base pallet conveyor 9 and the starter for the lift pump are indicated by L–1, L–2 and L–3.

The symbols used in FIGURES 40 to 54 inclusive for the various contacts, switches are as follows:

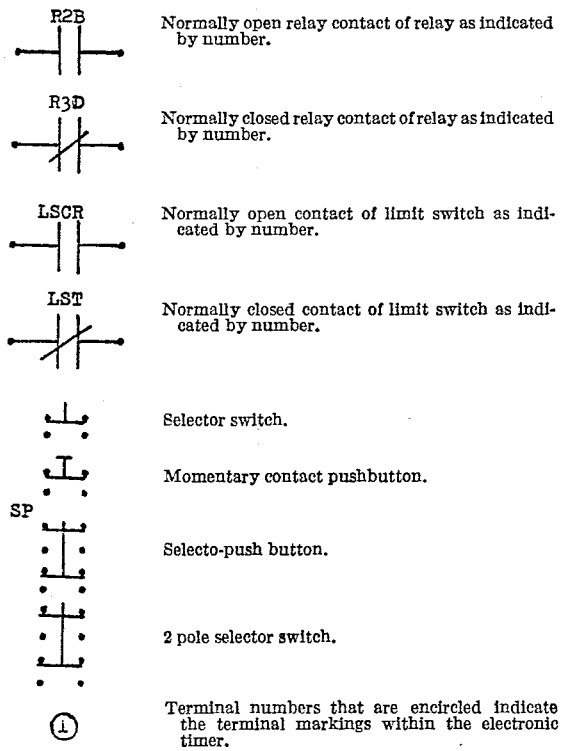

In the elementary diagram shown in FIGURES 40 to 44 inclusive, wherever two contacts are assigned the same number or indication they are embodied in the same switch.

In order to simplify the diagrammatic showing of the control circuits shown in FIGURES 47 to 54, inclusive, the wires connecting the various control elements are assembled in groupings. As an illustration the grouping 635 comprises sixteen individual wires which are grouped together and go from the panel at the lower right hand side of FIGURE 54 to the control panel shown in FIGURES 47 and 48. In this grouping 635 the wire from contact 45c will go to 45c in the panel shown in FIGURE 48. Also in order to clarify and simplify the showing of the various circuits the lines crossing one another do not indicate that an electrical connection is made at the points where they intersect. Therefore there is no electrical connection at grouping or wire intersections. The reference characters indicating the groupings of wires are inserted in order to more easily follow the circuits through FIGURES 47 to 54 inclusive. As a general rule the groupings of wires are disposed in troughs located suitably in the device and each individual wire in such groupings goes from the contact indicated to the contact having a similar reference character located at another position in the installation.

Grouping 637 indicates the various wires going from panel 638 to the control elements 553, 556, 558 and 560. Grouping 639 extends from panel 638 to control elements 554, 555, 557 and 559. The grouping 640 extends from panel 638 to control elements 533 and 535 while grouping 641 goes from 638 to control elements 536. Grouping 642 goes to solenoid 530 and grouping 643 to solenoid 591.

Figure 53:
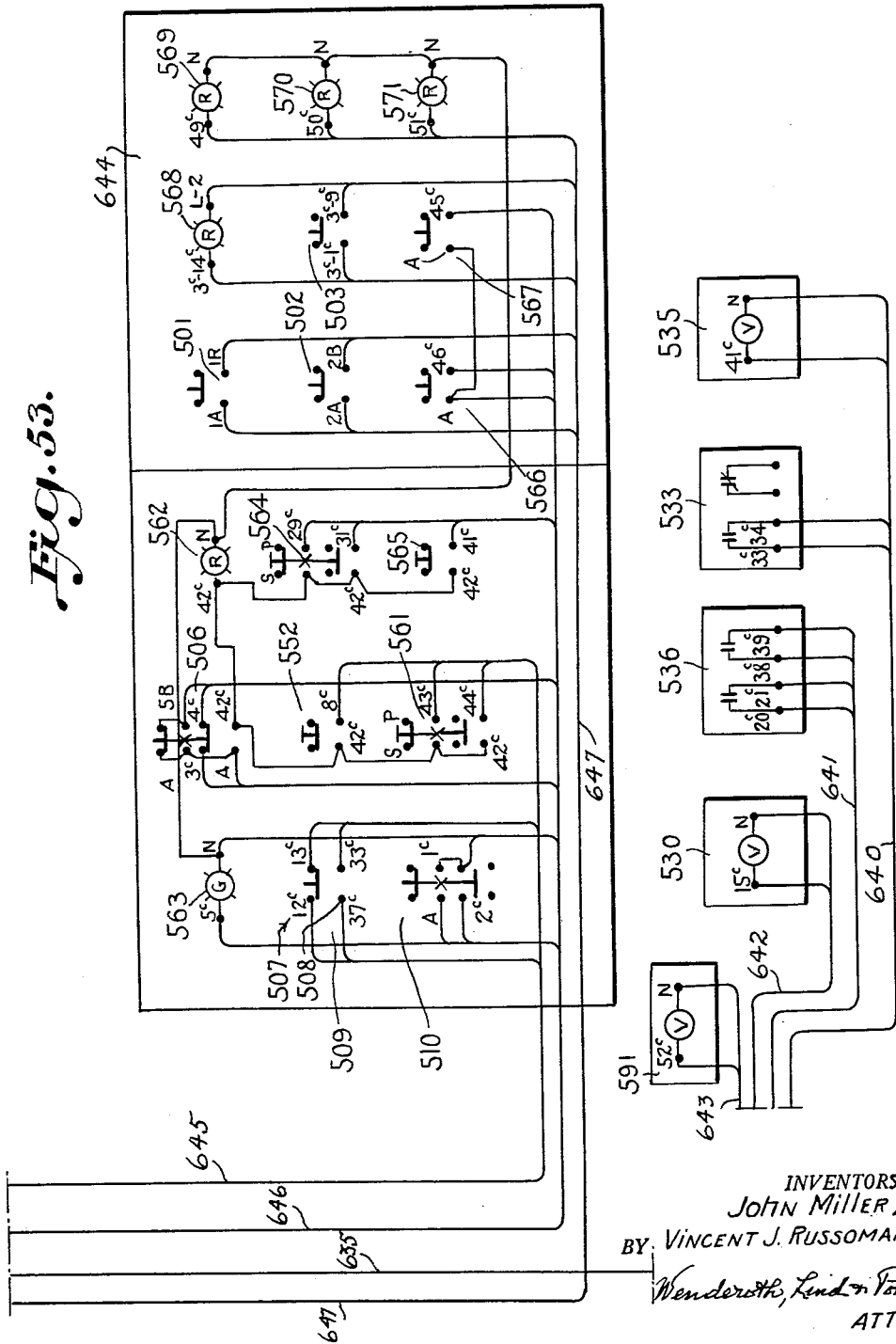
FIGURE 53 is a similar view below FIGURE 52 showing particularly the control station.
Figure 48:
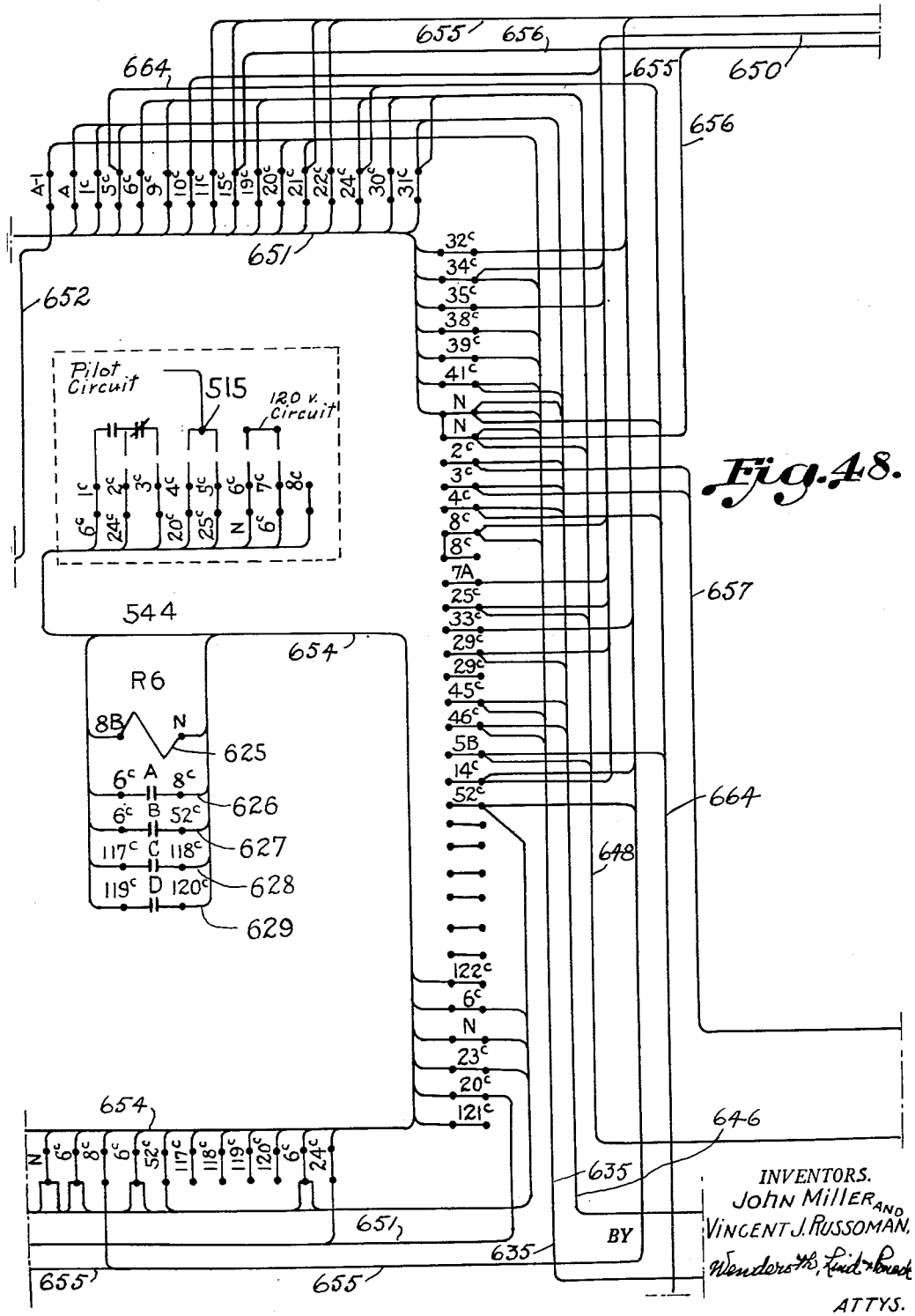
FIGURE 48 is a similar view continuing the showing in FIGURE 47 to the right thereof.
Figure 49:
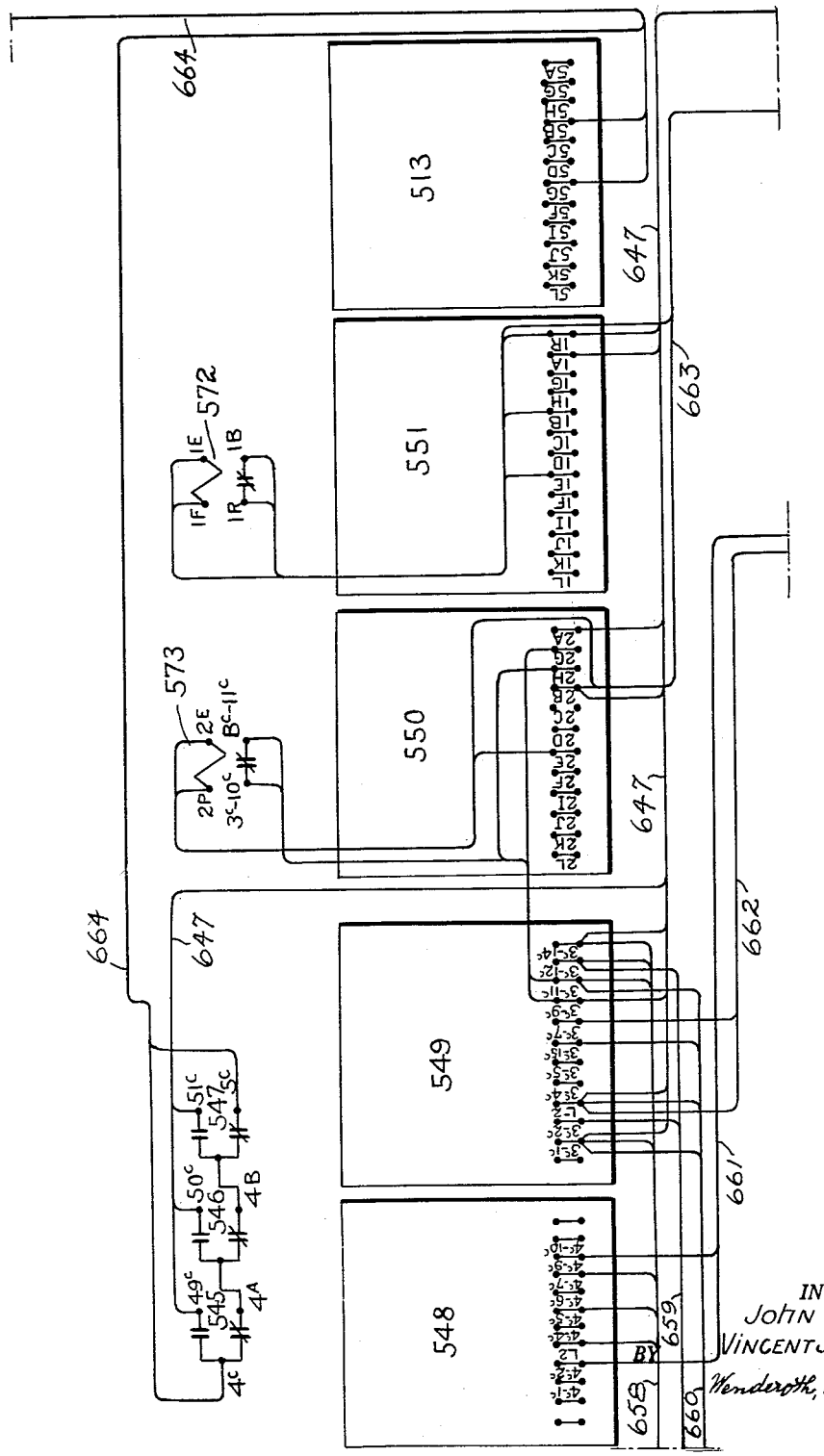
FIGURE 49 is a similar view continuing the showing of the control circuits in detail at the bottom of FIGURES 47 and 48.

From the control station 644 shown in FIGURE 53 three groupings 645, 646 and 647 extend to various control elements upon FIGURES 51, 48 and 49 respectively.

Figure 52:
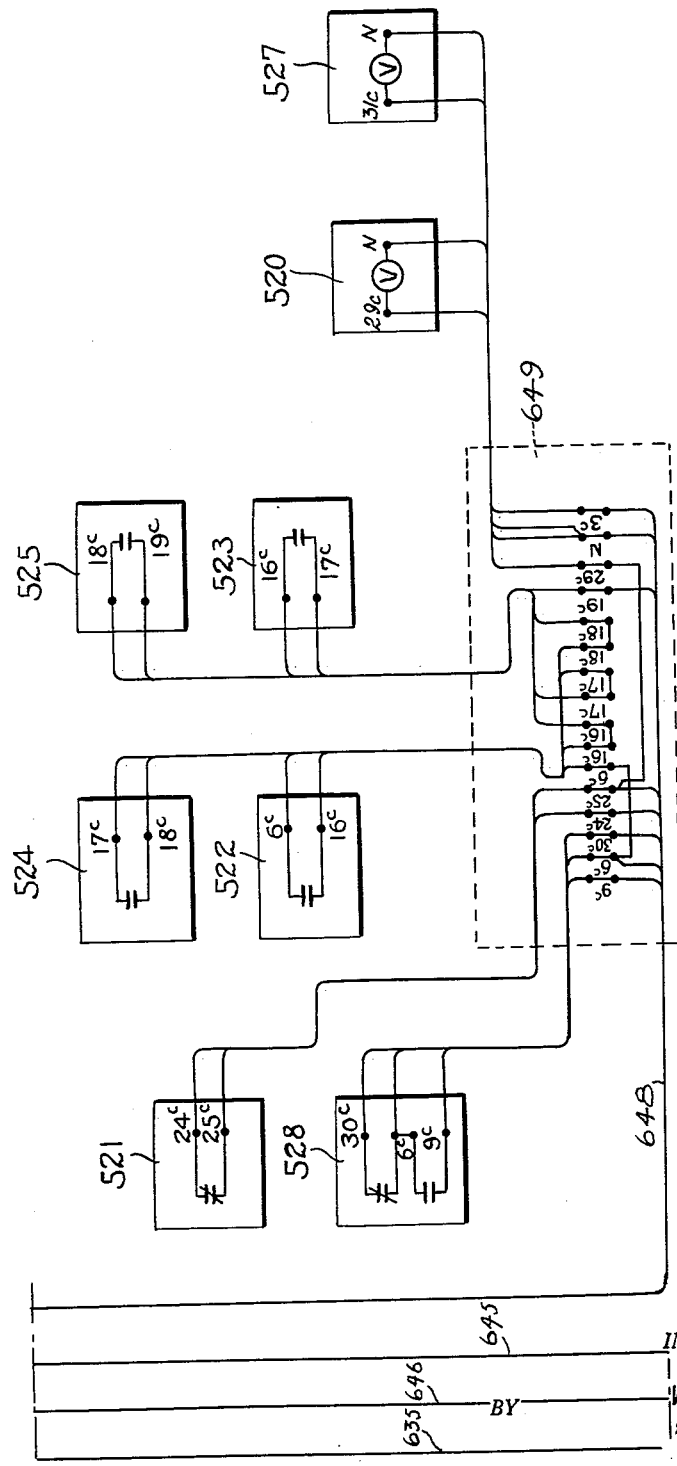
FIGURE 52 is a similar view of the control circuit continued below FIGURE 51.

Interconnecting the panel 649 with its various contacts in FIGURE 52 and the various contacts in FIGURE 48 is grouping 648.

Figure 47:
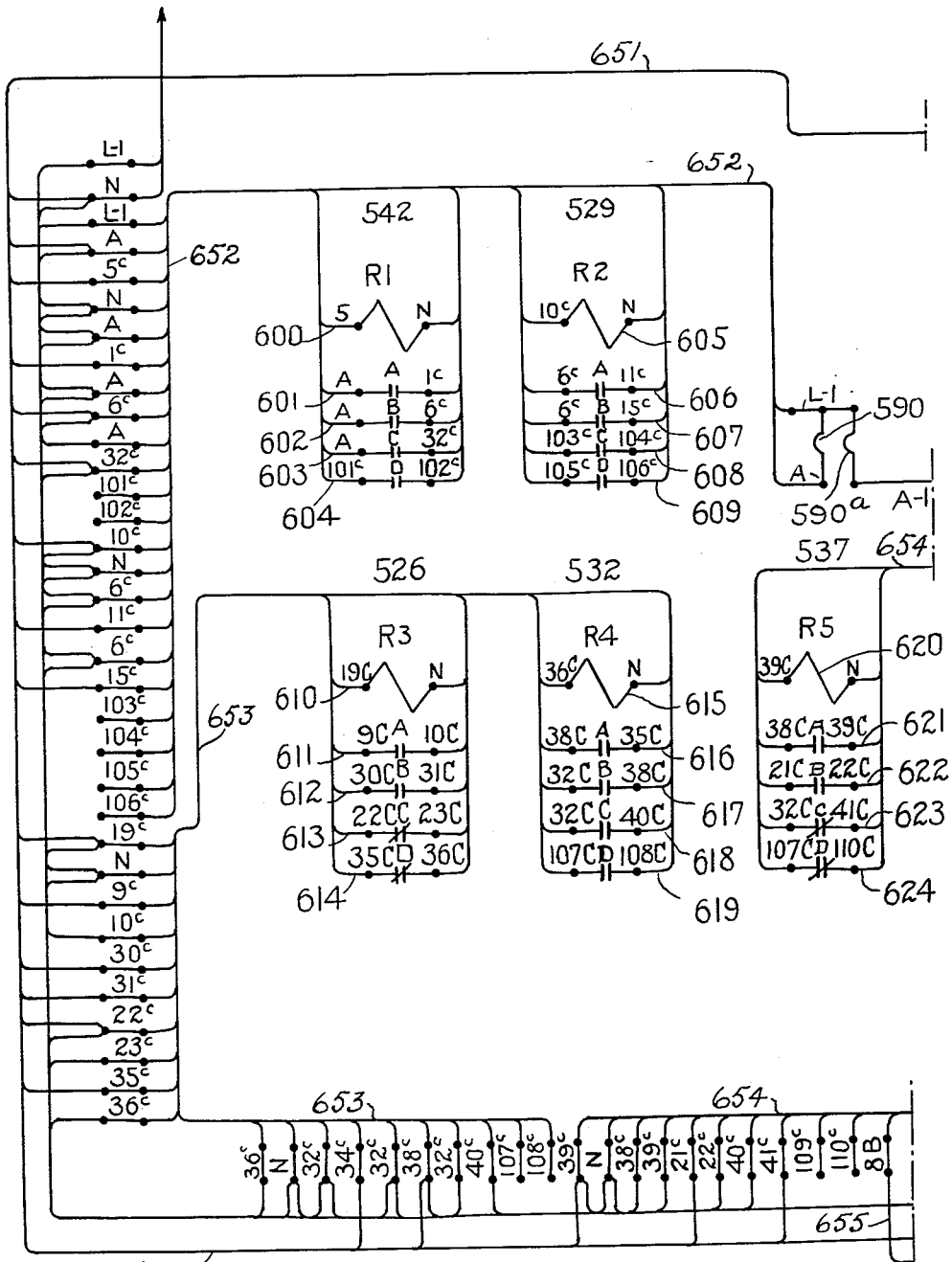
FIGURE 47 is a partial diagrammatic view showing a detailed portion of the control circuits.

A grouping 650 interconnects the control elements at the right of FIGURE 51 with the various contacts in FIGURE 48 and a grouping 651 interconnects a plurality of contacts in FIGURES 47 and 48.

A grouping 652 interconnects various contacts in FIGURE 47 to the relay circuits of 542 and 529 while grouping 653 connects relay circuits 526 and 532. Similarly grouping 654 in FIGURES 47 and 48 connects relay circuits of 537 and 544.

A grouping 655 from the contacts at the left of FIGURE 51 extends to various contacts shown in FIGURES 47 and 48.

Grouping 656 goes from solenoid 530 (FIGURE 51) to contacts in FIGURE 48 and grouping 657 from stop switch 541 in FIGURE 51 to contacts 2c and 3c in FIGURE 48.

Grouping 658 interconnects stop switch 578, solenoid 504 and soap solenoid 581 in FIGURE 50 with starters 548 and 549 in FIGURE 49.

Grouping 659 connects overload switch 579 and slack chain switch 580 in FIGURE 50 with starter 549 (FIGURE 49) while grouping 660 extends from elements 582, 583 and 586 to 549.

Figure 54:
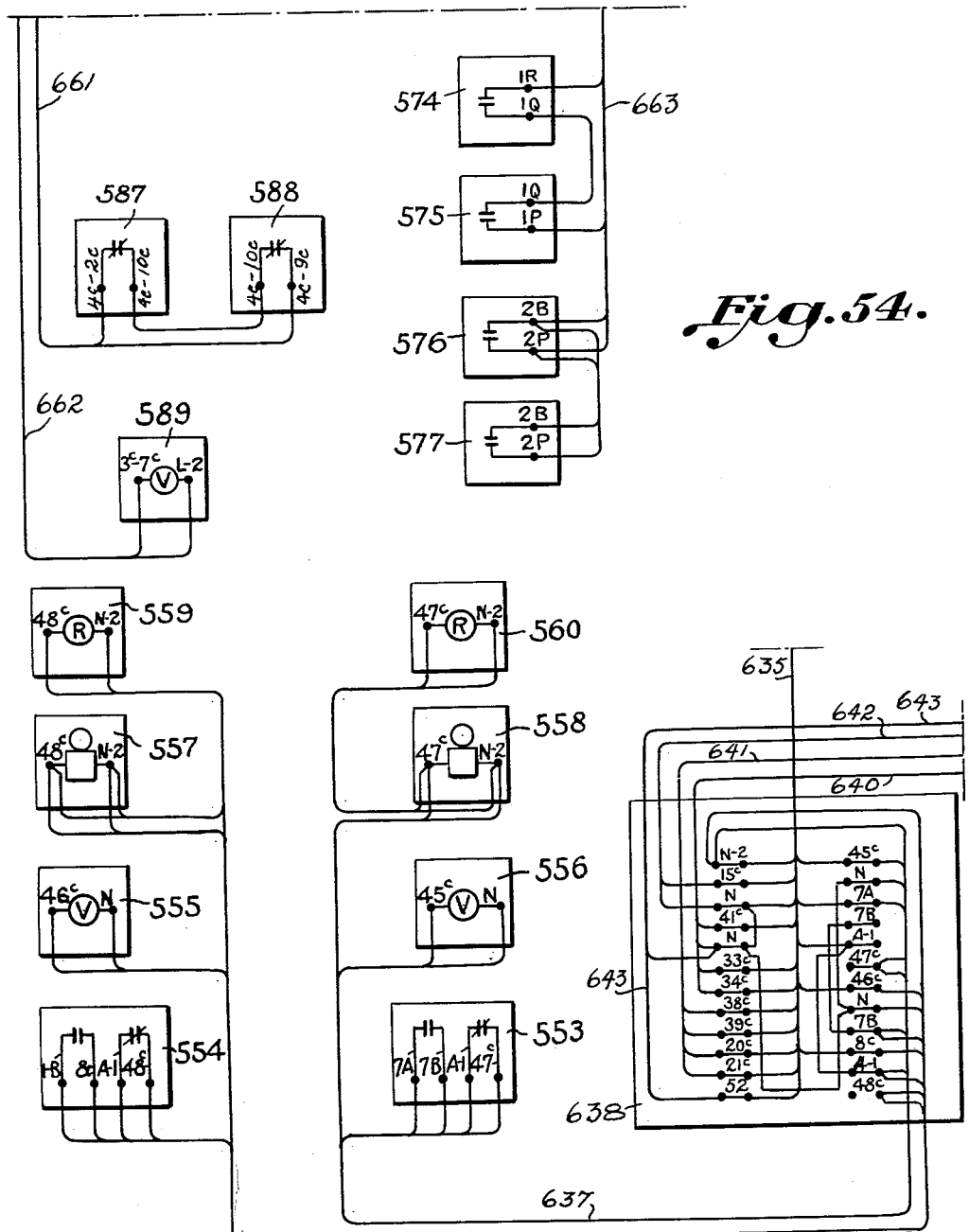
FIGURE 54 is a similar view showing the control circuit to the left of FIGURE 53.

Grouping 661 goes to starter 548 for conveyor No. 4 in FIGURE 49 from overload switch 587 and slack chain switch 588 in FIGURE 54 while grouping 662 interconnects starter 549 and soap solenoid 589 in same figures.

Grouping 663 interconnects switches 574, 575 and 576 in FIGURE 54 with 550 and 551 in FIGURE 49.

The lift pump starter 513 and pressure switches 545, 546 and 547 in FIGURE 49 are connected to various contacts in FIGURE 48 by grouping 664.

In addition to the above listings of the major groupings extending to different figures there are shown in each figure smaller groupings of wires which are clearly evident from the diagrammatic showing.

To facilitate an understanding of the coaction of the hydraulic and electrical control components which are shown in FIGURES 17, 18, 19, 34 and 40 through 54, a schedule of the switches, relays, solenoids, etc. is tabulated below and the function for each of these elements is given in this schedule.

SELECTOR SWITCH SCHEDULE

| Identification | Function | No. des. |
|---|---|---|
| 1A — 1B | Base pallet conveyor 9 switch. | 501 |
| 2A — 2B | Conveyor S2 switch. | 502 |
| 3c-1c — 3c-9c | Conveyor No. 3 selector switch. | 503 |
| 4B, 5c, A, 42c, A, 5B | Manual-Off automatic selector switch. | 506 |
| 12c — 13c / 37c — 33c | 2-tier, 3-tier selector switch. | 507 |
| A — 1c | Initial start button. | 510 |
| 42c — 52c | Lift "Up" manual button. | 552 |
| | Lift "Down" selecto-push button. | 561 |
| "Lower" Position 42c, 43c, 44c | Contact 42c and 44c close when depressed. | ---- |
| "Center Bottom" Position 42c, 43c, 44c | Contact 42c and 43c close when depressed. | ---- |
| | Carriage K40 forward and reverse selecto-push button. | 564 |
| "Retract" Position 42c, 29c, 31c | Contact 42c and 31c close when depressed. | ---- |
| "Forward" Position 42c, 29c, 31c | Contact 42c and 29c close when depressed. | ---- |
| 42c — 41c | Intermediate carriage 91 forward button. | 565 |
| A — 46c | Base magazine gates 109 open and close selector switch. | 566 |
| A — 45c | Intermediate magazine gates 101 open and close selector switch. | 567 |
| 3c-15c — 3c-12c / 3c-1c — 3c-14c | Conveyor No. 3 "Off" switch. | 583 |
| 3c-11c — 3c-15c / 3c-16c / 3c-1c — 3c-19c | Manual automatic conveyor switch for conveyor No. 3. | 582 |
| 3c-1c — 3c-9c | "On"-"Off" switch for conveyor No. 3. | 585 |
| 3c-17c — 3c-18c | Safety switch. | 584 |

SOLENOID SCHEDULE

| Solenoid identification | Function | No. des. |
|---|---|---|
| CF 29c (CF) N | Moves the main carriage K40 forward. | 520 |
| CR 31c (CR) N | Retracts the main carriage K40. | 527 |
| PF 41c (PF) N | Moves intermediate carriage 91 forward. | 535 |
| LD 15c (LD) N | Moves lift 8 down. | 530 |
| LU 52c (LU) N | Moves lift 8 up. | 591 |
| BG 46c (BG) N | Opens gates 109 on base pallet magazine. | 555 |
| IG 45c (IG) N | Opens gates 101 on intermediate pallet magazine. | 556 |

LIMIT SWITCH SCHEDULE

| Limit switch identification | Function | No. des. |
|---|---|---|
| LSBP 6c — 7c | Permits lift to run up when an empty base pallet is in position. | 511 |
| LSIM 7A — 7B | a. Prevents lift from recycling when the supply of pallets in the intermediate magazine 14 is low. b. Rings bell and lights pilot light when intermediate pallet magazine is low. | 553 |
| LSBM 7B — 8c / A1 — 48c | a. Prevents lift from recycling when the supply of pallets in the base magazine 11 is low. b. Rings bell and lights pilot light when base pallet magazine is low. | 554 |
| LSK1 6c — 16c | Energizes R3-526 relay when four kegs are in position in carriage K40, energizing CR 527 solenoid. | 522 |
| LSK2 16c — 17c | Energizes R3-526 relay when four kegs are in position in main carriage, energizing CR 527 solenoid. | 523 |
| LSK3 17c — 18c | Energizes R3-526 relay when four kegs are in position in main carriage, energizing CR 527 solenoid. | 524 |
| LSK4 18c — 19c | Energizes R3-526 relay when four kegs are in position in main carriage, energizing CR 527 solenoid. | 525 |
| LSK5 25c — 26c | Permits solenoid CF 520 to be energized when four kegs are in position behind keg stops K1. | 516 |
| LSK6 26c — 27c | Permits solenoid CF 520 to be energized when four kegs are in position behind keg stops K1. | 517 |
| LSK7 27c — 28c | Permits solenoid CF 520 to be energized when four kegs are in position behind keg stops K1. | 518 |
| LSK8 28c — 29c | Permits solenoid CF 520 to be energized when four kegs are in position behind keg stops K1. | 519 |
| LSIC 38c — 39c / 20c — 21c | a. De-energizes solenoid 535 PF when the intermediate carriage is extended. b. Permits timer pilot circuit 515 to be energized when the intermediate carriage is retracted. | 536 |

LIMIT SWITCH SCHEDULE—Continued

| Limit switch identification | Function | No. des. |
|---|---|---|
| LSPF  34c / 35c | Prevents the intermediate carriage from injecting a second pallet when one is in position. | 534 |
| LSIP  33c / 34c | Permits relay R4-532 to be energized, energizes solenoid LD 530. | 533 |
| LSG  7c / 7A | a. Permits lift to run up when gate 73 is up. | |
| 10c / 14c | b. Permits relay R2-529 to be energized, energizing solenoid LD 530. | 512 |
| LST  8c / 8B | a. Stops the lift at the top level. | |
| 21c / 22c | b. Permits timer pilot circuit 515 to be energized. | 514 |
| LSC  11c / 12c | a. Stops the lift moving down at the center level. | |
| 32c / 33c | b. Permits relay R4-532 to be energized, energizing solenoid 535 PF. | 531 |
| LSL  12c / 13c | a. Stops the lift moving down to the lower level. | |
| 32c / 37c | b. Permits relay R4-532 to be energized, energizing 535 PF. | 538 |
| LSCL  43c / 15c | Stops lift moving down in manual operation to the center and lower levels. | 543 |
| 44c / 15c | | |
| LSCF  24c / 25c | De-energizes solenoid CF 520. | 521 |
| LSCR  6c / 9c | a. Permits relay R2-529 to be energized, energizing solenoid LD 530. | |
| 6c / 30c | b. De-energizes solenoid CR 527. | 528 |
| LSTD-1  1R / 1Q | Time delay limit switch—operating TDR1-572. | 574 |
| LSTD-2  1Q / 1P | Time delay limit switch—operating TDR1-572. | 575 |
| LSTD-3  2B / 2P | Time delay limit switch—operating TDR2-573. | 576 |
| LSTD-4  2B / 2P | Time delay limit switch—operating TDR2-573. | 577 |

OTHER CONTROL ELEMENTS

| Identification | Function | No. des. |
|---|---|---|
| 3c / 4c / 49c | Pressure switch No. 1, stops operation when air pressure is low. | 545 |
| 4c / 4A / 50c | Pressure switch No. 2, stops operation when air pressure is low. | 546 |
| 4A / 4B / 51c | Pressure switch No. 3, stops operation when air pressure is low. | 547 |
| 3c-12c / 3c-13c | Slack chain switch for conveyor No. 3, stops conveyor No. 3 when chain is slack. | 579 |
| 4c-9c / 4c-10c | Slack chain switch for conveyor No. 4, stops conveyor No. 4 when chain is slack. | 587 |
| 3c-12c / 3c-2c | Mechanical overload switch for conveyor No. 3, stops conveyor No. 3 under an overload condition. | 580 |
| 4c-10c / 4c-2c | Mechanical overload switch for conveyor No. 4, stops conveyor No. 4 under an overload condition. | 588 |
| M-3 | Conveyor No. 3 starter (D.C.) | 549 |
| M-4 | Conveyor No. 4 starter (D.C.) | 548 |
| M-2 | Conveyor S2 (A.C.) starter. | 550 |
| M-1 | Base pallet conveyor 9 (A.C.) Starter. | 551 |
| 48c — N | Warning bell base pallet. | 557 |
| 47c — N | Warning bell intermediate pallet. | 558 |
| 3c-7c (V) L-2 | Soap solenoid valve for conveyor No. 3. | 581 |
| 4c-7c (V) L-2 | Soap solenoid valve for conveyor No. 4. | 589 |
| ) | Control circuit breaker | 590 |
| ) | Control circuit breaker | 590a |
| 5D — 5E | Lift pump starter | 513 |

PILOT LIGHT SCHEDULE

| Pilot light identification | Function | No. des. |
|---|---|---|
| 42c (R) N | Manual control pilot light. | 562 |
| 5c (G) N | Automatic control pilot light. | 563 |
| 48c (R) N | Warning light indicating supply of base pallets low. | 559 |
| 47c (R) N | Warning light indicating supply of intermediate pallets low. | 560 |

PILOT LIGHT SCHEDULE—Continued

| Pilot light identification | Function | No. des. |
|---|---|---|
| 49c —(R)— N | Low pressure pilot light No. 1. | 569 |
| 50c —(R)— N | Low pressure pilot light No. 2. | 570 |
| 51c —(R)— N | Low pressure pilot light No. 3. | 571 |
| 3c-14c —(R)— L-2 | Pilot light for conveyor No. 3 when "Off" in racking room. | 568 |
| 3c-19c —(R)— L-2 | Conveyor No. 3 manual operation pilot light. | 586 |

RELAY SCHEDULE

| Diagram | Function | No. des. |
|---|---|---|
| | Relay R1-542—4 pole relay. See Figure 47. | |
| 5c ∧ N | Relay coil starts and stops circuit for machine. | 600 |
| A —A— 1c | Hold in circuit for R1-542. | 601 |
| A —B— 6c | Feed for lift and carriage control circuits, also feed for timer 592. | 602 |
| A —C— 32c | Feed for intermediate pallet control circuits. | 603 |
| 101c —C— 102c | Spare contact. | 604 |
| | Relay R2-529—4 pole relay. | |
| 10c ∧ N | Coil—energized by LSCR 528 and RE-526 for operation of the lift moving down (LD 530 is energized). | 605 |
| 6c —A— 11c | In series with LSC 531, LSL 538, LSB 539, and LSG 512 for holding in circuits for R2-529. | 606 |
| 6c —B— 15c | Energizes solenoid LD 530. | 607 |
| 103c —C— 104c | Spare contact. | 608 |
| 105c —D— 106c | Spare contact. | 609 |
| | Relay R3-526—4 Pole Relay. | |
| 19c ∧ N | Coil energized by LSK1 522, LSK2 523, LSK3 524, LSK4 525 actuated by four kegs in position in carriage. | 610 |
| 9c —A— 10c | In series with LSCR 528 to energize R2-529. | 611 |
| 30c —B— 31c | In series with LSCR 528 to energize solenoid CR 527. | 612 |

RELAY SCHEDULE—Continued

| Diagram | Function | No. des. |
|---|---|---|
| 22c —C— 23c | In series with LST 514, LSIC 536, 622 to energize timer pilot circuit 515. | 613 |
| 35c —D— 36c | In series with LSPF 534, LSIP 533, and LSC 531, or LSL 538 to de-energize R4-532. | 614 |
| | Relay R4-532—4 pole relay. | |
| 36c ∧ N | Coil energized by LSC 531 or LSL 538 in series with LSIP 533 and LSPF 534 and 614. | 615 |
| 32c —A— 35c | Hold in circuit for R4-532. | 616 |
| 32c —B— 38c | In series with LSIC 536 to energize R5-537. | 617 |
| 32c —C— 40c | In series with 623 to energize solenoid 535 PF. | 618 |
| 107c —D— 108c | Spare contact. | 619 |
| | Relay R5-537—4 pole relay. | |
| 39c ∧ N | Coil energized by 617 in series with LSIC 536. | 620 |
| 38c —A— 39c | Hold in circuit for R5-537. | 621 |
| 21c —B— 22c | In series with LSIC 536, R3C 526 to energize timer circuit 515. | 622 |
| 40c —C— 41c | In series with 618 to de-energize solenoid 535 PF. | 623 |
| 109c —D— 110c | Spare contact. | 624 |
| | Relay R6-544—4 pole relay. See Figure 48. | |
| 8B ∧ N | Coil energized by LSPB and LSG, and LST for operation of the lift moving up. | 625 |
| 6c —A— 8 | Seals in switches LSBP, LSG, LSIM, LSBP, to keep the coil of R6-544 energized. | 626 |
| 6c —B— 52c | Energizes solenoid LU 591. | 627 |
| 117c —C— 118c | Spare contact. | 628 |
| 119c —D— 120c | Spare contact. | 629 |
| TDR1 | Time delay relay #1 de-energizes starter 551 after time delay. | 572 |
| TDR2 | Time delay relay #2 stops conveyor No. 3 after time delay. | 573 |

In addition to the above, 578 is a remotely located stop switch. 541 is also a remotely located stop switch for stopping the machine located between contacts 2c and 3c. Normally closed thermal overload contacts 630 and 631 cooperate with the lift pump starter 513. The overload contacts 632 and 633 are associated with the starter 551 for base pallet conveyor 9. Overload contact 634 normally closed cooperates with starter 549 for conveyor No. 3. Overload contacts are also provided to cooperate with the starters for conveyors Nos. 4 and S2.

The details of the electrical control circuit and features of the co-action between the pneumatic control and the electrical control are shown in FIGURES 17, 18, 19, 34 and 40 through 54, and are as described hereinafter.

To facilitate an understanding of the description to follow, it will be assumed that before starting operation the following conditions prevail:

(a) The conveyors, skids, and other elements of the machine are completely clear of any kegs, pallets, or other objects, except as described in paragraphs (d) and (e).

(b) All limit switches and relays will be in their normal positions as shown in FIGURES 40 to 44 inclusive, and as hereinbefore listed in the Relay Schedule and Limit Switch Schedule, and as shown on the drawings.

(c) When a relay has been energized, its normally open contacts will be closed, and its normally closed contacts will open. When a relay has been deenergized, its contacts will assume their normal positions.

(d) Upon starting operation, the base pallet magazine 11 will be properly loaded with base pallets 10, and the intermediate pallet magazine 14 will be properly loaded with intermediate pallets 12.

(e) Kegs will be moving on the racking room carousel conveyor No. 1, and after the start of the operation, the kegs will travel from the racking room carousel conveyor to the machine, via conveyors Nos. 2, 3 and 4 and skids 4 and 5 under belt conveyors S2 up to the skid stops K1.

The conveyor elements of the machine have additional switches in their respective control circuits to accomplish the following:

(a) *Slack chain switch.*—To open the control circuit, stopping the conveyor, in the event of a conveyor chain being too slack.

(b) *Mechanical overload.*—To open the control circuit, stopping the conveyor, in the event of an overload developing in the conveyor chain or drive mechanism.

(c) *On-Off switches.*—Remotely located, to stop conveyors in the case of an emergency, and to facilitate handling and operation.

(d) *Manual, Off, Auto, Selector Switch.*—To control the conveyor so as to facilitate manual palletizing in the event of a breakdown in the palletizing machine.

(e) *Soap solenoid.*—Located at a conveyor, and energized when the conveyor is running, thereby permitting soap lubricant to drip onto the conveyor chain.

The conveyor elements of the machine are started in the following manner;

(a) Set selector switch 503 (FIGURES 43 and 53) in the "On" position to energize conveyor No. 3 motor starter M–3, 549, thereby starting conveyor No. 3.

(b) When conveyor No. 3 motor starter M–3, 549 (FIGURES 45 and 49) is energized, the circuit is completed, through its auxiliary contact 549a, energizing conveyor No. 4 starter M–4, 548, thereby starting conveyor No. 4.

(c) When conveyor No. 4 motor starter M–4, 548, is energized, the circuit is completed, through its auxiliary contact 548a, energizing the brush-off solenoid 504 (FIGURES 44 and 50). This valve opens the main air supply to move the conveyor brush-off arm 141 outward. The brush-off arm brushes the kegs from the racking room carousel conveyor No. 1 onto conveyor No. 2 which continue forward on conveyor No. 4.

(d) The base pallet selector switch 501 (FIGURES 42 and 53) is set in the "On" position to complete the circuit energizing the motor starter M–1, 551 of conveyor 9 thereby starting the base pallet conveyor.

(e) The skid belt selector switch 502 is set in the "On" position to complete the circuit energizing the motor starter M–2, 550 of belt S2 thereby starting the skid belt conveyor.

Before the initial start of the machine, the following conditions must be satisfied:

(a) Set key operated "Man," "Off," "Auto" selector switch 506 (FIGURE 40) in the Auto position (contacts 4B and 5c closed, and contacts A and 5B closed). Contacts A and 5B are closed in either the "Man" position or the "Auto" position, completing the circuit to energize the motor starter 513 for pump 168, thereby starting the hydraulic pump motor 167 (FIGURE 46).

(b) Set tier selector switch 507 (FIGURES 40 and 53) for either 2-tier, 508, or 3-tier, 509 operation. Contacts 12c and 13c are closed and contacts 37c and 33c are open for 2-tier operation. Contacts 12c and 13c are open and contacts 37c and 33c are closed for 3-tier operation.

The initial "Start" button 510 is momentarily depressed to prepare all circuits for operation. Thus, contact A is momentarily closed and the circuit is completed, energizing relay R1, 542, thereby closing relay contacts R1A–601, R1B–602, R1C–603, and R1D–604 (FIGURES 40, 41 and 47). Contacts A and I are sealed through contact R1A, 601.

When an empty base pallet is conveyed, on base pallet conveyor 9, into position over the lift, the switch LSBP, 511 is actuated (contacts 6c and 7c closed), and gate 73 is up, releasing LSG, 512 (contacts 7c and 7a closed, 10c and 14c open), the circuit will be closed (contacts 6c through 8B closed), energizing relay R6, 544. Relay R6, 544 seals itself in through R6A, 626 (contacts 6c and 8B closed). When R6, 544 is energized, the circuit will be completed through R6B–627 (contact 6c and 52c closed) thereby energizing solenoid LU 591, which initiates the upward motion of the lift. The lift will ascend to the top level, actuating LST, 514 (contacts 8c and 5B open, contacts 21c and 22c closed), which opens the circuit de-energizing relay R6, 544, thereby de-energizing solenoid LU, 591 (contact 6c and 52c open, R6B–627), and stopping the lift 8 at the top position.

As the lift begins to ascend from the bottom position, poppet valve BP8 is actuated, which opens the main air supply A7 to lower gate 73, and to actuate LSG, 512 (FIGURES 40 and 50) (contacts 7c–7a are open and contacts 10c–14c are closed). Gate 73 must remain down, depressing LSG, 512 (contacts 10c–14c are closed and contacts 7c–7a are open), to permit the lift to travel through its down cycle, as described in the following paragraphs.

LST, 514 also energizes the electronic timer pilot circuit 515 (FIGURE 41). When the timer completes the timing cycle (contacts 21c and 22c closed), and four kegs are in position at skid belt conveyor S2, actuating LSK5, 516; LSK6, 517; LSK7, 518; and LSK8, 519, respectively (contacts 25c through 29c closed), the circuit is closed, energizing solenoid CF, 520 (FIGURE 52), and opens the main air supply to move the carriage to its forward position by pneumatic cylinder 35. When the carriage reaches its forward position it actuates LSCF, 521 (contacts 24c–25c open), de-energizing solenoid CF, 520( FIGURES 41 and 52), stopping the carriage at its forward position.

The forward position of the carriage also operates poppet valve K2 which actuates valve stem K5 in cylinder K4, which opens the main air supply and moves the keg skid stops K1 down. The kegs then roll forward onto the carriage, actuating LSK1, 522; LSK2, 523; LSK3, 524 and LSK4, 525 (contacts 6c through 19c close), and this closes the circuit energizing relay R3, 526 (FIGURES 40 and 17).

When relay R3–526 is energized, the circuit is closed (R3B–612, contacts 30c and 31c are closed) thus energizing solenoid CR, 527 (FIGURES 41 and 52), which opens the main air supply to move the carriage K40 to its retracted position.

The action of the carriage moving back discharges the kegs thereon upon the pallet in position on the lift. As the carriage moves back, poppet valve K2 is released, opening the main air supply to move the keg stops K1 up, thereby preventing movement of additional kegs.

When the carriage reaches its retracted position LSCR, 528 (FIGURES 41 and 52) will be actuated (contacts 6c and 9c close and contacts 6c–30c open), and R3A–611 will be closed (contacts 9c and 10c closed), energizing relay R2, 529 (FIGURE 40) and de-energizing solenoid CR, 527 (FIGURE 41), stopping the carriage in its retracted position.

When R2, 529 is energized, the circuit will be closed (R2B–607), contacts 6c and 15c closed), energizing solenoid LD, 530 (FIGURE 40), which will permit the lift to descend.

As the lift is descending, LSK1, 522; LSK2, 523; LSK3, 524; and LSK4, 525 (FIGURE 40) will be cleared by the kegs (contacts 6c through 19c open), de-energizing relay R3, 526 (FIGURE 40), opening R3A–611 (contacts 9c and 10c open).

Relay R2, 529 remains energized through R2A, 606; LSC, 531; LSL, 538; LSB, 539; and LSG, 512 (contacts 6c through 10c closed). The lift will continue to descend until it reaches the center position (FIGURE 21), actuating LSC, 531 (contacts 11c–12c open and contacts 32c–33c close) (FIGURES 40 and 50), which opens the circuit, de-energizing R2, 529. When R2, 529 (FIGURES 40 and 47) is de-energized, it opens the circuit de-energizing solenoid LD, 530 (R2B–607, contacts 6c and 15c open) (FIGURE 40), which stops the downward movement of the lift, for receiving an intermediate pallet as described hereinafter.

When LSC, 531 (contacts 32c–33c close and contacts 11c–12c open, FIGURE 40) is actuated, the circuit will be completed, energizing relay R4, 532, if the following conditions are satisfied:

(a) Relay R3, 526 (FIGURES 40 and 47) is de-energized, by the lift descending, permitting the kegs to clear LSK1, 522; LSK2, 523; LSK3, 524; and LSK4, 525 (contacts 35c and 36c closed, R3D–614).

(b) LSIP, 533 (FIGURES 41 and 50) is actuated by an intermediate pallet in position on its carriage (contacts 33c–34c closed).

(c) LSPF, 534 is cleared (contacts 34c–35c closed).

When R4, 532 is energized (R4 sealed in through R4A–616, contacts 32c and 35c closed), the circuit will be closed (contacts 32c and 40c closed), energizing solenoid 535PF which opens the main air supply to piston IP14 to move the intermediate carriage 91 and pallet pusher to their forward position. This places an intermediate pallet 12 over the kegs on the lift and another one behind it in position to drop upon the angle irons carried by the carriage. When the intermediate carriage 91 reaches its forward position, LSIC, 536 (FIGURE 50) will be actuated in the forward position, (contacts 38c–39c closed, contacts 20c–21c open) closing the circuit to energize relay R5, 537 (FIGURES 41 and 47). Relay R5, 537 is sealed in through R5A–621 (contacts 38c and 39c closed). When R5, 537 is energized it opens the circuit (contacts 40c and 41c open, R5C–623) de-energizing solenoid 535PF. Poppet valve IP5 is also actuated by the forward position of the intermediate carriage. This valve opens the main air supply to move the intermediate carriage and the pusher to its retracted position, thereby actuating LSIC, 536 (FIGURE 41) in the retracted position (contacts 20c–21c closed and contacts 38c–39c opened).

While the intermediate carriage retracts, a mechanical stop 636 holds the intermediate pallet over the kegs until the carriage 91 and angle irons 124 are fully retracted and the pallet drops onto the kegs, actuating LSPF, 534 (contacts 34c–35c open) (FIGURE 41). Also, fingers 128 hold the second pallet in position so that it drops in front of the intermediate carriage 91 upon angle irons 124 when the carriage is fully retracted.

With R5, 537 energized (R5B–622, contacts 21c–22c closed), and LSIC, 536 actuated in the retracted position (contacts 20c and 21c closed), the timer pilot circuit 515 will again be closed. When the timer completes its timing cycle (contacts 6c and 24c close) and four kegs are in position on the skids 4 and 5, actuating LSK5, 516; LSK6, 517; LSK7, 518; and LSK8, 519 (contacts 25c through 29c closed), the circuit is closed, energizing solenoid CF, 520, which opens the main air supply to move the carriage K40 to its forward position. When the main carriage reaches its forward position it actuates LSCF, 521 (FIGURES 50 and 52) (contacts 24c–25c open), and de-energizes solenoid CF, 520 (FIGURE 41), stopping carriage K40 at its forward position.

By moving the main carriage forward, poppet valve K2 opens the main air supply to move the keg stops K1 down. The kegs roll forward into the carriage and actuate LSK1, 522; LSK2, 523; LSK3, 524; and LSK4, 525 (FIGURES 40 and 50) (contacts 6c through 19c closed), closing the circuit energizing relay R3, 526.

When relay R3, 526 is energized, the circuit is opened, de-energizing relay R4, 532 (R3d–614, contacts 35c and 36c open).

When R3, 526 is energized, the circuit is closed (R3B–612, contacts 30c and 31c) and solenoid CR, 527 is energized to open the main air supply and move the carriage K40 to its retracted position.

The action of the main carriage moving back permits the kegs to roll onto the pallet in position on the lift. As the carriage moves back poppet valve K2 is released, opening the main air supply to move the keg stops K1 up, thereby preventing the movement of additional kegs.

When the carriage K40 reaches its retracted position, LSCR, 528 is actuated (contacts 6c and 30c open), opening the circuit to de-energize solenoid CR, 527 which stops the carriage in its retracted position. When LSCR, 528 is actuated (contacts 6c and 9c closed), the circuit is closed, energizing relay R2, 529. When relay R2, 529 is energized, the circuit is closed (R2B–607, contacts 6c and 15c closed), energizing solenoid LD, 530, permitting the lift to descend.

The 3-Tier Operation

A 3-tier load is automatically controlled by setting selector switch 508 in the 3-tier position (contacts 12c and 13c open, contacts 33c and 37c closed).

As the lift descends, LSK1, 522; LSK2, 523; LSK3, 524; and LSK4, 525 (FIGURES 40 and 50) are cleared by the kegs (contacts 6c through 19c open), de-energizing relay R3, 526, opening R3A–611 (contacts 9c and 10c open). Relay R2, 529 remains energized through R2A–606; LSC, 531; LSL, 538; LSB, 539; and LSG 512 (contacts 6c through 10c closed). The lift continues to descend until it reaches the lower position, actuating LSL, 538 (contacts 12c–13c open), and the circuit opens, de-energizing R2, 529. When R2, 529 is de-energized, it opens the circuit (R2B–607, contacts 6c and 15c), which de-energizes solenoid LD, 530 and stops the downward movement of the lift, for receiving a second intermediate pallet 12 as described hereinafter.

When LSL, 538 is actuated (contacts 32c–37c open), the circuit will be completed, energizing relay R4, 532, if the following conditions are satisfied:

(a) Relay R3, 526 (FIGURES 40 and 47) is de-energized by the lift descending, permitting the kegs to clear LSK1, 522; LSK2, 523; LSK3, 524; and LSK4, 525 (contacts R3D–614, 35c and 36c closed).

(b) LSIP, 533 (FIGURE 41) is actuated by an intermediate pallet 12 in position on its carriage 91 (contacts 33c–34c closed).

(c) LSPF, 534 is cleared (contacts 34c–35c closed).

When R4, 532 is energized (R4 sealed in through R4A–616, contacts 32c and 35c closed), the circuit is closed (contacts 32c and 40c), thus energizing solenoid 535PF which opens the main air supply to move the intermediate carriage 91 and pallet pusher to their forward positions. This action places an intermediate pallet over the kegs on the lift and another one behind it in position to drop upon angle irons 124 in front of carriage 91. When the intermediate carriage reaches its forward position, LSIC, 536 will be actuated in the forward position (contacts 38c–39c closed and contacts 20c–21c open), closing the circuit to energize relay R5, 537. Relay R5, 537 is sealed in through R5A–621 (contacts 38c and 39c closed). When R5, 537 is energized, it opens the circuit (R5C–623 contacts 40c and 41c open), de-energizing solenoid 535PF. Poppet valve IP5 is actuated at the forward position of the intermediate carriage. Valve IP5 opens the main air supply to move the intermediate carriage to its retracted position, thereby actuating LSIC, 536 in the retracted position (contacts 38c–39c open and contacts 20c–21c closed).

While the intermediate carriage 91 retracts, a mechanical stop 636 holds the intermediate pallet 12 over the kegs until the carriage and angle irons 124 are fully retracted and the pallet drops onto the kegs, actuating LSPF, 534 (contacts 34c–35c open). Fingers 128 hold the second pallet in position so that it drops onto angle irons 124 when the carriage is fully retracted.

With relay R5–537 energized (R5B–622, contacts 21c and 22c closed) and LSIC, 536 actuated in the retracted position (contacts 20c and 21c closed), the timer pilot circuit, 515, will again be closed. When the timer completes its timing cycle (contacts 6c and 24c close) and four kegs are in position to actuate LSK5, 516; LSK6, 517; LSK7, 518; and LSK8, 519 (contacts 25c through 29c closed), the circuit energizing solenoid CF, 520 is closed and the main or supply opened to move carriage K40 to its forward position.

The carriage K40 at its forward position actuates LSCF, 521 (FIGURE 50) (contacts 24c–25c open), de-energizing solenoid CF, 520, stopping the carriage at its forward position. Poppet valve K2 is actuated by this main carriage movement and the main air supply is opened to move the keg stops K1 down. The kegs then roll forward into the carriage, actuating LSK1, 522; LSK2, 523; LSK3, 524; and LSK4, 525 (FIGURE 50), (contacts 6c–19c close), closing the circuit energizing relay R3, 526.

When relay R3, 526 is energized, the circuit is opened, de-energizing relay R4, 532 (R3D–614, contacts 35c and 36c open). When relay R3, 526 is energized, the circuit will be closed R3B–612, contacts 30c and 31c), energizing solenoid CR, 527; which opens the main air supply to move the main carriage to its retracted position.

The action of carriage K40 moving back permits the kegs to roll onto the pallet 12 which is in position on the second tier of kegs upon the lift. As the main carriage K40 moves back, poppet valve K2 is released, opening the main air supply to move the keg stops K1 up, thereby preventing the movement of additional kegs.

When the carriage reaches its retracted position, LSCR, 528 is actuated (contacts 6c–9c (FIGURE 41) closed and contacts 6c–30c (FIGURE 41) open), closing the circuit to energize relay R2, 529, and de-energize solenoid CR, 527, which stops the main carriage in its retracted position.

When R2, 529 is energized, the circuit is closed (R2B–607, contacts 6c and 15c closed), energizing solenoid LD, 530, which permits the lift 8 to descend.

As the lift descends, LSK1, 522; LSK2, 523; LSK3, 524; and LSK4, 525 are cleared by the kegs (contacts 6c–19c open), de-energizing relay R3, 526, thereby opening R3A–611 (contacts 9c and 10c open). Relay R2, 529 remains energized through R2A–606; LSC, 531; LSL, 538; LSB, 539; and LSG, 512 (contacts 6c through 10c closed), the lift continues to descend until it reaches the bottom position, actuating LSB, 539 (contacts 13c–14c open), which opens the circuit de-energizing relay R2, 529 (FIGURES 40 and 47). When R2, 529 is de-energized, it opens the circuit (R2B–607, contacts 6c and 15c open), and de-energizes solenoid LD, 530, which stops the lift at the bottom level.

After the lift has moved to the bottom level, the 3-tier unit load is discharged on the base pallet conveyor 9, which carries it away. When the unit load is on the base pallet conveyor 9, the descending lift actuates poppet valve BP13. Valve BP13 opens the main air supply to lower gate 72 and operates the base pallet magazine indexing fingers 74 and 75, which drop a base pallet to the lower fingers by the action of BP19. As the unit load clears gate 73, it actuates poppet valve BP3. Valve BP3 opens the main air supply and raises gate 73. When gate 72 is down, an empty base pallet moves into position and actuates LSBP, 511 (contacts 6c–7c being closed), and the before-mentioned cycle is repeated, initiating a new unit load.

*The 2-tier operation*

A 2-tier load is automatically controlled by setting the tier selector switch, 508, in the 2-tier position (contacts 12c and 13c closed, contacts 33c and 37c open).

The machine will progress through its cycle, as hereinbefore described for 3-tier operation, up to the point where the second tier of kegs roll forward into carriage K40 and the carriage is retracted.

When the carriage K40 has reached its retracted position, LSCR, 528 is actuated (contacts 6c and 30c open), opening the circuit to de-energize solenoid CR, 527, to stop the carriage in its retracted position. When LSCR, 528 is actuated (contacts 6c and 9c closed), the circuit is closed, energizing relay R2, 529. When relay R2, 529 is energized, the circuit is closed (R2B–607 contacts 6c and 15c closed), energizing solenoid LD, 530, permitting the lift to descend.

As the lift descends, LSK1, 522; LSK2, 523; LSK3, 524; and LSK4, 525 are cleared by the kegs (contacts 6c through 19c open), opening the circuit, de-energizing relay R3, 526, opening R3A–611 (contacts 9c and 10c open). Relay R2, 529 remains energized through R2A–606; LSC, 531; LSL, 538; LSB, 539; and LSG, 512 (contacts 6c through 10c closed). The lift continues to descend until it reaches the bottom position, actuating LSB, 539 (contacts 13c and 14c open), which opens the circuit de-energizing relay R2, 529. When relay R2, 529 is de-energized, it opens the circuit (R2B–607 contacts 6c and 15c open), de-energizing solenoid LD, 530, stopping the lift at the bottom position.

After the lift has moved to the bottom level, the 2-tier unit load is discharged on the base pallet conveyor 9 which carries it away. After the unit load is left on the discharge conveyor, the descending lift actuates a poppet valve BP13 which opens the main air supply to lower gate 72 and to move the base pallet magazine indexing fingers 74 and 75, dropping a base pallet to the lower fingers. As the unit load clears gate 73, it actuates a poppet valve BP3 which opens the main air supply to raise gate 73. When gate 72 is down, an empty base pallet moves into position, actuating LSBP, 511 (FIGURE 40) (contacts 6c–7c closed), and the before-mentioned cycle is repeated, initiating a new unit load.

When two unit loads are on the base pallet conveyor, LSTD1, 574, and LSTD2, 575 are both actuated (contacts 1R through 1P closed), closing the circuit to energize time delay relay TDR1, 572. When TDR1, 572 is energized (contacts 1R and 1B open), it opens the control circuit, de-energizing base pallet conveyor motor starter M1–551, thereby stopping the base pallet conveyor 9.

When the first unit load has been removed from the base pallet conveyor 9, LSTD1, 574 will be cleared (contacts 1R and 1Q open), opening the circuit to de-energize TDR1, 572. When TDR1, 572 has been de-energized and has timed out (contacts 1R and 1B closed), the circuit will be completed, energizing the base pallet conveyor motor starter control circuit, thereby starting the base pallet conveyor 9.

The electrical control circuits, for the following units of the machine, can be de-energized at any point of the operation by depressing the Stop buttons 540 and 541:
(a) The main carriage unit.
(b) Intermediate pallet unit.
(c) Hydraulic lift unit.

*For manual operation*

The machine can be operated manually as described hereinafter.

(1) Set Man, Auto selector switch in the Man position (contacts 4b and 5c open; contacts A and 42c closed).

(2) To raise lift:

Hold lift Up button 552 depressed (contacts A and 52c closed), energizing solenoid LU, 591.

(3) To lower lift:

(A) From top level to center level.—Set selecto-push button 561 in the Center, Bottom, position and hold button depressed (contacts 42c and 43c closed), energizing solenoid LD, 530. The lift will descend until LSCL, 543, is actuated (contacts 43c and 15c open) (44c and 15c closed) de-energizing solenoid LD, 530.

(B) From center level to lower level.—Set selecto-push button 561 in the Lower position and hold button depressed (contacts 42c and 44c closed), energizing solenoid LD, 530. The lift will descend until LSCL, 543, is cleared (contacts 43c and 15c closed, 44c and 15c open) de-energizing solenoid LD, 530.

(C) From lower level to bottom level.—Set selecto-push button 561 in the center Bottom position and hold button depressed (contacts 42c and 43c closed), energizing solenoid LD, 530.

(4) To move main carriage forward.—Set selecto-push button 564 in the FOW (Forward) position and hold button depressed (contacts 42c and 29c closed), energizing solenoid CF, 520.

(5) To move main carriage backward.—Set selecto-push button 564 in the RET (Retracted) position and hold button depressed (contacts 42c and 31c closed), energizing solenoid CR, 527.

(6) To move intermediate carriage forward.—Hold FOW (Forward) button 565 depressed (contacts 42c and 41c closed), energizing solenoid 535PF.

The operation of the device for 2- or 3-tiers as described previously is carried out automatically, semi-automatically or manually in accordance with the previous description of these operations.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

We claim:

1. An automatic conveying and tiering mechanism for palletizing unit loads of barriels in tiers, comprising a lift, a magazine for dished pellets, means for positioning a dished pallet upon said lift from said magazine, a transfer mechanism, means conveying barrels to said transfer mechanism, said transfer mechanism positioning the barrels for movement upon said pallet, means including a reciprocating carriage for moving said barrels from said transfer mechanism to said pallet and means for conveying a unit load from said lift.

2. An automatic conveying and tiering mechanism for palletizing unit loads of barrels in tiers, comprising a vertically movable lift, means for positioning a pallet upon said lift for each tier of barrels, a transfer mechanism, a pair of conveyors to bring the barrels to said transfer mechanism, said transfer mechanism positioning the barrels for rolling laterally away from said conveyors to a pallet on said lift, a pallet magazine for supplying pallets to said lift and conveying means to convey a unit load from said lift to storage or a transportation station.

3. An automatic conveying and tiering mechanism for palletizing unit loads of barrels in tiers, comprising a vertically movable lift, means for positioning a pallet upon said lift for each tier of barrels, a transfer mechanism, a pair of conveyors to bring the barrels to said transfer mechanism, said transfer mechanism positioning the barrels for rolling laterally away from said conveyors to a pallet on said lift, a pallet magazine for supplying pallets to said lift, an indexing mechanism which registers the number of pallets supplied from said magazine and conveying means to convey a unit load from said lift to storage or a transportation station.

4. An automatic unit palletizing device for forming tiered kegs on a plurality of vertically arrayed pallets having dished sections comprising a base pallet magazine, a vertically retractable lift to support and position a pallet to receive kegs in dished sections thereon, means for feeding base pallets from said magazine to said lift, an intermediate pallet magazine, means for delivering an intermediate pallet from said intermediate pallet magazine to said lift, the intermediate pallet being positioned over the kegs on a base pallet and supporting additional kegs which are delivered to said lift and conveyor means to withdraw the palletized load when the lift is lowered to the level of said conveyor means.

5. In an automatic conveying and tiering device to form unit palletized keg loads of at least two tiers, a hydraulic control for a transfer mechanism comprising a main air line, a three-way valve assembly, a cam actuated by a keg when received in said transfer mechanism, a piston and cylinder assembly actuated by said three-way valve and cam, said transfer mechanism including a gate to limit the forward position of the keg in said mechanism and a retractable support element, the actuation of said cam by the movement of said keg causing the retraction of said support element to discharge said keg to a tiering station.

6. In an automatic conveying and tiering device to form unit palletized keg loads of at least two tiers, a hydraulic control for a transfer mechanism comprising a main air line, a three-way valve assembly, a cam actuated by a keg when received in said transfer mechanism, a piston and cylinder assembly actuated by said three-way valve and cam, said transfer mechanism including a gate to limit the forward position of the keg and a retractable support element, the actuation of said cam by the movement of said keg causing the retraction of said support element to laterally transfer said keg on skids to a tiering station.

7. In an automatic conveying and tiering device to form unit palletized keg loads of at least two tiers, a hydraulic control for a transfer mechanism comprising a conveyor for conveying kegs to said transfer mechanism, a main air line, a three-way valve assembly, a cam actuated by a keg when received in said transfer mechanism, a piston and cylinder assembly actuated by said three-way valve and cam, said transfer mechanism including a gate dropping towards said conveyor to limit the forward position of the keg on said conveyor, a retractable support element adjacent said conveyor and skids below said support element, the actuation of said cam by the movement of said keg causing the retraction of said support element to laterally transfer said keg on said skids to a tiering station.

8. In an automatic conveying and tiering device to form unit palletized keg loads of at least two tiers, a hydraulic control for a transfer mechanism comprising a main air line, a three-way valve assembly, a cam actuated by a keg when received in said transfer mechanism, a piston and cylinder assembly actuated by said three-way valve and cam, a conveyor for conveying kegs to said transfer mechanism, said transfer mechanism including a gate to limit the forward position of a keg on said conveyor, a lift, a pallet conveyor, a gate controlling the movement of pallets from said pallet conveyor to said lift, skids extending from said transfer mechanism to said lift and a retractable support element adjacent said conveyor, the actuation of said cam by the movement of said keg causing the retraction of said support element to discharge said keg upon said skids for movement to said lift.

9. In an automatic conveying and tiering device particularly suitable for forming unit palletized loads of kegs and barrels tiered on a dished base pallet and one or more intermediate dished pallets the combination comprising a pallet conveyor, a hydraulically operated lift, a pallet magazine for supplying the bottom pallet from a stacked array of pallets to said conveyor, a pusher, hydraulically operated control means on said pusher to push said pallet on said lift in synchronism with the lowering motion of said lift to permit barrels to be dropped on the pallets on said lift, and said lift being adapted to support the pallet transferred to said lift from said conveyor and to support kegs dropped on said pallet.

10. A device as in claim 9 wherein said pusher is controlled by a solenoid valve actuatable through relays to admit air from a main air supply to a three-way poppet valve, and a three-way poppet valve connected with a cylinder and piston to synchronize the pushing of the pallets from the pallet conveyor with the supplying of pallets from the bottom of said magazine in accordance with the lift motion of said lift.

11. A mechanism for palletizing articles comprising a palletizing station, a conveyor conveying said articles, a second conveyor associated with said first conveyor, means for moving certain of said articles from said first conveyor to said second conveyor, means for feeding said articles from said conveyors to said palletizing station, a transfer mechanism located at the juncture of said last named means and said conveyors, means for feeding a base pallet upon said palletizing station, an intermediate pallet magazine, means for feeding an intermediate pallet from said intermediate pallet magazine upon said articles upon said palletizing station, means for removing a palletized load of articles from said palletizing station, and electrical and pneumatic means for operating said various elements in predetermined sequence.

12. A mechanism for palletizing articles comprising a palletizing station, a conveyor conveying said articles, a second conveyor associated with said first conveyor, means for moving certain of said articles from said first conveyor to said second conveyor, means for feeding said articles from said conveyors to said palletizing station, means for feeding a base pallet upon said palletizing station, means for feeding groups of articles from said feeding means upon a base pallet upon said palletizing station, means for feeding an intermediate pallet upon said articles upon said palletizing station and means for removing a palletized load of articles from said palletizing station.

13. A mechanism for palletizing articles comprising a palletizing station, means for moving said station to a plurality of predetermined vertically spaced levels, a conveyor conveying said articles, means for feeding a base pallet upon said palletizing station when located at a first level, means for feeding a group of articles from said conveyor upon said base pallet upon said station when at another of said levels, means for feeding a rigid intermediate pallet over and upon said articles upon said palletizing station when at still another of said levels and means for removing a palletized load of articles from said palletizing station when returned to said first level.

14. A mechanism for palletizing articles comprising a palletizing station, a conveyor conveying said articles, means for feeding a base pallet upon said palletizing station, means for feeding a group of articles from said conveyor upon said base pallet upon said station, means for feeding a rigid intermediate pallet over and upon said articles upon said palletizing station, means for removing a palletized load of articles from said palletizing station, means for moving said palletizing station to various vertical levels for receiving said base pallet, feeding a group of articles upon said pallet, receiving said intermediate pallet and removing said palletized load and electrical and pneumatic means for operating said various elements in predetermined sequence.

15. A mechanism for palletizing articles comprising a vertically reciprocable lift constituting a palletizing station, a conveyor conveying said articles, a second conveyor associated with said first conveyor, means for moving every alternate article from said first conveyor to said second conveyor, skids extending from said conveyors to said station, transfer mechanisms for transferring said articles from said conveyors to said skids, means for feeding a base pallet upon said palletizing station, means for feeding a group of articles from said skids upon said base pallet upon said palletizing station, means for feeding an intermediate pallet upon said articles upon said palletizing station and means for removing a palletized load of articles from said palletizing station.

16. A mechanism for palletizing articles comprising a vertically reciprocable lift constituting a palletizing station, a conveyor conveying said articles, a second conveyor associated with said first conveyor, means for moving every alternate article from said first conveyor to said second conveyor, skids extending from said conveyors to said station, transfer mechanisms for transferring said articles from said conveyors to said skids, means for feeding a base pallet upon said palletizing station, means for feeding a group of articles from said skids upon said base pallet upon said palletizing station, means for feeding an intermediate pallet upon said articles upon said palletizing station, means for removing a palletized load of articles from said palletizing station and electrical and pneumatic means for operating said various elements in predetermined sequence.

17. A mechanism for palletizing articles comprising a vertically reciprocable lift constituting a palletizing station, a conveyor conveying said articles, a second conveyor associated with said first conveyor, means for moving every alternate article from said first conveyor to said second conveyor, skids extending from said conveyors to said station, transfer mechanisms for transferring said articles from said conveyors to said skids, means for feeding a base pallet upon said palletizing station, means for feeding a group of articles from said skids upon said base pallet upon said palletizing station, means for feeding an intermediate pallet upon said articles upon said palletizing station, means for feeding another group of articles upon said intermediate pallet, means for feeding a second intermediate pallet upon the articles upon said first named intermediate pallet, means for feeding a third group of articles upon said second intermediate pallet and means for removing a palletized load of articles from said palletizing station.

18. A mechanism for palletizing articles comprising a vertically reciprocable lift constituting a palletizing station, a conveyor conveying said articles, a second conveyor associated with said first conveyor, means for moving every alternate article from said first conveyor to said second conveyor, skids extending from said conveyors to said station, transfer mechanisms for transferring said articles from said conveyors to said skids, means for feeding a base pallet upon said palletizing station, means for feeding a group of articles from said skids upon said base pallet upon said palletizing station, means for feeding an intermediate pallet upon said articles upon said palletizing station, means for feeding another group of articles upon said intermediate pallet, means for feeding a second intermediate pallet upon the articles upon said first named intermediate pallet, means for feeding a third group of articles upon said second intermediate pallet and means for removing a palletized load of articles from said palletizing station and electrical and pneumatic means for operating said various elements in predetermined sequence.

19. A mechanism for palletizing articles comprising a palletizing station, a conveyor conveying said articles, means for feeding a base pallet upon said palletizing station, means for feeding a group of articles from said conveyor upon said base pallet upon said station, means for arranging each alternate article in a reversed orientation prior to being fed to said station, means interposed in front of said articles on said conveyor for restraining the feed of articles during deposit of said group upon said base pallet, and means for removing a palletized load of articles from said palletizing station.

20. A mechanism for palletizing articles comprising a palletizing station, a conveyor conveying said articles, a skid for feeding said articles from said conveyor to said station spaced slightly downwardly from said conveyor, a movable belt disposed above said skid contacting said articles so that upon transfer from said conveyor to said skid each article drops upon said skid preventing spinning and hanging thereof upon transfer, and means for removing a palletized load of articles from said palletizing station.

21. A mechanism for palletizing articles comprising a vertically reciprocable lift constituting a palletizing station, a conveyor conveying said articles, a second conveyor associated with said first conveyor, means for moving every alternate article from said first conveyor to said second conveyor, skids extending from said conveyors to said station, transfer mechanisms for transferring said articles from said conveyors to said skids, said skids being spaced slightly from said transfer mechanisms so that when an article is released by said transfer mechanisms to said skids it falls a slight distance thereby preventing hanging and spinning, means for feeding a base pallet upon said palletizing station, means for feeding a group of articles from said skids upon said base pallet upon said palletizing station, and means for removing a palletized load of articles from said palletizing station.

22. A method of palletizing articles comprising automatically moving the articles to be palletized in substantially a horizontal plane to a palletizing station, moving a base pallet in a plane parallel to but at right angles to the movement of said articles to said station, moving intermediate pallets in substantially a plane in alignment with the movement of said articles to said station and opposite to the direction of movement of said articles, removing the palletized load in substantially the same plane in alignment with the movement of said base pallet and moving said station in a plane normal to said other planes in order to assemble said articles and pallets in proper sequence for a palletized load.

23. In a palletizing device for articles the combination comprising a palletizing station, means for feeding said articles to said station, means for arranging each alternate article in a reversed orientation prior to being fed to said station, a carriage reciprocating between said station and said means for feeding articles, said carriage conveying a group of articles from said feeding means to said station and means for depositing said articles from said carriage upon said station upon the withdrawal movement of said carriage from said station to said feeding means, said station comprising a vertically reciprocating lift operable in synchronism with said carriage.

24. In a palletizing device for articles the combination comprising a palletizing station, means for feeding said articles to said station, means for arranging each alternate article in a reversed orientation prior to being fed to said station, a carriage reciprocating between said station and said means for feeding articles, said carriage conveying a group of articles from said feeding means to said station, means for depositing said articles from said carriage upon said station upon the withdrawal movement of said carriage from said station to said feeding means and means for preventing the feeding of articles during said withdrawal movement of said carriage, said station comprising a vertically reciprocating lift operable in synchronism with said carriage.

25. In a palletizing device for articles the combination comprising a palletizing station, a skid for feeding articles to said station, means for arranging each alternate article in a reversed orientation prior to being fed to said station, a carriage reciprocating between said station and said skid to convey a plurality of said articles to said station from said skid and means for depositing said articles from said carriage upon said station upon the withdrawal movement of said carriage from said station to said skid, said station comprising a vertically reciprocating lift operable in synchronism with said carriage.

26. In a palletizing device for articles the combination comprising a palletizing station, a skid for feeding articles to said station, means for arranging each alternate aritcle in a reversed orientation prior to being fed to said station, a carriage reciprocating between said station and said skid to convey a plurality of said articles to said station from said skid and means for depositing said articles from said carriage upon said station upon the withdrawal movement of said carriage from said station to said skid and means for preventing the feeding of articles during said withdrawal movement of said carriage, said station comprising a vertically reciprocating lift operable in synchronism with said carriage.

27. In a palletizing device as set forth in claim 26 wherein said means for preventing the feeding of articles comprises electrically controled skid stops associated with said skid.

28. A mechanism for palletizing kegs comprising a palletizing station, belt powered skid conveyors cooperating with said station, means for transferring kegs laterally in the proper position to said belt powered skid conveyors, means for feeding a base pallet upon said palletizing station, an intermediate pallet magazine, means for feeding a group of kegs from said belt powered skid conveyors upon a base pallet upon said palletizing station, means for feeding an intermediate pallet from said intermediate pallet magazine upon said kegs upon said palletizing station, means for removing a palletized load of kegs from said palletizing station, and means for operating said various elements in predetermined sequence.

29. A mechanism for palletizing kegs comprising a palletizing station, belt powered skid conveyors cooperating with said station, means for transferring kegs laterally in the proper position to said belt powered skid conveyors, means for feeding a base pallet upon said palletizing station, an intermediate pallet magazine, means for feeding a group of kegs from said belt powered skid conveyors upon a base pallet upon said palletizing station, means for feeding an intermediate pallet from said intermediate pallet magazine upon said kegs upon said palletizing station and means for removing a palletized load of kegs from said palletizing station.

30. A mechanism for palletizing kegs comprising a palletizing station, belt powered skid conveyors cooperating with said station, means for transferring kegs laterally in the proper position to said belt powered skid conveyors, means for feeding a base pallet upon said palletizing station, an intermediate pallet magazine, means for feeding a group of kegs from said belt powered skid conveyors upon a base pallet upon said palletizing station, means for feeding an intermediate pallet from said intermediate pallet magazine upon said kegs upon said palletizing station, means for removing a palletized load of kegs from said palletizing station, and electrical and pneumatic means for operating said various elements in predetermined sequence.

31. A mechanism for palletizing kegs comprising a palletizing station, belt powered skid conveyors cooperating with said station, means for transferring kegs laterally in the proper position to said belt powered skid conveyors, means for feeding a base pallet upon said palletizing station, an intermediate pallet magazine, means for feeding a group of kegs from said belt powered skid conveyors upon a base pallet upon said palletizing station, means for feeding an intermediate pallet upon said kegs upon said palletizing station, means for feeding another group of kegs upon said intermediate pallet from said skid conveyor, means for feeding a second intermediate pallet from said intermediate pallet magazine upon said kegs upon said first named intermediate pallet, means for feeding a third group of kegs upon said second intermediate pallet and means for removing a palletized load of kegs from said palletizing station.

32. An automatic conveying and tiering mechanism for palletizing unit loads of barrels in tiers, comprising a vertically movable lift, means for placing a pallet upon said lift for each tier of barrels, a transfer mechanism, a pair of conveyors to bring the barrels to said transfer mechanism, a skid, said transfer mechanism positioning the barrels for rolling laterally away on said skid from said conveyors to a pallet on said lift, a pallet magazine for supplying pallets to said lift, means for feeding pallets from said magazine and conveying means to convey a unit load from said lift to storage or a transportation station.

33. An automatic conveying and tiering device for forming unit palletized loads of kegs tiered on a dished base pallet and one or more double-dished intermediate pallets, said device comprising a hydraulic lift, a first pallet magazine, pallet conveyor means to deliver pallets to said hydraulic lift from said first magazine, a conveyor bringing kegs to a station where the kegs roll laterally onto said first pallet, a second magazine for intermediate pallets and means for feeding intermediate pallets from said second magazine upon said kegs upon said first pallet.

34. An automatic conveying and tiering device particularly suitable for forming unit palletized loads of kegs and barrels tiered on a dished base pallet and one or more intermediate dished pallets, said device comprising conveyors, transfer mechanisms to receive kegs from said conveyors, means for arranging said kegs on said conveyors to arrive at said transfer mechanisms with the bung in proper position, a lift, and skids for receiving said kegs from said transfer mechanisms to roll sideways down said skids to said lift for palletizing on said lift.

35. In an automatic conveyor and tiering device to form unit palletized keg loads of at least two tiers, a first conveyor, a carriage mechanism operatively connected to said first conveyor, a second conveyor, a second carriage mechanism operatively connected to said second conveyor located in a position opposite to said first keg carriage mechanism, skids laterally adjacent said carriages to convey said kegs by gravity to a pallet and skid stops to selectively hold back a line of kegs on said skids and to release a plurality of kegs from said line for dropping onto a pallet whereby kegs with their bungs are fed in proper position to said pallet.

36. In an automatc conveyor and tiering device to form unit palletized keg loads of at least two tiers, a first conveyor, a carriage mechanism operatively connected to said first conveyor, a second conveyor, a second carriage mechanism operatively connected to said second conveyor located in a position opposite to said first keg carriage mechanism, skids laterally adjacent said carriages to convey said kegs by gravity to a pallet and skid stops to selectively hold back a line of kegs on said skids and to release a plurality of kegs from said line for dropping onto a pallet whereby kegs with their bungs are fed in porper position to said pallet, a main carriage for aligning said kegs over said pallet and a pneumatic control for said skid stops operated by said main carriage.

37. A device as in claim 36 wherein said pneumatic control includes a three-way poppet valve, cylinder and piston actuated from a main air line and controlled by the releasing movement of said main carriage.

38. In an automatic conveyor and tiering device to form unit palletized keg loads of at least two tiers, a first conveyor, a carriage mechanism operatively connected to said first conveyor, a second conveyor, a second carriage mechanism operatively connected to said second conveyor located in a position opposite to said first keg carriage mechanism, skids laterally adjacent said carriages to convey said kegs by gravity to a pallet and skid stops to selectively hold back a line of kegs on said skids and to release a plurality of kegs from said line for dropping onto a pallet whereby kegs with their bungs are fed in proper position to said pallet, a main carriage for aligning said kegs over said pallet and a pneumatic control for said skid stops operated by said main carriage and an upper control belt contacting the upper surface of said kegs on said skids to guide the kegs on said skids toward said pallet.

39. A device as in claim 38 wherein said upper control belt is provided with a retractable supporting linkage to move said belt in response to the rolling undulations of the upper contact surface of the kegs rolling down said skids.

40. In an automatic conveying and tiering device particularly suitable for forming unit palletized loads of kegs and barrels tiered on a dished base pallet and one or more intermediate dished pallets the combination comprising a pallet conveyor, a hydraulically operated lift, a pallet magazine for supplying the bottom pallet from a stacked array of pallets to said conveyor, hydraulically operated means for moving said pallet on to said lift in synchronism with the lowering motion of said lift to permit barrels to be dropped on the pallets on said lift and said lift being adapted to support the pallet transferred to said lift from said conveyor and to support kegs dropped on said pallet.

41. A device as set forth in claim 40 wherein said hydraulically operated control means is controlled by a valve to admit fluid from a main fluid supply.

42. In an automatic conveying and tiering device particularly suitable for forming unit palletized loads of kegs and barrels tiered on a dished base pallet and one or more intermediate dished pallets, the combination comprising a hydraulically operated lift, a base pallet magazine for supplying the bottom pallet from a stacked array of pallets, a conveyor for receiving said bottom pallet leading from said magazine to said lift, means for positioning said base pallet upon said lift, means for moving a plurality of kegs upon said base pallet, and automatic means to move an intermediate pallet upon the kegs upon said base pallet whereby an additional plurality of kegs may be supported above said kegs upon said base pallet.

43. In an automatic conveying and tiering device to form unit palletized keg loads of at least two tiers, a hydraulic control for a carriage mechanism comprising a main air line, a three-way valve assembly, a cam cooperating with said valve assembly, a carriage mechanism, a piston and cylinder assembly actuated by said three-way valve and cam, a conveyor for feeding keys cooperating with said carriage mechanism, said carriage mechanism including a gate to limit the forward position of a keg on said conveyor, support elements for a keg conveyed by said carriage, skids below said support elements for receiving kegs from said carriage, retractable holding means on said skids to hold all but the first two kegs on said skids and to permit the rolling of said two kegs onto a pallet, and a retractable support element adjacent said carriage, the actuation of said cam by the movement of said keg causing the retraction of said retractable support element whereby said keg is released to travel on said skids to a tiering station.

44. A mechanism for palletizing kegs comprising a palletizing station, belt powered skid conveyors cooperating with said station, means for transferring kegs laterally in the proper position to said belt powered skid conveyors, means for feeding a base pallet upon said palletizing station, an intermediate pallet magazine, means for feeding a group of kegs from said belt powered skid conveyors upon a base pallet upon said palletizing station, means for feeding an intermediate pallet from said intermediate pallet magazine upon said kegs upon said palletizing station, means for operating said means for feeding a group of kegs to feed another group of kegs upon said intermediate pallet from said skid conveyor and means for operating said means for feeding an intermediate pallet for feeding a second intermediate pallet upon said kegs upon said first named intermediate pallet, means for operating said means for feeding a group of kegs to feed a third group of kegs upon said second intermediate pallet, means for removing a palletized load of kegs from said palletizing station and electrical and pneumatic means for operating said various means in predetermined sequence.

45. An automatic conveying and tiering mechanism for palletizing unit loads of barrels in tiers, comprising a vertically movable lift, means for placing a pallet upon said lift for each tier of barrels, a transfer mechanism, a pair of conveyors to bring the barrels to said transfer mechanism, said transfer mechanism positioning the barrels for rolling away from said conveyors, means for feeding said barrels from said transfer mechanism to a pallet on said lift, a pallet magazine, means for conveying pallets from said magazine to said lift and conveying means to convey a unit load from said lift to storage or a transportation station.

46. In an automatic conveying and tiering device to form unit palletized keg loads of at least two tiers, a hydraulic control for a transfer mechanism comprising a main air line, a valve assembly, a cam actuated by a keg when received in said transfer mechanism, a piston and cylinder assembly actuated by said valve and cam, a conveyor for conveying kegs to said transfer mechanism, said transfer mechanism including a gate to limit the forward position of a keg on said conveyor, a lift, a pallet conveyor, a gate controlling the movement of pallets from said pallet conveyor to said lift, skids extending from said transfer mechanism to said lift and means located adjacent said conveyor controlled by said cam to discharge said keg upon said skids for movement to said lift.

References Cited in the file of this patent

UNITED STATES PATENTS

| | | |
|---|---|---|
| 976,540 | Bergner | Nov. 22, 1910 |
| 1,288,962 | Moore | Dec. 24, 1918 |
| 1,390,583 | Paul | Sept. 13, 1921 |
| 1,538,913 | Wahl | May 26, 1925 |
| 1,592,767 | House | July 13, 1926 |
| 2,401,592 | Von Stocker | June 4, 1946 |
| 2,462,888 | Neer | Mar. 1, 1949 |
| 2,492,894 | Schrader | Dec. 27, 1949 |
| 2,633,251 | Bruce | Mar. 31, 1953 |
| 2,655,271 | Cole et al. | Oct. 13, 1953 |
| 2,701,650 | Stevenson | Feb. 8, 1955 |
| 2,765,606 | Brown | Oct. 9, 1956 |
| 2,768,756 | Horman | Oct. 30, 1956 |
| 2,774,489 | Guigas | Dec. 18, 1956 |
| 2,796,179 | Van Vleck | June 18, 1957 |
| 2,813,638 | Miller | Nov. 19, 1957 |
| 2,815,870 | Laub III | Dec. 10, 1957 |